US00RE49318E

(19) United States
(12) Reissued Patent
Aratani

(10) Patent Number: US RE49,318 E
(45) Date of Reissued Patent: Nov. 29, 2022

(54) ELECTROMAGNETIC RELAY

(71) Applicant: PANASONIC INTELLECTUAL PROPERTY MANAGEMENT CO., LTD., Osaka (JP)

(72) Inventor: Tatsuo Aratani, Mie (JP)

(73) Assignee: PANASONIC INTELLECTUAL PROPERTY MANAGEMENT CO., LTD., Osaka (JP)

(21) Appl. No.: 17/218,569

(22) Filed: Mar. 31, 2021

Related U.S. Patent Documents

Reissue of:
(64) Patent No.: 10,269,516
Issued: Apr. 23, 2019
Appl. No.: 15/103,794
PCT Filed: Dec. 9, 2014
PCT No.: PCT/JP2014/006139
§ 371 (c)(1),
(2) Date: Jun. 10, 2016
PCT Pub. No.: WO2015/087543
PCT Pub. Date: Jun. 18, 2015

(30) Foreign Application Priority Data

Dec. 13, 2013 (JP) ..... 2013-257752

(51) Int. Cl.
*H01H 50/14* (2006.01)
*H01H 3/00* (2006.01)
(Continued)

(52) U.S. Cl.
CPC ..... *H01H 50/14* (2013.01); *H01H 3/001* (2013.01); *H01H 50/02* (2013.01); *H01H 50/18* (2013.01);
(Continued)

(58) Field of Classification Search
CPC ..... H01H 50/14; H01H 3/001; H01H 50/02; H01H 50/18; H01H 50/36; H01H 50/541;
(Continued)

(56) References Cited

U.S. PATENT DOCUMENTS 3,713,055 A * 1/1973 Halbeck ..... H01H 50/66 200/283
4,464,628 A * 8/1984 Nozawa ..... F16K 1/38 324/423
(Continued)

FOREIGN PATENT DOCUMENTS

JP S50-95559 C 8/1975
JP S51-99146 B2 8/1976
(Continued)

OTHER PUBLICATIONS

International Search Report and Written Opinion, issued in corresponding International Patent Application No. PCT/JP2014/006139; with partial English translation.
(Continued)

*Primary Examiner* — Kenneth Whittington
(74) *Attorney, Agent, or Firm* — McDermott Will & Emery LLP

(57) ABSTRACT

The electromagnetic relay comprises an auxiliary fixed terminal that has a configuration different from that of a fixed terminal and includes an auxiliary external input/output terminal and an auxiliary external output/input terminal that can be electrically connected to the auxiliary external input/output terminal. The electromagnetic relay comprises an auxiliary movable terminal that has a configuration different from that of a movable terminal and can electrically connect the auxiliary external input/output terminal and the auxiliary external output/input terminal.

31 Claims, 35 Drawing Sheets

(51) Int. Cl.

| | |
|---|---|
| ***H01H 50/02*** | (2006.01) |
| ***H01H 50/18*** | (2006.01) |
| ***H01H 50/36*** | (2006.01) |
| ***H01H 50/54*** | (2006.01) |
| ***H01H 50/64*** | (2006.01) |
| ***H01H 1/58*** | (2006.01) |
| ***H01H 50/60*** | (2006.01) |

(52) U.S. Cl.
CPC ..... *H01H 50/36* (2013.01); *H01H 50/541* (2013.01); *H01H 50/64* (2013.01); *H01H 1/5805* (2013.01); *H01H 50/546* (2013.01); *H01H 50/60* (2013.01)

(58) Field of Classification Search
CPC .... H01H 50/64; H01H 1/5805; H01H 50/546; H01H 50/60
See application file for complete search history.

(56) References Cited

U.S. PATENT DOCUMENTS

| | | | | |
|---|---|---|---|---|
| 5,359,305 | A * | 10/1994 | Kitamura | H01H 50/16 335/129 |
| 5,367,250 | A * | 11/1994 | Whisenand | H01R 11/18 324/133 |
| 5,886,601 | A * | 3/1999 | Kitamura | H01H 50/54 335/128 |
| 6,559,744 | B1 * | 5/2003 | Kirsch | H01H 50/62 335/127 |
| 7,046,107 | B2 | 5/2006 | Yamamoto et al. | |
| 2005/0190025 | A1 | 9/2005 | Yamamoto et al. | |
| 2006/0134955 | A1 | 6/2006 | Sasaki et al. | |
| 2010/0127805 | A1 * | 5/2010 | Bollinger | H01H 50/546 335/131 |
| 2013/0222084 | A1 * | 8/2013 | Kato | H01H 50/54 335/189 |
| 2014/0240065 | A1 * | 8/2014 | Sakai | H01H 50/56 335/187 |
| 2016/0141131 | A1 * | 5/2016 | Kawamura | H01R 9/24 335/202 |

FOREIGN PATENT DOCUMENTS

| | | | |
|---|---|---|---|
| JP | H01-86149 | U | 6/1989 |
| JP | 2006-179348 | A | 7/2006 |
| JP | 2009-224150 | A | 1/2009 |
| JP | 2013-080692 | A | 5/2013 |
| JP | 2013-232341 | A | 11/2013 |
| WO | 2004/077472 | A1 | 9/2004 |
| WO | 2013/136629 | A1 | 9/2013 |

OTHER PUBLICATIONS

Non-Final Office Action issued in U.S. Appl. No. 15/103,794 dated May 17, 2017.
Final Office Action issued in U.S. Appl. No. 15/103,794 dated Nov. 30, 2017.
Non-Final Office Action issued in U.S. Appl. No. 15/103,794 dated Aug. 2, 2018.
Notice of Allowance ssued in U.S. Appl. No. 15/103,794 dated Dec. 6, 2018.
International Search Report and Written Opinion, issued in corresponding Inernational Patent Application No. PCT/JP2014/006139, dated Jan. 27, 2015; with partial English translation.

* cited by examiner

FIG.42
Amended
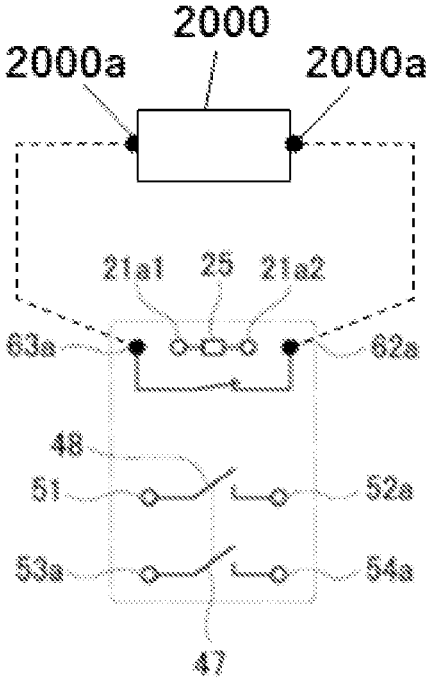

ELECTROMAGNETIC RELAY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application *is a reissue application of U.S. Pat. No. 10,269,516 issued on Apr. 23, 2019 issued from U.S. patent application Ser. No. 15/103,794 filed on Dec. 9, 2014, which* is the U.S. National Phase under 35 U.S.C. § 371 of International Patent Application No. PCT/JP2014/006139, filed on Dec. 9, 2014, which in turn claims the benefit of Japanese Application No. 2013-257752, filed on Dec. 13, 2013, the disclosures of *each of* which Applications are incorporated by reference herein.

TECHNICAL FIELD

The present invention relates to electromagnetic relays serving as switches connected to electrical wiring on wiring boards.

BACKGROUND ART

Electromagnetic relays are being used as switches connected to electrical wiring on wiring boards. Conventional electromagnetic relays include fixed terminals including external input/output terminals and external output/input terminals electrically connected to the external input/output terminals. The electromagnetic relays further include movable terminals which can electrically connect the external input/output terminals to the external output/input terminals. Patent Literature 1 discloses an electromagnetic relay of this type.

CITATION LIST

Patent Literature

Patent Literature 1: Japanese Unexamined Patent Application Publication No.

SUMMARY OF INVENTION

Problem to be Solved

The conventional electromagnetic relay is not provided with an auxiliary terminal to detect whether or not there occurs a malfunction of a movable terminal and a fixed terminal such as welding of the movable terminal portion and the fixed terminal portion.

The present invention has been made in view of such conventional problems. It is an object of the present invention to provide an electromagnetic relay provided with an auxiliary terminal to detect a malfunction of a movable terminal and a fixed terminal.

Solution to Problem

An electromagnetic relay according to the first aspect of the present invention comprises: a fixed terminal including an external input/output terminal and an external output/input terminal that can be electrically connected to the external input/output terminal; a movable terminal that can electrically connect the external input/output terminal and the external output/input terminal; an auxiliary fixed terminal that has a configuration different from that of the fixed terminal and includes an auxiliary external input/output terminal and an auxiliary external output/input terminal that can be electrically connected to the auxiliary external input/output terminal; an auxiliary movable terminal that has a configuration different from that of the movable terminal and can electrically connect the auxiliary external input/output terminal and the auxiliary external output/input terminal; and an armature that moves each of the movable terminal and the auxiliary movable terminal so as to switch the auxiliary movable terminal between electrical connection and disconnection with respect to each of the auxiliary external input/output terminal and the auxiliary external output/input terminal when switching the movable terminal between electrical connection and disconnection with respect to each of the external input/output terminal and the external output/input terminal.

An electromagnetic relay according to the second aspect of the present invention comprises a partition wall provided between a pair of the fixed terminal and the movable terminal and a pair of the auxiliary fixed terminal and the auxiliary movable terminal.

An electromagnetic relay according to the third aspect of the present invention comprises an auxiliary driving portion for moving the auxiliary movable terminal while the auxiliary driving portion comes into contact with the auxiliary movable terminal so as to switch between electrical connection and disconnection of the auxiliary movable terminal and the auxiliary fixed terminal, wherein the auxiliary driving portion is attached to the armature.

An electromagnetic relay according to the fourth aspect of the present invention is an electromagnetic relay wherein the armature is formed of an electrically conductive material, and the auxiliary driving portion is formed of an insulating material.

An electromagnetic relay according to the fifth aspect of the present invention is an electromagnetic relay wherein the armature includes an auxiliary driving portion for moving the auxiliary movable terminal while the auxiliary driving portion comes into contact with the auxiliary movable terminal so as to switch between electrical connection and disconnection of the auxiliary movable terminal and the auxiliary fixed terminal.

An electromagnetic relay according to the sixth aspect of the present invention is an electromagnetic relay wherein the auxiliary movable terminal is directly attached to the armature.

An electromagnetic relay according to the seventh aspect of the present invention is an electromagnetic relay wherein the armature moves each of the movable terminal and the auxiliary movable terminal such that the auxiliary movable terminal and the auxiliary fixed terminal are not electrically connected to each other, when the fixed terminal and the movable terminal are electrically connected to each other.

An electromagnetic relay according to the eighth aspect of the present invention is an electromagnetic relay wherein the auxiliary movable terminal is pushed upward so as to be electrically connected to the auxiliary fixed terminal.

An electromagnetic relay according to ninth aspect of the present invention comprises an electromagnet that generates electromagnetic force for driving the armature to move the movable terminal and the auxiliary movable terminal, each of the auxiliary movable terminal and the auxiliary fixed terminal is directly or indirectly supported by a bobbin on which a winding of the electromagnet is wound.

An electromagnetic relay according to tenth aspect of the present invention comprises: an electromagnet that generates electromagnetic force for driving the armature to move the movable terminal and the auxiliary movable terminal; and a body from which a tip portion of the external input/output terminal, a tip portion of the external output/input terminal, a tip portion of the auxiliary external input/output terminal, and a tip portion of the auxiliary external output/input terminal respectively project outward, the body being a base for directly or indirectly supporting each of the fixed terminal, the movable terminal, the auxiliary fixed terminal, the auxiliary movable terminal, the armature, and the electromagnet.

An electromagnetic relay according to the eleventh aspect of the present invention is an electromagnetic relay wherein the auxiliary fixed terminal is directly or indirectly supported by the body.

An electromagnetic relay according to the twelfth aspect of the present invention comprises a cover attached to the body to enclose the fixed terminal, the movable terminal, the auxiliary fixed terminal, the auxiliary movable terminal, the armature, and the electromagnet.

An electromagnetic relay according to the thirteenth aspect of the present invention is an electromagnetic relay wherein the cover has an inner space of a substantially rectangular parallelepiped, and the auxiliary fixed terminal is located in a space between the electromagnet and a corner, of four corners of the cover, closer to the electromagnet than the movable terminal in a plan view.

An electromagnetic relay according to the fourteenth aspect of the present invention is an electromagnetic relay wherein each of the tip portion of the auxiliary external input/output terminal and the tip portion of the auxiliary external output/input terminal has an appearance that can visually be distinguished from each of the tip portion of the external input/output terminal and the tip portion of the external output/input terminal.

An electromagnetic relay according to the fifteenth aspect of the present invention is an electromagnetic relay wherein each of the tip portion of the auxiliary external input/output terminal and the tip portion of the auxiliary external output/input terminal has an area of a cross section smaller than that of each of the tip portion of the external input/output terminal and the tip portion of the external output/input terminal.

An electromagnetic relay according to the sixteenth aspect of the present invention is an electromagnetic relay wherein a virtual straight line connecting the tip portion of the external input/output terminal and the tip portion of the external output/input terminal is substantially parallel to a virtual straight line connecting the tip portion of the auxiliary external input/output terminal and the tip portion of the auxiliary external output/input terminal.

An electromagnetic relay according to the seventeenth aspect of the present invention comprises: a fixed terminal including an external input/output terminal and an external output/input terminal that can be electrically connected to the external input/output terminal; a movable terminal that can electrically connect the external input/output terminal and the external output/input terminal; another fixed terminal including another external input/output terminal and another external output/input terminal that can be electrically connected to the another external input/output terminal; another movable terminal that can electrically connect another external input/output terminal and another external output/input terminal; an auxiliary fixed terminal that has a configuration different from that of the fixed terminal and the another fixed terminal and includes an auxiliary external input/output terminal and an auxiliary external output/input terminal that can be electrically connected to the auxiliary external input/output terminal; an auxiliary movable terminal that has a configuration different from that of the movable terminal and the another movable terminal and can electrically connect the auxiliary external input/output terminal and the auxiliary external output/input terminal; and an armature that moves each of the movable terminal, the another movable terminal, and the auxiliary movable terminal so as to switch the auxiliary movable terminal between electrical connection and disconnection with respect to each of the auxiliary external input/output terminal and the auxiliary external output/input terminal when switching the movable terminal between electrical connection and disconnection with respect to each of the external input/output terminal and the external output/input terminal and switching the another movable terminal between electrical connection and disconnection with respect to each of the another external input/output terminal and the another external output/input terminal.

An electromagnetic relay according to the eighteenth aspect of the present invention comprises: an electromagnet that generates electromagnetic force for driving the armature to move the movable terminal, the another movable terminal, and the auxiliary movable terminal; a body from which a tip portion of the external input/output terminal, a tip portion of the external output/input terminal, a tip portion of the another external input/output terminal, a tip portion of the another external output/input terminal, a tip portion of the auxiliary external input/output terminal, and a tip portion of the auxiliary external output/input terminal respectively project outward, the body being a base directly or indirectly supporting each of the fixed terminal, the movable terminal, the another fixed terminal, the another movable terminal, the auxiliary fixed terminal, the auxiliary movable terminal, the armature, and the electromagnet; and a cover attached to the body to enclose the fixed terminal, the another fixed terminal, the movable terminal, the another movable terminal, the auxiliary fixed terminal, the auxiliary movable terminal, the armature, and the electromagnet, wherein each of the tip portion of the auxiliary external input/output terminal and the tip portion of the auxiliary external output/input terminal has an appearance that can visually be distinguished from each of the tip portion of the external input/output terminal, the tip portion of the external output/input terminal, the tip portion of the another external input/output terminal, and the tip portion of the another external output/input terminal.

An electromagnetic relay according to the nineteenth aspect of the present invention is an electromagnetic relay wherein the movable terminal and the another movable terminal are substantially aligned along a virtual straight line in a plan view and can move in a direction crossing the virtual straight line.

Effect of Invention

According to the present invention, it is possible to obtain an electromagnetic relay provided with an auxiliary terminal to detect a malfunction of a movable terminal and a fixed terminal.

BRIEF DESCRIPTION OF DRAWINGS

FIG. 42 is an electrical circuit diagram showing several kinds of terminals exposed to the outside of the electromagnetic relay according to Embodiment 2 of the present invention.

DESCRIPTION OF EMBODIMENTS

Figure 1:
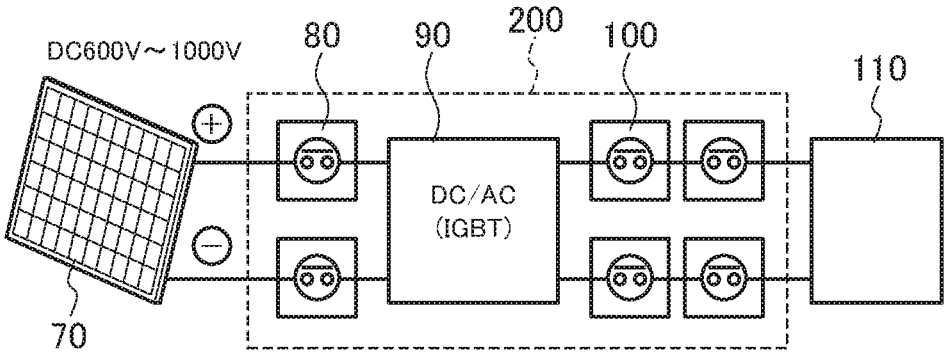
FIG. 1 is a view showing a schematic configuration of a solar power generation system using an electromagnetic relay according to an embodiment of the present invention.

Embodiments of the present invention will hereinafter be described with reference to the drawings. The following descriptions of embodiments may include reference numerals without parentheses and reference numerals put in parentheses which are indicated sequentially. This means that the respective reference numerals without parentheses are related to each other and the respective reference numerals put in parentheses are related to each other.

Embodiment 1

An electromagnetic relay 100 according to Embodiment 1 of the present invention is described below with reference to FIG. 1 to FIG. 28.

The electromagnetic relay 100 of the present embodiment is assumed to be electrically connected to an AC circuit in a solar power generation system.

As shown in FIG. 1, a solar power generation system assumed to be connected with the electromagnetic relay 100 of the present embodiment includes a solar power generation panel 70 that receives solar radiation to generate electricity. The solar power generation panel 70 transmits a DC current generated by solar radiation to a DC/AC converter 90 via a DC relay 80. The DC/AC converter 90 converts the DC current to an AC current. The AC current is transmitted to a load 110 via the electromagnetic relay 100 of the present embodiment. In the solar power generation system, the electromagnetic relay 100 functions as a switch for switching between a state where AC current flows and a state where AC current does not flow.

Note that the electromagnetic relay 100 need not be used in the electrical circuit in the solar power generation system but may instead be applicable to any systems. The electromagnetic relay 100 may be electrically connected to a DC circuit as long as the relay serves as a switch.

The electromagnetic relay 100 of the present embodiment is described in more detail below.

Figure 2:
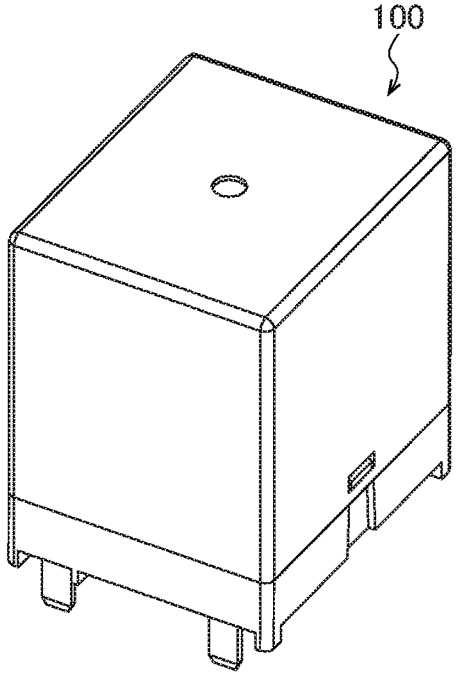
FIG. 2 is a perspective view of an electromagnetic relay according to Embodiment 1 of the present invention.
Figure 3:
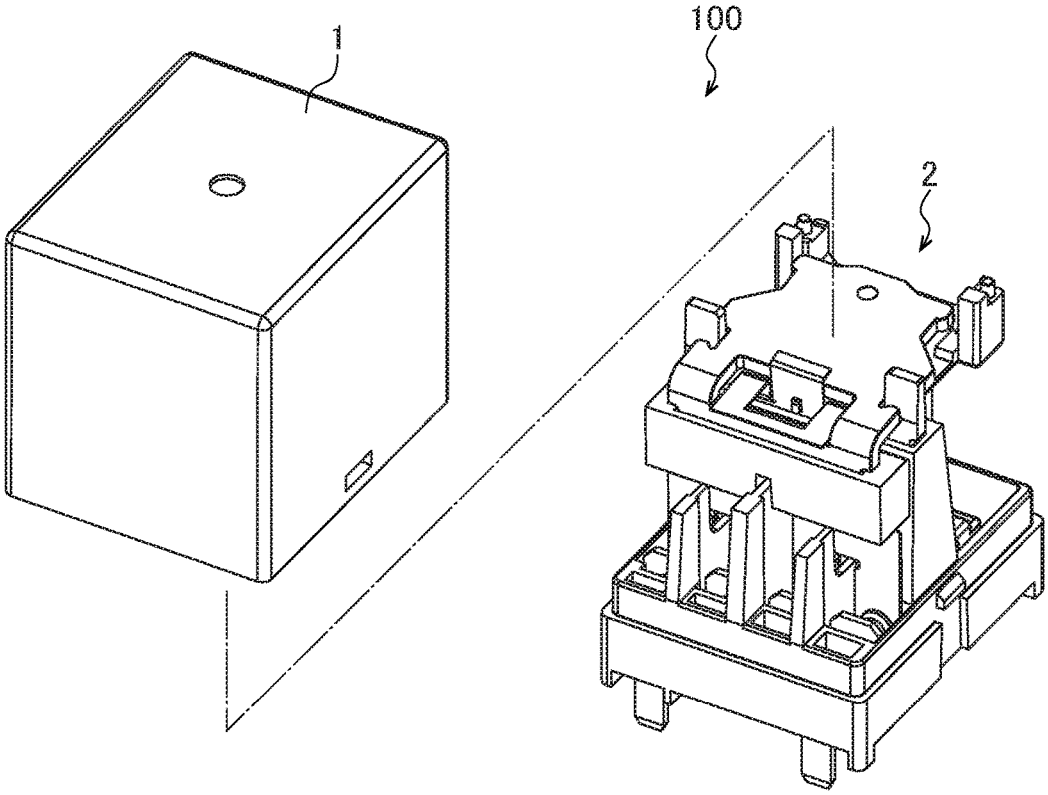
FIG. 3 is a perspective view of the electromagnetic relay according to Embodiment 1 of the present invention with a cover and a relay body separated from each other.

As shown in FIG. 2 and FIG. 3, the electromagnetic relay 100 of the present embodiment has an external appearance formed into a substantially rectangular parallelepiped. The electromagnetic relay 100, however, may have any external appearance.

The electromagnetic relay 100 of the present embodiment includes a relay body 2 and a cover 1 serving as a cap for covering the relay body 2. The cover 1 has an internal space of a substantially rectangular parallelepiped. The cover 1 is formed of a resin material. The cover 1 may be either transparent or opaque.

As used herein, the term "substantially rectangular parallelepiped" refers to a configuration in which a virtual hexahedron covering most of the outer surfaces of the shape is recognized as a rectangular parallelepiped regardless of whether the surfaces are flat or not.

Figure 4:
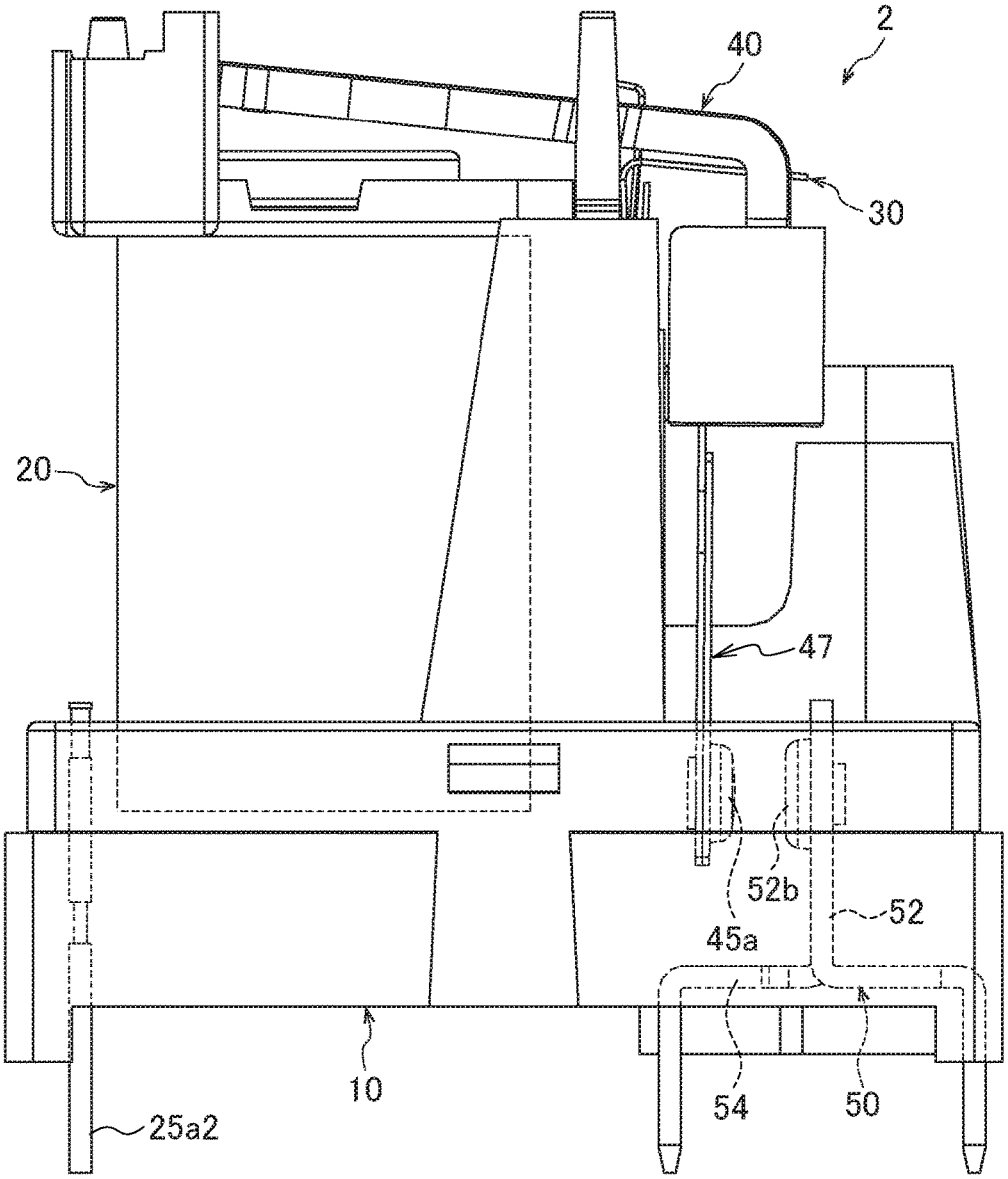
FIG. 4 is a side view of the relay body of the electromagnetic relay according to Embodiment 1 of the present invention.
Figure 5:
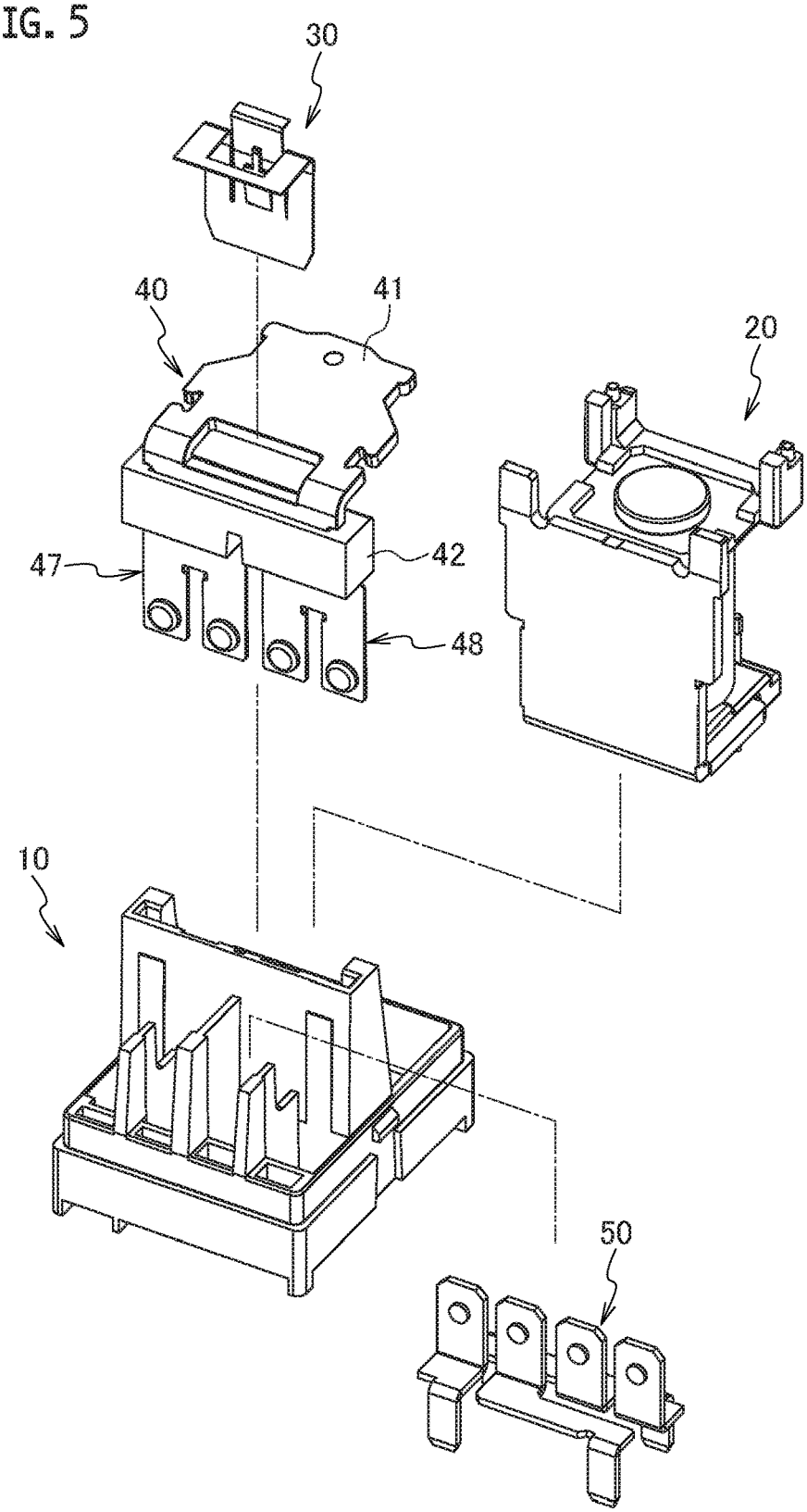
FIG. 5 is an exploded perspective view of the relay body of the electromagnetic relay according to Embodiment 1 of the present invention.

As shown in FIG. 4 and FIG. 5, the relay body 2 includes a body 10 as a base. The body 10 directly or indirectly supports an electromagnet 20, a return spring 30, a movable member 40, and a set of fixed terminals 50, as shown in FIG. 4 and FIG. 5.

As used herein, the term "directly support" refers to a state where a supporting member is in contact with a supported member. The term "indirectly support" refers to a state where another member is interposed between the supporting member and the supported member.

The electromagnet 20 generates electromagnetic force. The movable member 40 is attracted by the electromagnetic force generated by the electromagnet 20 so as to come closer to the electromagnet 20. The movable member 40 includes a movable terminal 47 provided with, for example, a movable contact point 45a at a tip of the movable terminal 47, as shown in FIG. 4.

Once the movable member 40 is attracted toward the electromagnet 20, a movable contact point 45a (45b, 46a, 46b) moves from the position shown in FIG. 4 against a return force of the return spring 30 and comes into contact with a fixed contact point 52b (51b, 54b, 53b) provided adjacent to the upper end of the set of fixed terminals 50. When the electromagnet 20 stops generating the electromagnetic force, the movable member 40 is returned to the position shown in FIG. 4 by the return force of the return spring 30 made of metal. The detail configurations and operations of these members will be described below.

Figure 6:
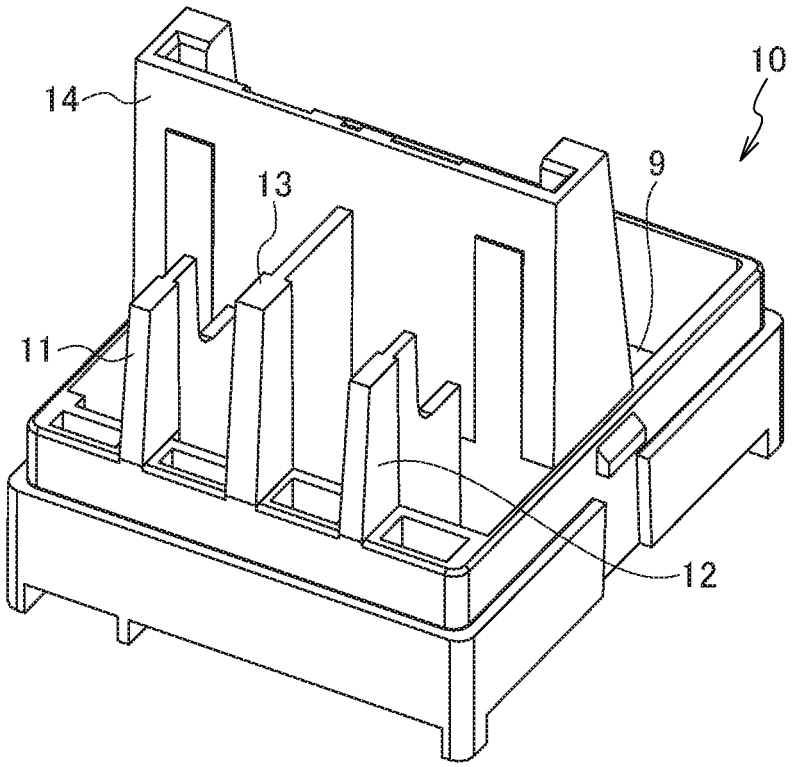
FIG. 6 is a perspective view of a body of the electromagnetic relay according to Embodiment 1 of the present invention.

As shown in FIG. 6, the body 10 is a molded article integrally formed of a resin material having insulating properties. The body 10 is provided with insulating walls 11, 12 and 13 extending upward from the inner surface of a bottom plate 9. The inner surface of the bottom plate 9 of the body 10 is further provided with an upwardly extending partition wall 14 substantially vertical to the respective insulating walls 11, 12 and 13. The functions of these walls will be described in detail below.

Figure 7:
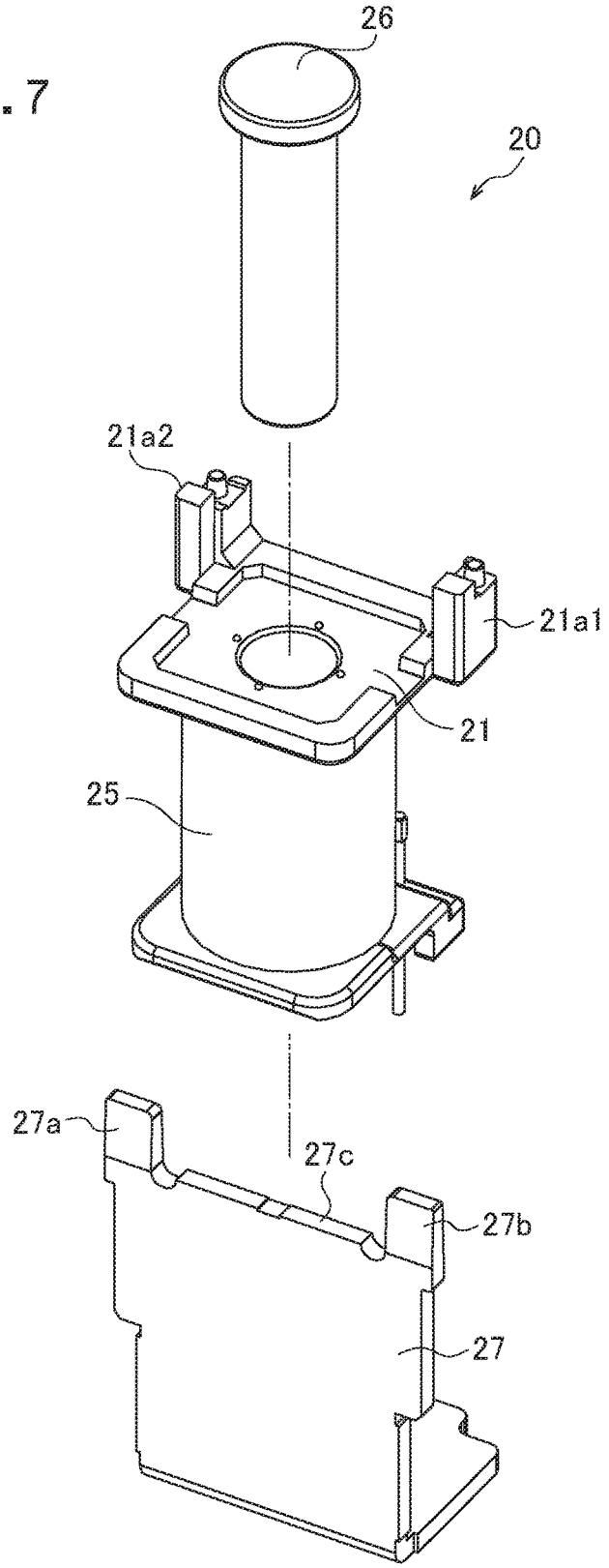
FIG. 7 is an exploded perspective view of an electromagnet of the electromagnetic relay according to Embodiment 1 of the present invention.
Figure 8:
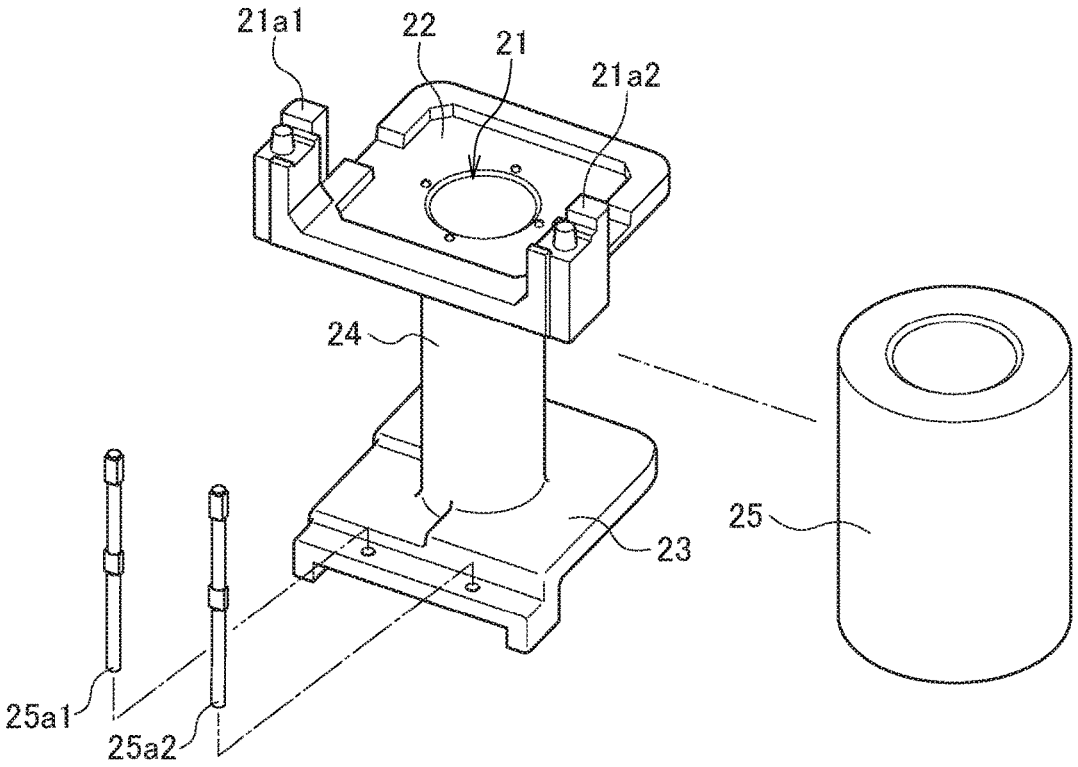
FIG. 8 is an exploded perspective view showing a winding, coil terminals and a bobbin of the electromagnetic relay according to Embodiment 1 of the present invention.

As shown in FIG. 7 and FIG. 8, the electromagnet 20 includes an iron core 26, a bobbin 21 in which the iron core 26 is inserted, a winding 25 wound round the bobbin 21, and a yoke 27 attached to the bobbin 21. The bobbin 21 includes an upper flange 22, a lower flange 23, and a cylindrical member 24 connecting the upper flange 22 and the lower flange 23.

The upper flange 22 includes supporting portions 21a1 and 21a2 on which an auxiliary movable terminal 65 and an auxiliary fixed terminal 6243 used in Embodiment 2 described below are placed. The lower flange 23 is fixed on the upper surface of the bottom plate 9 of the body 10. The winding 25 is wound round the cylindrical member 24. The lower flange 23 of the bobbin 21 is provided with a pair of holes into which a pair of coil terminals 25a1 and 25a2 is inserted. The pair of coil terminals 25a1 and 25a2 is electrically connected to both sides of the winding 25. The bobbin 21 is a molded article formed of resin.

As shown in FIG. 7, the yoke 27 includes projections 27a and 27b defining a recess for receiving an armature 41 described below. The armature 41 turns around a bottom surface 27c serving as a fulcrum in the recess defined by the projections 27a and 27b of the yoke 27 in a seesaw manner by the electromagnetic force generated by the electromagnet 20. The functions of these members will be described in detail below.

A movable terminal 47 (48) of the electromagnetic relay 100 of the present embodiment is described below with reference to FIG. 9 to FIG. 14.

Figure 9:
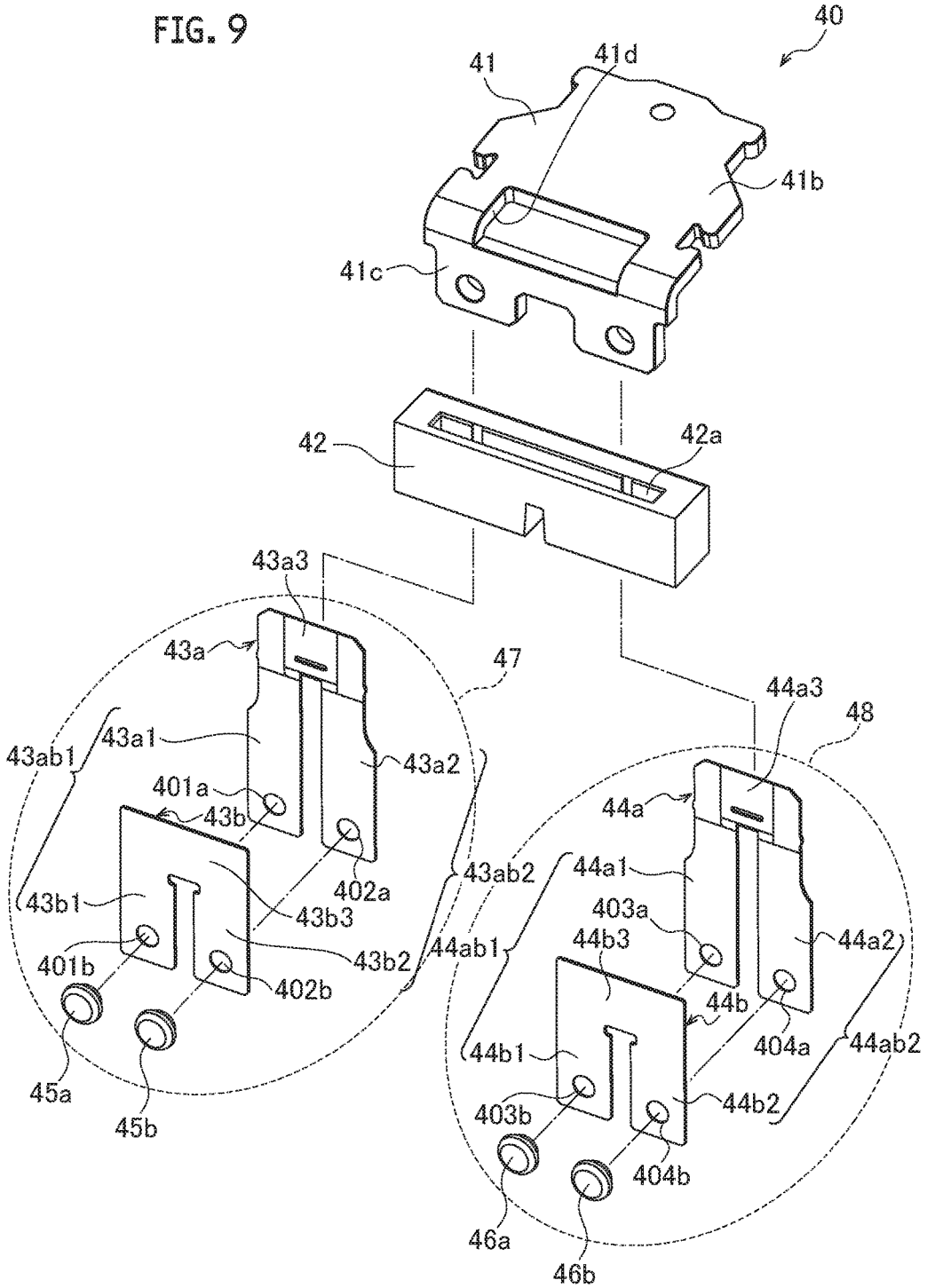
FIG. 9 is an exploded perspective view of a movable member of the electromagnetic relay according to Embodiment 1 of the present invention.
Figure 10:
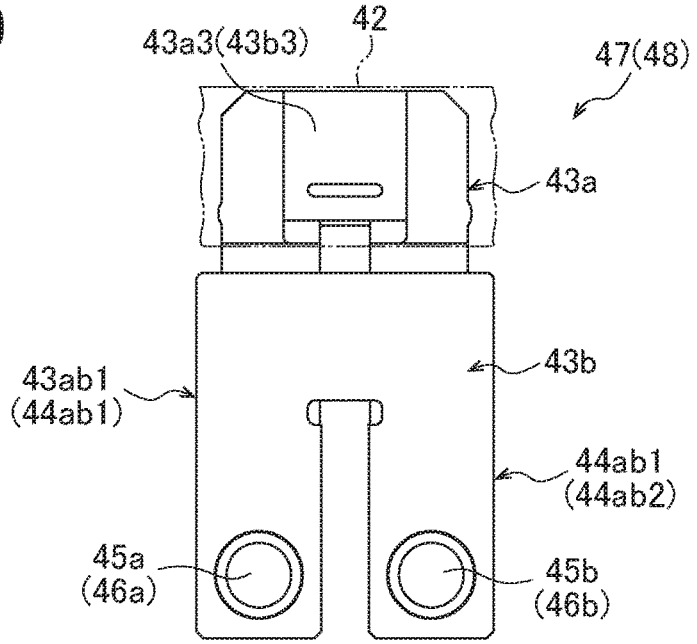
FIG. 10 is a front view of movable terminals of the electromagnetic relay according to Embodiment 1 of the present invention.

As shown in FIG. 9 and FIG. 10, the movable member 40 includes the armature 41, a holder 42, and movable terminals 47 and 48. The details of the armature 41, the holder 42 and the movable terminals 47 and 48 of the movable member 40 are described below.

The armature 41 is formed of an electrically conductive metal. The armature 41 is positioned above the electromagnet 20. The armature 41 includes a horizontal portion 41b that turns around the bottom surface 27c serving as a fulcrum in the recess of the yoke 27 by the electromagnetic force generated by the electromagnet 20. The armature 41 includes a vertical portion 41c extending downward from the horizontal portion 41b. The armature 41 is provided with a penetration hole 41d into which the return spring 30 is inserted.

The holder 42 is a molded article formed of an insulating resin. The holder 42 is provided with an insertion hole 42a communicating with the upper and lower spaces. The insertion hole 42a is divided into two separate holes on the inside thereof The vertical portion 41c of the armature 41 is inserted downward from above in one of the spaces in the insertion hole 42a. The respective upper ends of the movable terminals 47 and 48 are inserted upward from below in the other space in the insertion hole 42a. The vertical portion 41c of the armature 41 is insulated from the respective upper ends of the movable terminals 47 and 48 in the holder 42 with part of the holder 42 interposed therebetween.

The details of the movable terminal 47 are described below with reference to FIG. 9 and FIG. 10.

The movable terminal 47 includes an electrically conductive movable spring 43a and an electrically conductive contact 43b provided in contact with the front surface of the movable spring 43a. The movable spring 43a entirely approximately has a plate shape and is formed of a copper alloy having a higher modulus of elasticity than the contact 43b formed of pure copper. The contact 43b entirely approximately has a plate shape and is formed of pure copper having higher electrical conductivity than the movable spring 43a formed of a copper alloy. The movable terminal 47 thus has a two-layer (multilayer) composite structure having high spring properties and high electrical conductivity. As used herein, the phrase "entirely approximately has a plate shape" is meant to include a plate member which is an exact rectangular parallelepiped and a plate member which is not an exact rectangular parallelepiped of which the corners are curved but can be assumed to be a rectangular parallelepiped when most of the plane surfaces are elongated.

The movable spring 43a includes a first cantilever 43a1 and a second cantilever 43a2 each having a plate shape. The first cantilever 43a1 and the second cantilever 43a2 extend substantially parallel to each other. The first cantilever 43a1 and the second cantilever 43a2 each extend substantially orthogonal to the extending direction of the holder 42.

As used herein, the phrase "substantially parallel to" or "substantially orthogonal to" is meant to embrace a state where components each extending along virtual lines are designed to be parallel to or orthogonal to each other. Namely, the phrase "substantially parallel to" or "substantially orthogonal to" as used herein means that components each extending along virtual lines are not necessarily arranged exactly parallel to or orthogonal to each other on the assumption that there may be errors of manufacture of the components.

One end of the first cantilever 43a1 and one end of the second cantilever 43a2 are physically connected to each other via a first-second cantilever connecting portion 43a3. The first-second cantilever connecting portion 43a3 electrically connects the first cantilever 43a1 and the second cantilever 43a2. The first-second cantilever connecting portion 43a3 is entirely housed in the holder 42.

The contact 43b includes a third cantilever 43b1 and a fourth cantilever 43b2 each having a plate shape. The third cantilever 43b1 and the fourth cantilever 43b2 extend substantially parallel to each other. The third cantilever 43b1 and the fourth cantilever 43b2 each extend substantially orthogonal to the extending direction of the holder 42. One end of the third cantilever 43b1 and one end of the fourth cantilever 43b2 are physically connected via a third-fourth cantilever connecting portion 43b3.

The third-fourth cantilever connecting portion 43b3 electrically connects the third cantilever 43b1 and the fourth cantilever 43b2.

The first cantilever 43a1 and the third cantilever 43b1 compose a first composite cantilever 43ab1. The second cantilever 43a2 and the fourth cantilever 43b2 compose a second composite cantilever 43ab2.

The tips of the first cantilever 43a1 and the second cantilever 43a2 of the movable spring 43a are provided with penetration holes 401a and 402a. The tips of the third cantilever 43b1 and the fourth cantilever 43b2 of the contact 43b are provided with penetration holes 401b and 402b. The movable contact point 45a is inserted into the paired penetration holes 401a and 401b. The movable contact point 45b is inserted into the paired penetration holes 402a and 402b. The movable spring 43a and the contact 43b are in contact with each other to form an integrated structure.

The details of the movable terminal 48 are described below with reference to FIG. 9 and FIG. 10.

The movable terminal 48 includes an electrically conductive movable spring 44a and an electrically conductive contact 44b provided in contact with the front surface of the movable spring 44a. The movable spring 44a entirely approximately has a plate shape and is formed of a copper alloy having a higher modulus of elasticity than the contact 44b formed of pure copper. The contact 44b entirely approximately has a plate shape and is formed of pure copper having higher electrical conductivity than the movable spring 44a formed of a copper alloy. The movable terminal 48 thus has a two-layer (multilayer) composite structure having high spring properties and high electrical conductivity.

The movable spring 44a includes a first cantilever 44a1 and a second cantilever 44a2 each having a plate shape. The first cantilever 44a1 and the second cantilever 44a2 extend substantially parallel to each other. The first cantilever 44a1 and the second cantilever 44a2 each extend substantially orthogonal to the extending direction of the holder 42.

One end of the first cantilever 44a1 and one end of the second cantilever 44a2 are physically connected to each other via a first-second cantilever connecting portion 44a3. The first-second cantilever connecting portion 44a3 electrically connects the first cantilever 44a1 and the second cantilever 44a2. The first-second cantilever connecting portion 44a3 is entirely housed in the holder 42.

The contact 44b includes a third cantilever 44b1 and a fourth cantilever 44b2 each having a plate shape. The third cantilever 44b1 and the fourth cantilever 44b2 extend substantially parallel to each other. The third cantilever 44b1 and the fourth cantilever 44b2 each extend substantially orthogonal to the extending direction of the holder 42.

One end of the third cantilever 44b1 and one end of the fourth cantilever 44b2 are physically connected to each other via a third-fourth cantilever connecting portion 44b3. The third-fourth cantilever connecting portion 44b3 electrically connects the third cantilever 44b1 and the fourth cantilever 44b2.

The first cantilever 44a1 and the third cantilever 44b1 compose a first composite cantilever 44ab1. The second cantilever 44a2 and the fourth cantilever 44b2 compose a second composite cantilever 44ab2.

The tips of the first cantilever 44a1 and the second cantilever 44a2 of the movable spring 44a are provided with penetration holes 403a and 404a. The tips of the third cantilever 44b1 and the fourth cantilever 44b2 of the contact 44b are provided with penetration holes 403b and 404b. The movable contact point 46a is inserted into the paired penetration holes 403a and 403b. The movable contact point 46b is inserted into the paired penetration holes 404a and 404b. The movable spring 44a and the contact 44b are in contact with each other to form an integrated structure.

Figure 11:
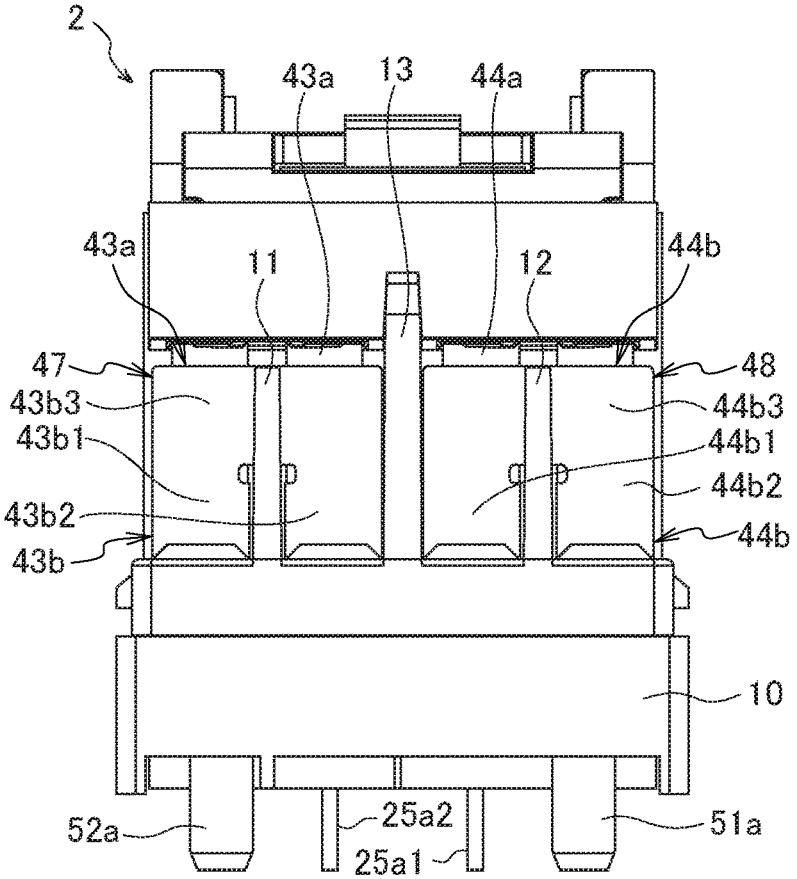
FIG. 11 is a front view of the relay body of the electromagnetic relay according to Embodiment 1 of the present invention.
Figure 12:
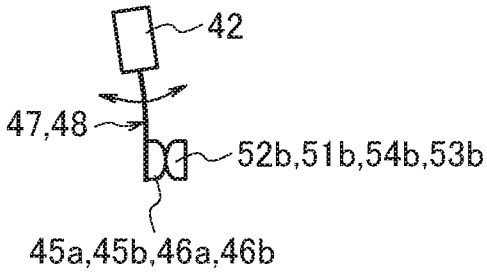
FIG. 12 is a first schematic diagram for explaining the characteristics of the movable terminals of the electromagnetic relay according to Embodiment 1 of the present invention.
Figure 13:
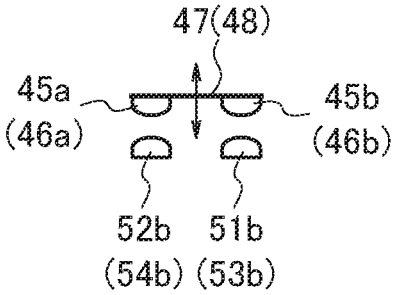
FIG. 13 is a second schematic diagram for explaining the characteristics of the movable terminals of the electromagnetic relay according to Embodiment 1 of the present invention.

As shown in FIG. 11, the insulating wall 13 of the body 10 is inserted between the movable terminal 47 and the movable terminal 48. The insulating wall 11 is inserted between the first composite cantilever 43ab1 and the second composite cantilever 43ab2. The insulating wall 12 is inserted between the first composite cantilever 44ab1 and the second composite cantilever 44ab2. The insulating walls 11, 12 and 13 extend vertical to the bottom plate 9 of the body 10 and parallel to each other.

Next, the operations of the movable terminal 47 (48) are described below with reference to FIG. 12 to FIG. 15.

Once the armature 41 receives the electromagnetic force from the electromagnet 20, the movable member 40 turns around the bottom surface 27c serving as a fulcrum in the recess of the yoke 27 as described above and changes a gradient thereof. The respective movable contact points 45a, 45b, 46a and 46b then move to come into contact with the respective fixed contact points 52b, 51b, 54b and 53b in the direction as indicated by each arrow shown in FIG. 12 and FIG. 13. The movable terminal 47 (48) is thus bent around the holder 42 serving as a fixed end of a cantilever.

Figure 14:
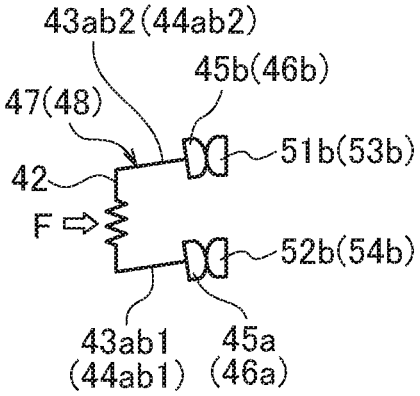
FIG. 14 is a third schematic diagram for explaining the characteristics of the movable terminals of the electromagnetic relay according to Embodiment 1 of the present invention.

The first composite cantilever 43ab1 (44ab1) and the second composite cantilever 43ab2 (44ab2) are formed separately from each other and therefore can be independently and elastically deformed, as shown in FIG. 14. The movable contact points 45a, 45b, 46a and 46b can respectively come into contact with the fixed contact points 52b, 51b, 54b and 53b shown in FIG. 15.

This configuration can prevent any of the movable contact points 45a, 45b, 46a and 46b from failing to come into contact with the corresponding fixed contact points 52b, 51b, 54b and 53b. The movable contact points 45a, 45b, 46a and 46b and the fixed contact points 52b, 51b, 54b and 53b are each formed of a metal having electrical conductivity equal to or higher than that of the movable terminal 47 (48) and a fixed terminal 512 (534).

As described above, the present embodiment includes the movable terminal 47 (48) having a two-layer structure of the movable spring 43a (44a) and the contact 43b (44b), as shown in FIG. 9, in order to combine a member having high spring properties and a member having high electrical conductivity. Alternatively, the present embodiment may be illustrated by the electromagnetic relay 100 including, for example, a movable terminal in which the movable spring 43a (44a) having both high spring properties and high electrical conductivity is only fixed to the holder 42. This movable terminal can also be provided with a plurality of movable contact points at tips of the respective separate cantilevers.

The configuration described above has the advantage of dealing with a case where torsion is applied to the movable terminal 47 (48) along the axis extending parallel to the movable terminal 47 (48). This configuration can also prevent either of the two movable contact points 45a and 45b (46a and 46b), which both should come into contact with the respective fixed contact points 52b and 51b (54b and 53b), from failing to come into contact with the corresponding fixed contact point, as in the case described above.

Next, the details of the fixed terminal 512 (534) of the electromagnetic relay 100 according to the present embodiment are described below with reference to FIG. 15 to FIG. 19.

Figure 15:
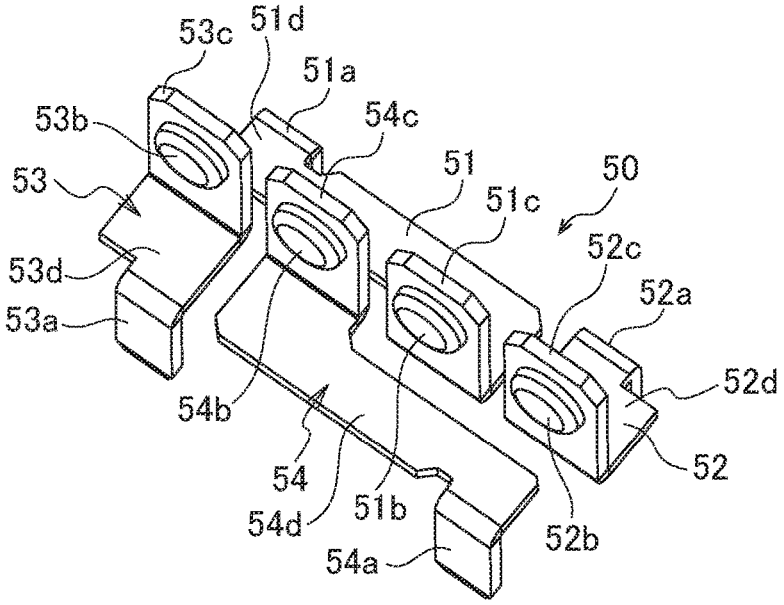
FIG. 15 is a perspective view of fixed terminals of the electromagnetic relay according to Embodiment 1 of the present invention.
Figure 16:
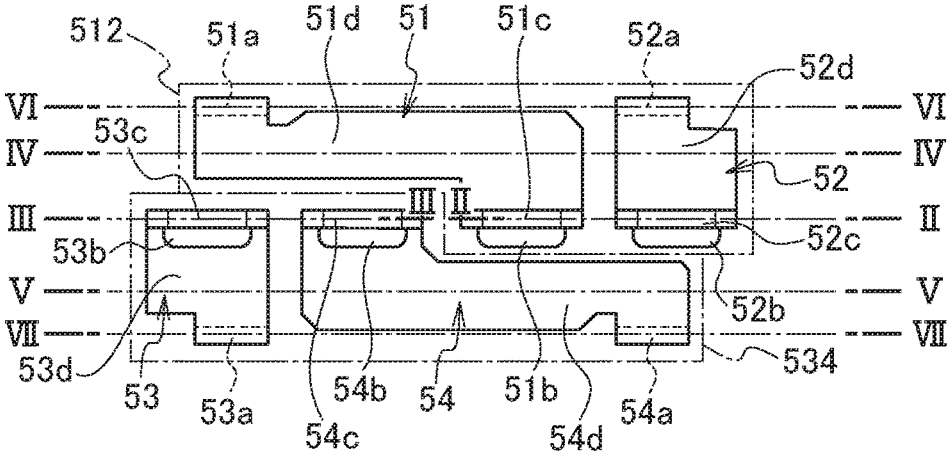
FIG. 16 is a plan view of the fixed terminals of the electromagnetic relay according to Embodiment 1 of the present invention.
Figure 17:
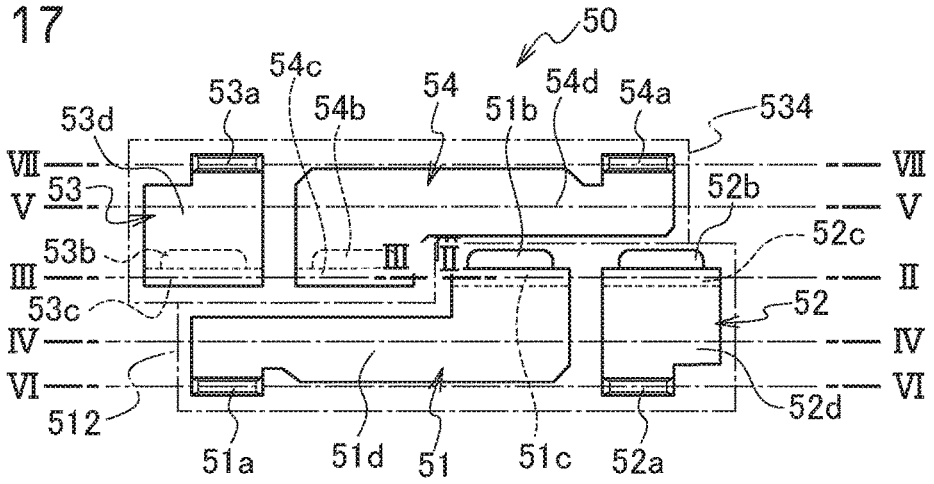
FIG. 17 is a bottom view of the fixed terminals of the electromagnetic relay according to Embodiment 1 of the present invention.

As shown in FIG. 15 to FIG. 17, the electromagnetic relay 100 of the present embodiment includes two pairs of the fixed terminals 512 and 534. The two pairs of the fixed terminals 512 and 534 are each formed of a metal having electrical conductivity equivalent to that of the movable terminal 47 (48) described above. The present embodiment is illustrated by the electromagnetic relay 100 including the two pairs of fixed terminals as an example of plural pairs of fixed terminals. Alternatively, the present embodiment may be illustrated by an electromagnetic relay including three pairs or more of fixed terminals. The electromagnetic relay according to the present embodiment may thus include plural pairs of fixed terminals.

As shown in FIG. 16 and FIG. 17, the fixed terminal 512 includes an external input/output terminal 51 and an external output/input terminal 52 electrically connected to the external input/output terminal 51. The external input/output terminal 51 and the external output/input terminal 52 are formed separately and paired with each other. The movable terminal 47 can electrically connect the paired external input/output terminal 51 and external output/input terminal 52.

As shown in FIG. 16 and FIG. 17, the fixed terminal 534 includes an external input/output terminal 53 and an external output/input terminal 54 electrically connected to the external input/output terminal 53. The movable terminal 48 can electrically connect the paired external input/output terminal 53 and external output/input terminal 54. The external input/output terminal 53 and the external output/input terminal 54 are formed separately and paired with each other.

As used herein, the external input/output terminal and the external output/input terminal are a pair of terminals (fixed terminals) that are electrically connected by the movable terminal. When one of the pair of the terminals serves as an external input terminal, the other serves as an external output terminal. When the one of the pair of the terminals serves as an external output terminal, the other serves as an external input terminal. One external terminal may serve as both an external input terminal and an external output terminal, regardless of whether the electromagnetic relay 100 is connected to an AC electrical circuit or a DC electrical circuit.

In the present embodiment as shown in FIG. 15 to FIG. 19, the fixed terminal 512 includes the external input/output terminal 51 and the external output/input terminal 52 composing a pair of terminals that can be electrically connected to each other. The fixed terminal 534 includes the external input/output terminal 53 and the external output/input terminal 54 composing a pair of terminals that can be electrically connected to each other.

As shown in FIG. 15 to FIG. 17, the external input/output terminal 51 includes a horizontal portion 51d extending straight and a tip portion 51a formed at one end of the horizontal portion 51d and extending downward from one side surface of the horizontal portion 51d (from one outer surface of the set of fixed terminals 50). The external input/output terminal 51 further includes a rising portion 51c formed at the other end of the horizontal portion 51d and extending upward from the other side surface of the horizontal portion 51d (from one inner surface of the set of fixed terminals 50), the rising portion 51c being provided with the fixed contact point 51b on the surface thereof.

As shown in FIG. 15 to FIG. 17, the external output/input terminal 52 includes a horizontal portion 52d and a tip portion 52a extending downward from one side surface of the horizontal portion 52d (the other outer surface of the set of fixed terminals 50).

The external output/input terminal 52 further includes a rising portion 52c extending upward from the other side surface of the horizontal portion 52d (from the other inner surface of the set of fixed terminals 50) and provided with the fixed contact point 52b on the surface thereof.

The horizontal portion 51d extends across a region in which the fixed contact points 51b, 54b and 53b are aligned, while the horizontal portion 52d is provided to correspond to the fixed contact point 52b.

Figure 18:
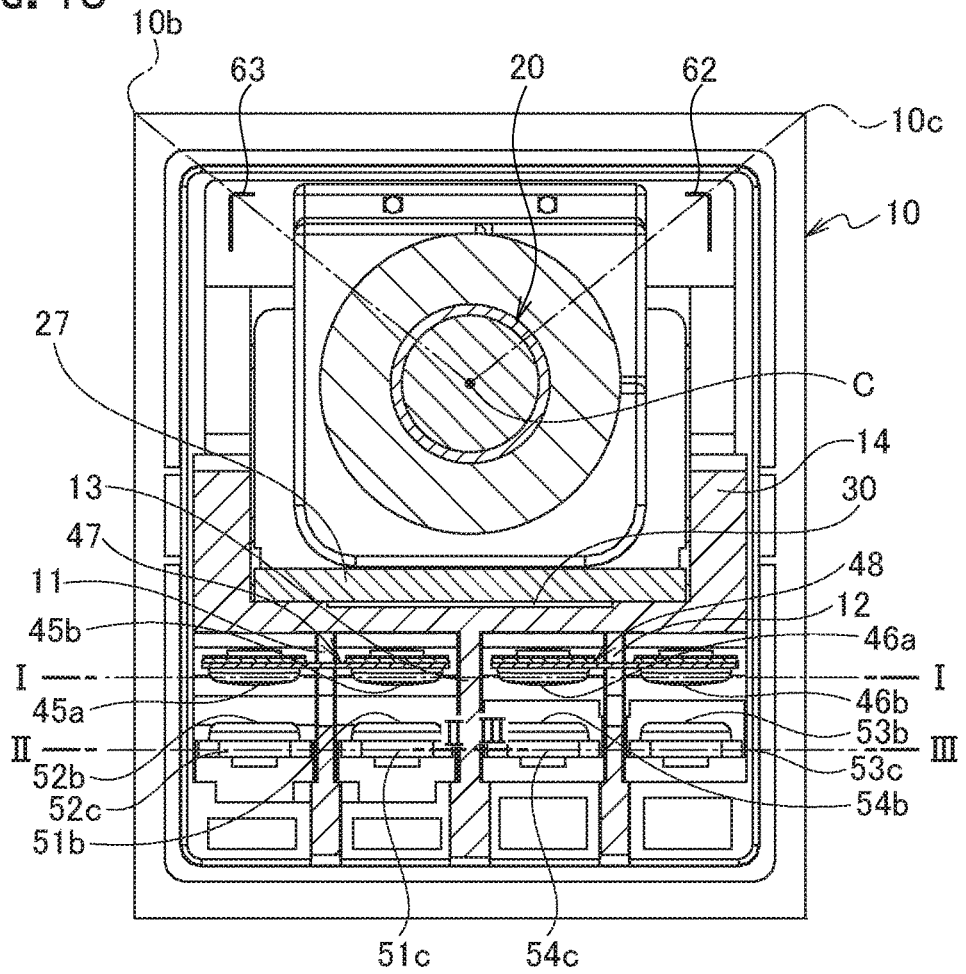
FIG. 18 is a horizontal cross-sectional view of the relay body of the electromagnetic relay according to Embodiment 1 of the present invention, in which the positions of an auxiliary external input/output terminal and an auxiliary external output/input terminal of an auxiliary fixed terminal are virtually shown so that the drawing can be used for describing the electromagnetic relays of both Embodiments 1 and 2.

As shown in FIG. 16 and FIG. 17, the rising portions 51c and 52c each extend on virtual straight line II. The horizontal portions 51d and 52d each extend on virtual straight line IV. The tip portions 51a and 52a each extend on virtual straight line VI. These virtual straight lines II, IV and VI are parallel or substantially parallel to virtual straight line I that defines the direction in which the fixed contact points 52b, 51b, 54b and 53b are aligned, as shown in FIG. 18. The virtual straight line II is located on the same straight line as virtual straight line III described below.

As shown in FIG. 15 to FIG. 17, the external input/output terminal 53 includes a horizontal portion 53d and a tip portion 53a extending downward from one side surface of the horizontal portion 53d. The external input/output terminal 53 further includes a rising portion 53c extending upward from the other side surface of the horizontal portion 53d and provided with the fixed contact point 53b on the surface thereof.

As shown in FIG. 15 to FIG. 17, the external output/input terminal 54 includes a horizontal portion 54d extending straight and a tip portion 54a formed at one end of the horizontal portion 54d and extending downward from one side surface of the horizontal portion 54d. The external output/input terminal 54 further includes a rising portion 54c formed at the other end of the horizontal portion 54d and extending upward from the other side surface of the horizontal portion 54d, the rising portion 54c being provided with the fixed contact point 54b on the surface thereof.

The horizontal portion 54d extends across a region in which the fixed contact points 54b, 51b and 52b are aligned, while the horizontal portion 53d is provided to correspond to the fixed contact point 53b.

As shown in FIG. 16 and FIG. 17, the rising portions 53c and 54c each extend on virtual straight line III. The horizontal portions 53d and 54d each extend on virtual straight line V. The tip portions 53a and 54a each extend on virtual straight line VII. These virtual straight lines III, V and VII are parallel or substantially parallel to the virtual straight line I that defines the direction in which the fixed contact points 52b, 51b, 54b and 53b are aligned, as shown in FIG. 18. The virtual straight line III is located on the same straight line as the virtual straight line II described above.

The one side surface of the horizontal portions 51d and 52d and the other side surface of the horizontal portions 53d and 54d are one outer surface of the set of fixed terminals 50 and the other outer surface of the set of fixed terminals 50, respectively. When the fixed terminal 512 and the fixed terminal 534 are viewed along the straight line including the virtual straight line II and the virtual straight line III, the rising portions 51c, 52c, 53c and 54c are aligned along the middle line. The paired tip portions 51a and 52a are located on one side of the middle line. The paired tip portions 53a and 54a are located on the other side of the middle line.

As shown in FIG. 15 to FIG. 17, the rising portions 51c, 52c, 53c and 54c are configured as follows.

The rising portions 52c and 53c are located on the outer side in the direction along the second and third virtual straight lines II and III. The rising portions 51c and 54c are located on the inner side in the direction along the second and third virtual straight lines II and III. The rising portions 51c and 54c arranged on the same straight line are interposed between the rising portion 52c and the rising portion 53c arranged on the same straight line. The rising portions 53c, 54c, 51c and 52c are aligned in this order.

The rising portion 51c and the tip portion 51a of the external input/output terminal 51 are arranged at a first interval in the direction in which the fixed contact points 53b, 54b, 51b and 52b are aligned in a plan view. The rising portion 51c and the tip portion 51a are arranged at a second interval in a direction vertical to the direction in which the fixed contact points 53b, 54b, 51b and 52b are aligned in a plan view. The rising portion 54c and the tip portion 54a of the external output/input terminal 54 are arranged at the same interval as the first interval in the direction in which the fixed contact points 53b, 54b, 51b and 52b are aligned in a plan view. The rising portion 54c and the tip portion 54a are arranged at the same interval as the second interval in the direction vertical to the direction in which the fixed contact points 53b, 54b, 51b and 52b are aligned in a plan view. Note that the first interval and the same interval as the first interval described above and the second interval and the same interval as the second interval described above are not essential features in the present invention, and the electromagnetic relay of the present invention includes a case where the respective intervals are different from each other.

The rising portion 52c and the tip portion 52a of the external output/input terminal 52 are not offset in the direction in which the fixed contact points 53b, 54b, 51b and 52b are aligned in a plan view. Namely, the rising portion 52c and the tip portion 52a are arranged to face each other in the direction vertical to the direction in which the fixed contact points 53b, 54b, 51b and 52b are aligned in a plan view. The rising portion 53c and the tip portion 53a of the external input/output terminal 53 are not offset in the direction in which the fixed contact points 53b, 54b, 51b and 52b are aligned in a plan view. Namely, the rising portion 53c and the tip portion 53a are arranged to face each other in the direction vertical to the direction in which the fixed contact points 53b, 54b, 51b and 52b are aligned in a plan view.

The tip portion 51a of the external input/output terminal 51 is located on one outer side on the virtual line VI based on a position opposed to the rising portions 51c and 54c. The tip portion 52a of the external output/input terminal 52 is paired with the tip portion 51a of the external input/output terminal 51. The tip portion 52a of the external output/input terminal 52 is located on the other outer side on the virtual line VI opposite to the one outer side based on the position opposed to the rising portions 51c and 54c. The tip portion 53a of the external input/output terminal 53 is located on one outer side on the virtual line VII based on the position opposed to the rising portions 51c and 54c. The tip portion 54a of the external output/input terminal 54 is paired with the tip portion 53a of the external input/output terminal 53. The tip portion 54a of the external output/input terminal 54 is located on the other outer side on the virtual line VII opposite to the one outer side based on the position opposed to the rising portions 51c and 54c.

As shown in FIG. 16 and FIG. 17, the fixed terminals 512 and 534 have point symmetry in both a plan view and a bottom view. The external input/output terminal 51 and the external output/input terminal 54 have point symmetry and have the same shape. The external output/input terminal 52 and the external input/output terminal 53 have point symmetry and have the same shape. This configuration only requires two molds for manufacturing the four terminals.

As shown in FIG. 18, when the electromagnetic relay 100 is in an OFF state, the movable contact points 45a, 45b, 46a and 46b are opposed to the fixed contact points 52b, 51b, 54b and 53b, respectively. FIG. 18 shows virtual positions of an auxiliary external input/output terminal 62 and an auxiliary external output/input terminal 63 of an auxiliary fixed terminal 6243 of the electromagnetic relay 100 according to Embodiment 2. The present embodiment 1 does not include the auxiliary external input/output terminal 62 or the auxiliary external output/input terminal 63.

Figure 19:
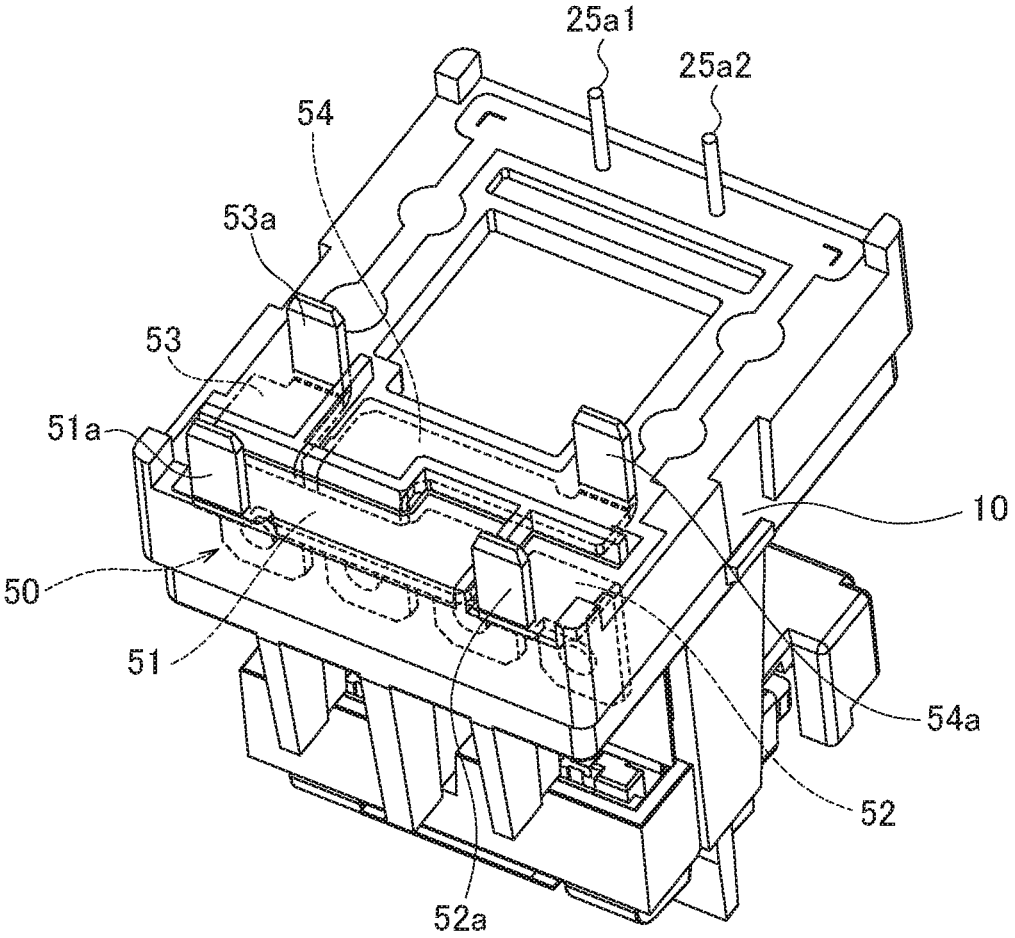
FIG. 19 is a perspective view showing the bottom surface of the electromagnetic relay according to Embodiment 1 of the present invention.
Figure 20:
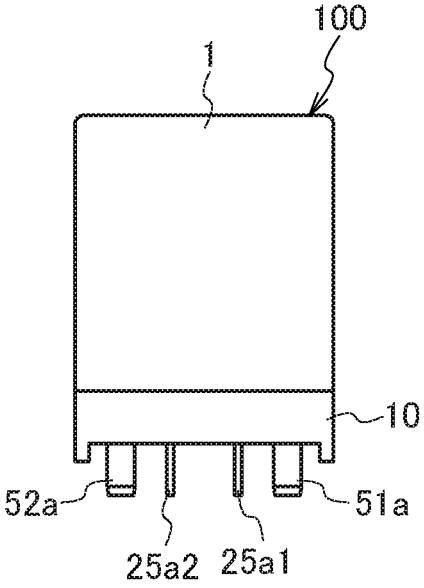
FIG. 20 is a front view of the electromagnetic relay according to Embodiment 1 of the present invention.
Figure 21:
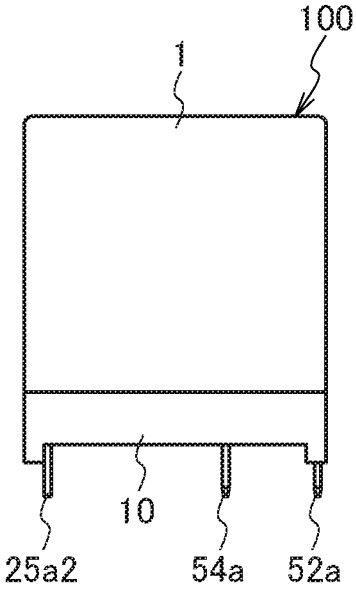
FIG. 21 is a side view of the electromagnetic relay according to Embodiment 1 of the present invention.
Figure 22:
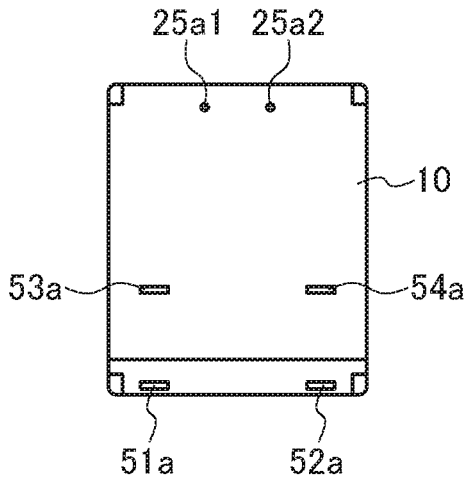
FIG. 22 is a bottom view of the electromagnetic relay according to Embodiment 1 of the present invention.

As shown in FIG. 19 to FIG. 22, the tip portions 51a and 53a of the external input/output terminals 51 and 53 and the tip portions 52a and 54a of the external output/input terminals 52 and 54 project from the bottom surface, namely, the lower surface of the bottom plate 9 of the body 10. As shown in FIG. 19 to FIG. 22, the coil terminals 25a1 and 25a2 also penetrate the bottom plate 9 of the body 10 and project from the lower surface of the body 10. In particular, as shown in FIG. 19, the tip portions 51a, 52a, 53a and 54a project from the bottom surface of the body 10 in a direction vertical to the bottom surface (downward).

Figure 23:
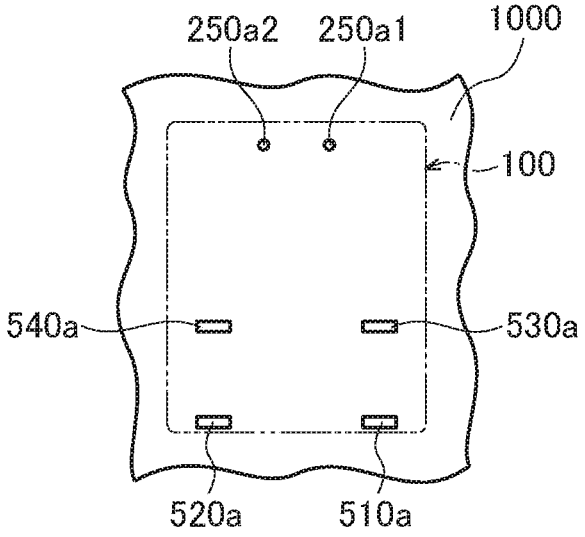
FIG. 23 is a schematic view partially showing a printed wiring board on which the electromagnetic relay according to Embodiment 1 of the present invention is mounted.

As shown in FIG. 23, a printed wiring board 1000 on which the electromagnetic relay 100 is installed is provided with insertion holes 250a1 and 250a2. The insertion holes 250a1 and 250a2 are located at positions corresponding to the coil terminals 25a1 and 25a2. When the electromagnetic relay 100 is installed on the printed wiring board 1000, the coil terminals 25a1 and 25a2 are inserted into the insertion holes 250a1 and 250a2. The printed wiring board 1000 is further provided with insertion holes 510a, 520a, 530a and 540a. The insertion holes 510a, 520a, 530a and 540a in the printed wiring board 1000 are located at positions corresponding to the tip portions 51a, 52a, 53a and 54a of the fixed terminals 51, 52, 53 and 54, respectively. The tip portions 51a, 52a, 53a and 54a are inserted into the insertion holes 510a, 520a, 530a and 540a, respectively.

The electromagnetic relay 100 according to the present embodiment includes the fixed terminal 512 (534) having the structure shown in each of FIG. 15 to FIG. 24. The tip portions 51a, 52a, 53a and 54a can be arranged in the following manner. The electromagnetic relay 100 has the advantageous effects described below.

As shown in FIG. 16 and FIG. 17, the tip portion 51a and the tip portion 52a are located on the virtual straight line VI and parallel to the opposed sides of the outline of the rectangular bottom surface of the body 10. As shown in FIG. 16 and FIG. 17, the tip portion 53a and the tip portion 54a are located on the virtual straight line VII parallel to the virtual straight line VI. The tip portion 53a and the tip portion 54a are located parallel to the opposed sides of the outline of the rectangular bottom surface of the body 10.

As shown in FIG. 16 and FIG. 17, the tip portions 51a and 53a of the external input/output terminals 51 and 53 paired with the tip portions 52a and 54a of the external output/input terminals 52 and 54, respectively, are aligned along the respective straight lines (sixth virtual straight line VI, seventh virtual straight line VII) substantially parallel to the virtual straight lines (second and third virtual straight lines II and III) in a plan view. The straight line VI on which the paired tip portions 51a and 52a are located is offset from the straight line VII on which the paired tip portions 53a and 54a are located in a direction vertical to the virtual lines II and III in a plan view.

Figure 24:
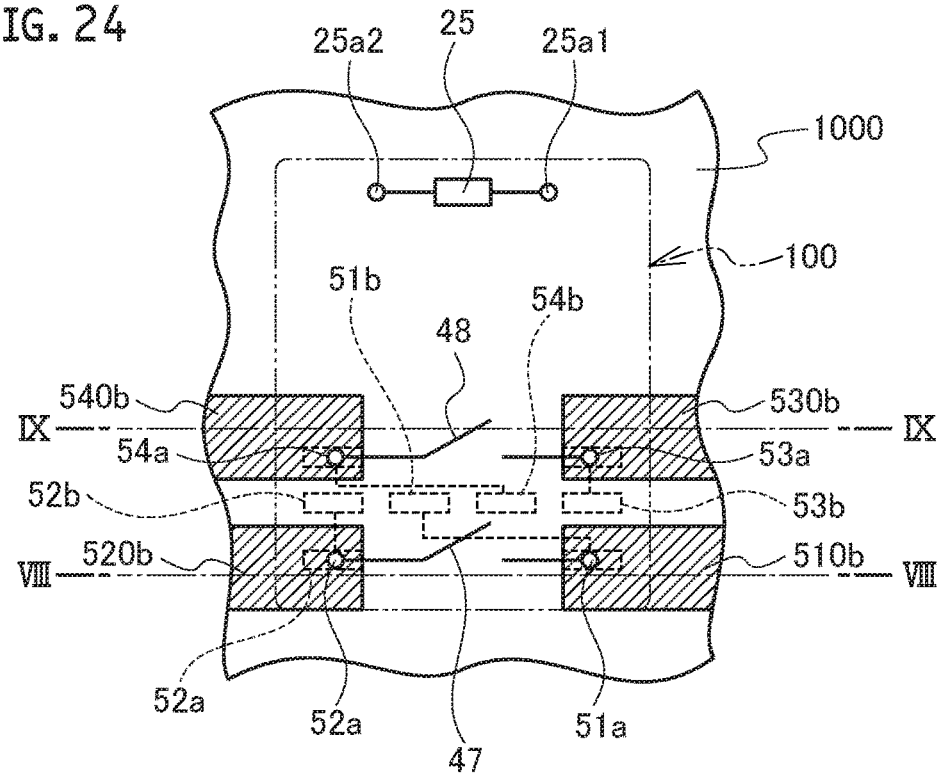
FIG. 24 is a schematic view of a wiring pattern in the printed wiring board equipped with the electromagnetic relay according to Embodiment 1 of the present invention.

As shown in FIG. 24, the tip portion 51a of the external input/output terminal 51 and the tip portion 52a of the external output/input terminal 52 are a pair of external terminals that can be electrically connected to each other. The tip portion 53a of the external input/output terminal 53 and the tip portion 54a of the external output/input terminal 54 are a pair of external terminals that can be electrically connected to each other. The respective pairs of the external terminals can be electrically connected to each other by the movable terminals 47 and 48 entirely housed in the cover 1 (not projecting outside the cover 1).

The arrangement of the tip portions 51a, 52a, 53a and 54a described above can provide input/output wiring 510b and 530b and output/input wiring 520b and 540b on the printed wiring board 1000, as shown in FIG. 24. On the printed wiring board 1000 shown in FIG. 24, the input/output wiring 510b and the output/input wiring 520b extend along virtual straight line VIII. The input/output wiring 530b and the output/input wiring 540b extend along virtual straight line IX parallel to the virtual straight line VIII. The input/output wiring 510b and 530b paired with the output/input wiring 520b and 540b extend parallel to each other. Namely, the virtual straight line VIII and the virtual straight line IX shown in FIG. 24 are parallel or substantially parallel to each other. Accordingly, as shown in FIG. 24, the electromagnetic relay 100 of the present embodiment can include multiple input/output wiring (output/input wiring) parallel to each other in the short-side direction of the printed wiring board 1000.

The configuration described above can achieve an orderly arrangement of the entire wiring including additional wiring on the printed wiring board 1000. For example, as shown in FIG. 24, paired wiring connected to the respective coil terminals 25a1 and 25a2 can be arranged parallel to the paired input/output wiring 510b (530b) and output/input wiring 520b (540b). Since all wiring in the electromagnetic relay 100 is parallel to each other, a remarkably orderly arrangement of the input/output wiring and the output/input wiring can be achieved on the printed wiring board 1000. Accordingly, the space necessary for the wiring can be reduced to provide a space-saving wiring pattern (reduce an area of the wiring pattern covering the surface of the printed wiring board 1000).

In addition to the configuration described above, as shown in FIG. 24, the tip portion 51a and the tip portion 52a are located adjacent to the respective opposed sides of the substantially rectangular bottom surface of the body 10 of the electromagnetic relay 100. The tip portion 53a and the tip portion 54a are located adjacent to the respective opposed sides of the substantially rectangular bottom surface of the body 10 of the electromagnetic relay 100. This shortens the length of the input/output wiring and the output/input wiring on the printed wiring board 1000 on which the electromagnetic relay 100 is placed. Accordingly, the risk of breakage of the input/output wiring and the output/input wiring is minimized A comparison is made below between the electromagnetic relay and the wiring pattern on the printed wiring board shown in FIG. 24 and those shown in FIG. 25 which is a comparative example. The tip portions of the four fixed terminals projecting from the bottom surface of the body 10 of the comparative example are assumed to be formed as follows. The four tip portions 52a, 51a, 54a and 53a each penetrate and project from the bottom plate 9 of the body 10 at positions adjacent to a side of the bottom surface of the body 10 closer to the fixed contact points 52b, 51b, 54b and 53b shown in FIG. 18.

Figure 25:
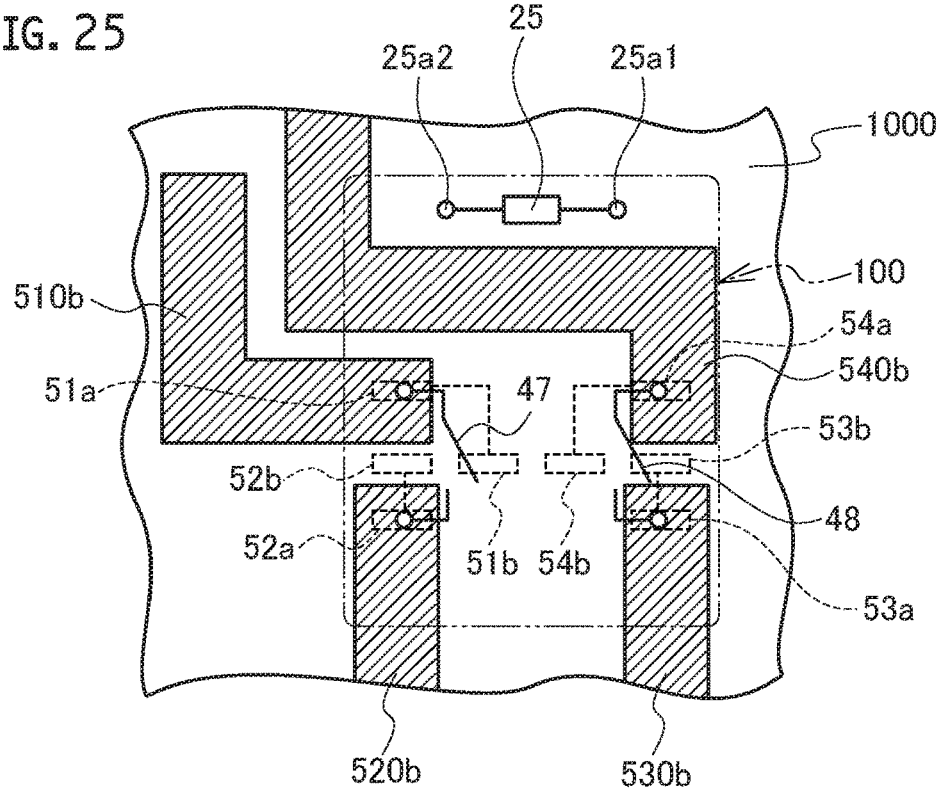
FIG. 25 is a schematic view of a first comparative example of a wiring pattern in a printed wiring board equipped with an electromagnetic relay of a comparative example.
Figure 26:
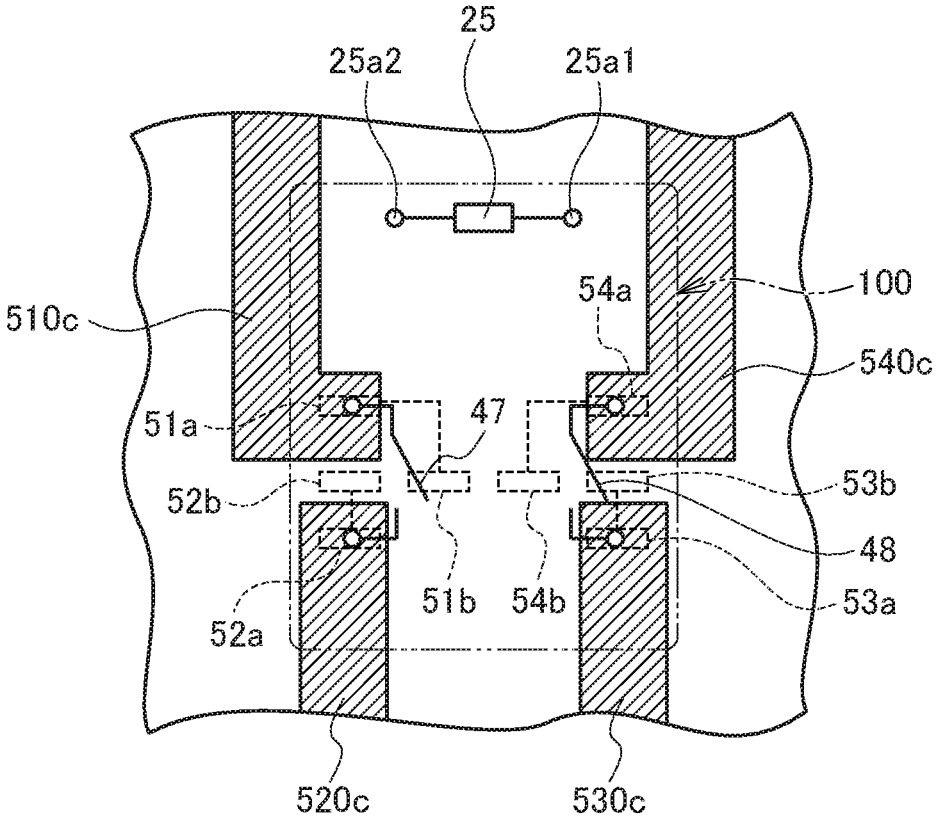
FIG. 26 is a schematic view of a second comparative example of the wiring pattern in the printed wiring board equipped with the electromagnetic relay of the comparative example.
Figure 27:
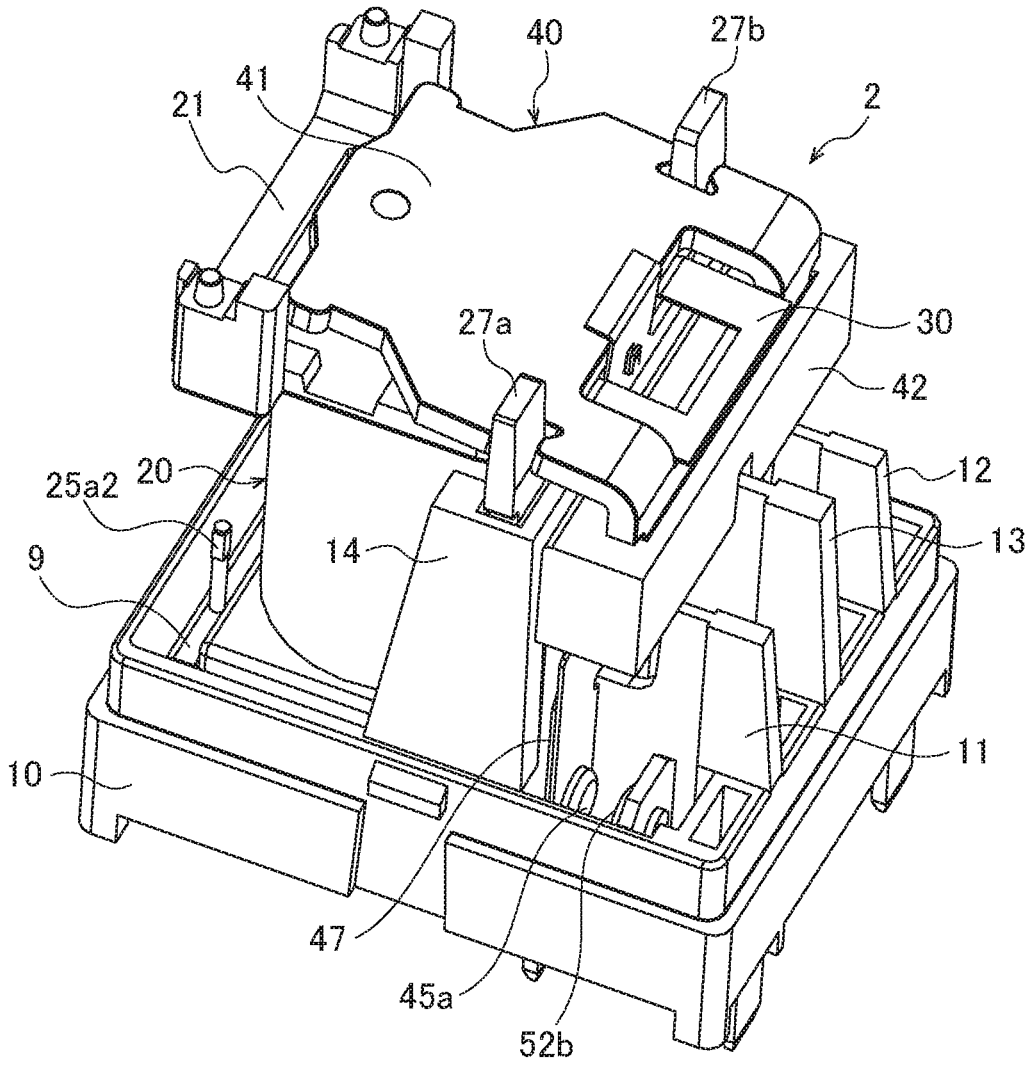
FIG. 27 is a perspective view showing a state where the movable terminals and the fixed terminals of the electromagnetic relay according to Embodiment 1 of the present invention are not in contact with each other (OFF state).
Figure 28:
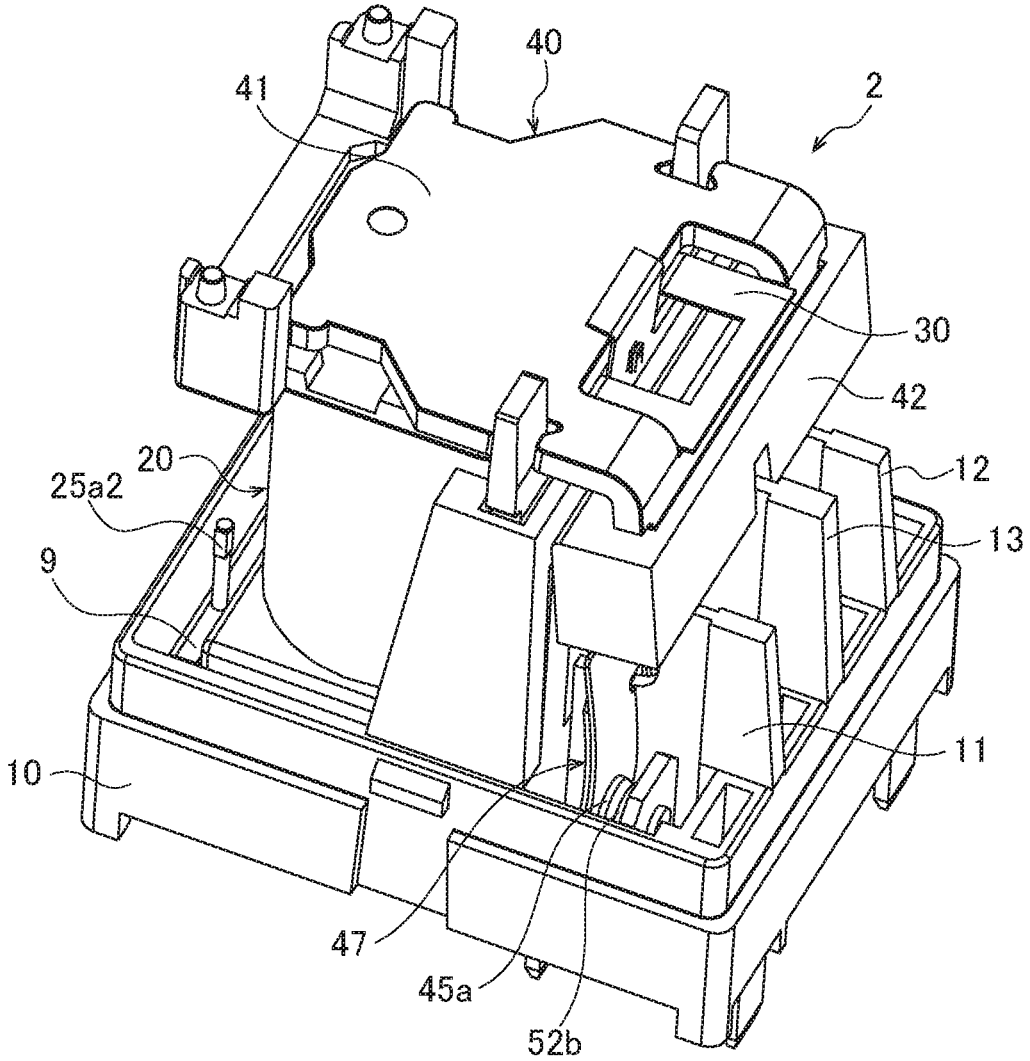
FIG. 28 is a perspective view showing a state where the movable terminals and the fixed terminals of the electromagnetic relay according to Embodiment 1 of the present invention are in contact with each other (ON state).

Comparative examples of wiring shown in FIG. 25 and FIG. 26 are described below, each showing the electromagnetic relay including the four tip portions 52a, 51a, 54a and 53a and installed on the printed wiring board 1000. A pair of the input/output wiring 510b (530b) and output/input wiring 520b (540b) are assumed to be arranged to extend in the long-side direction of the printed wiring board 100, as shown in FIG. 25 or FIG. 26. It is apparent that the arrangement of the pair of the input/output wiring 510b (530b) and output/input wiring 520b (540b) is not well-organized compared with that of the input/output wiring 510b (530b) and the output/input wiring 520b (540b) shown in FIG. 24.

The arrangement of the tip portions 51a, 52a, 53a and 54a of the present embodiment therefore has the advantageous effects as described above.

Next, the operations of the electromagnetic relay 100 according to the present embodiment are described below with reference to FIG. 18, FIG. 24, FIG. 27 and FIG. 28.

In the electromagnetic relay 100 of the present embodiment, when an AC current passes through the pair of coil terminals 25a1 and 25a2, the AC current flows through the winding 25 of the electromagnet 20. The electromagnetic relay 100 is then switched from an OFF state shown in FIG. 27 to an ON state shown in FIG. 28.

During the OFF state, as shown in FIG. 18, the movable contact points 45a, 45b, 46a and 46b of the movable terminals 47 and 48 are not in contact with the fixed contact points 52a, 51a, 54a and 53a of the fixed terminals 512 and 534. As shown in FIG. 24, the current does not flow between the tip portion 51a and the tip portion 52a of the fixed terminal 512 or between the tip portion 53a and the tip portion 54a of the fixed terminal 534. During the ON state, the movable contact points 45a, 45b, 46a and 46b of the movable terminals 47 and 48 are in contact with the fixed contact points 52a, 51a, 54a and 53a of the fixed terminals 512 and 534, respectively. The current thus flows between the tip portion 51a and the tip portion 52 of the fixed terminal 512 and between the tip portion 53a and the tip portion 54a of the fixed terminal 534, as shown in FIG. 24.

(I) The configurations and effects of the electromagnetic relay 100 according to a first aspect of Embodiment 1 described above are summarized as follows.

(1) The electromagnetic relay 100 includes the following features (i) to (x):

(i) The fixed terminal 512 including the external input/output terminal 51 and the external output/input terminal 52 that can be electrically connected to the external input/output terminal 51;

(ii) the movable terminal 47 that can electrically connect the external input/output terminal 51 and the external output/input terminal 52;

(iii) the other fixed terminal 534 including the other external input/output terminal 53 and the other external output/input terminal 54 that can be electrically connected to the other external input/output terminal 53;

(iv) the other movable terminal 48 that can electrically connect the other external input/output terminal 53 and the other external output/input terminal 54;

(v) the armature 41 that moves the movable terminal 47 and the other movable terminal 48 so as to switch the movable terminal 47 between electrical connection and disconnection with respect to the respective input/output terminal 51 and external output/input terminal 52 and switch the other movable terminal 48 between electrical connection and disconnection with respect to the respective other external input/output terminal 53 and other external output/input terminal 54;

(vi) the electromagnet 20 that generates electromagnetic force for driving the armature 41 to move the movable terminal 47 and the other movable terminal 48; and (vii) the body 10 having the bottom plate 9 from which the tip portion 51a of the external input/output terminal 51, the tip portion 52a of the external output/input terminal 52, the tip portion 53a of the other external input/output terminal 53 and the tip portion 54a of the other external output/input terminal 54 project outward, the bottom plate 9 directly or indirectly supporting the armature 41 and the electromagnet 20;

(viii) wherein the movable contact points 45a and 45b of the movable terminal 47 and the movable contact points 46a and 46b of the other movable terminal 48 are aligned along the first virtual straight line I (refer to FIG. 18) in a plan view and move in a direction crossing the virtual straight line I;

(ix) wherein the rising portion 51c provided with the one fixed contact point 51b of the fixed terminal 512 and the rising portion 52c provided with the other fixed contact point 52b of the fixed terminal 512 each extend on the second virtual straight line II (refer to FIGS. 16, 17 and 18) parallel to the first virtual straight line I (refer to FIG. 18) in a plan view; and (x) wherein the rising portion 54c provided with the one fixed contact point 54b of the other fixed terminal 534 and the rising portion 53c provided with the other fixed contact point 53b of the other fixed terminal 534 each extend on the third virtual straight line III (refer to FIGS. 16, 17 and 18) parallel to the first virtual straight line I (refer to FIG. 18) in a plan view.

In the present embodiment, the second virtual straight line II and the third virtual straight line III are present on the same straight line.

(xi) The horizontal portion 51d of the external input/output terminal 51 of the fixed terminal 512 and the horizontal portion 52d of the external output/input terminal 52 of the fixed terminal 512 each extend on the fourth virtual straight line IV (refer to FIGS. 16 and 17) parallel to the first virtual straight line I (refer to FIG. 18) and extend from the rising portion 51c and the rising portion 52c along the bottom surface of the body 10 in a plan view;

(xii) the horizontal portion 53d of the external input/output terminal 53 of the other fixed terminal 534 and the horizontal portion 54d of the external output/input terminal 54 of the other fixed terminal 534 each extend on the fifth virtual straight line V (refer to FIGS. 16 and 17) parallel to the first virtual straight line I (refer to FIG. 18) and extend from the rising portion 53c and the rising portion 54c along the bottom surface of the body 10 in a plan view;

(xiii) the tip portion 51a and the tip portion 52a of the fixed terminal 512 are arranged at a predetermined interval on the sixth virtual straight line VI (refer to FIGS. 16 and 17) parallel to the first virtual straight line I (refer to FIG. 18) in a plan view and extend downward from the horizontal portion 51d of the external input/output terminal 51 and the horizontal portion 52d of the external output/input terminal 52; and (xiv) the tip portion 53a and the tip portion 54a of the other fixed terminal 534 are arranged at a predetermined interval on the seventh virtual straight line VII (refer to FIGS. 16 and 17) parallel to the first virtual straight line I (refer to FIG. 18) in a plan view and extend downward from the horizontal portion 53d of the other external input/output terminal 53 and the horizontal portion 54d of the other external output/input terminal 54.

The configurations described above can provide an orderly wiring arrangement on the printed wiring board as described below.

Preferably, the tip portion 51a of the external input/output terminal 51, the tip portion 52a of the external output/input terminal 52, the tip portion 53a of the other external input/output terminal 53 and the tip portion 54a of the other external output/input terminal 54 are located at the four corners of a virtual rectangle. This allows the plural tip portions 51a, 52a, 53a and 54a to be arranged orderly.

When the bottom surface (the lower surface) of the body 10 has a substantially rectangular outline, the tip portion 51a and the tip portion 52a are preferably located adjacent to the respective opposed sides of the rectangular bottom surface of the body 10. The tip portion 53a and the tip portion 54a are also preferably located adjacent to the respective opposed sides of the rectangular bottom surface of the body 10. This shortens the length of the wiring on which the electromagnetic relay 100 is placed, so as to minimize the risk of breakage of the input/output wiring and the output/input wiring.

As used herein, the term "substantially rectangular" is meant to encompass a shape that can entirely be recognized as a rectangle when the segments composing most of the respective sides extend, such as a rectangle having slightly round corners.

(2) The fixed terminal 512 and the other fixed terminal 534 preferably have point symmetry in a plan view and have the same thickness in a direction vertical to the plan surface.

This configuration allows the fixed terminal 512 and the other fixed terminal 534 to be manufactured with the same metal mold.

The fixed terminal and the other fixed terminal are only required to be designed to have point symmetry and the same thickness, and do not necessarily exactly have point symmetry or the same thickness on the assumption that there may be unavoidable errors in shape and thickness during manufacture.

(3) The connection structure of the present embodiment includes the printed wiring board 1000 equipped with the electromagnetic relay 100. The printed wiring board 1000 includes the following sections of wiring (i) to (iv):

(i) The input/output wiring 510b electrically connected with the external input/output terminal 51;

(ii) the output/input wiring 520b electrically connected with the external output/input terminal 52;

(iii) the other input/output wiring 530b electrically connected with the other external input/output terminal 53; and (iv) the other output/input wiring 540b electrically connected with the other external output/input terminal 54, wherein the input/output wiring 510b and the output/input wiring 520b each extend on the eighth virtual straight line VIII (refer to FIG. 24) parallel to the first virtual straight line I (refer to FIG. 18), and the other input/output wiring 530b and the other output/input wiring 540b each extend on the ninth virtual straight line IX (refer to FIG. 24) parallel to the first virtual straight line I (refer to FIG. 18).

This configuration allows the input/output wiring 510b, 530b and the output/input wiring 520b, 540b to be arranged orderly on the printed wiring board 1000.

(II) The configurations and effects of the electromagnetic relay 100 according to a second aspect of Embodiment 1 described above are summarized as follows.

(1) The electromagnetic relay 100 includes the following features (i) to (viii):

(i) The fixed terminal 512 (534) including the external input/output terminal 51 (53) and the external output/input terminal 52 (54) that can be electrically connected to the external terminal;

(ii) the movable terminal 47 (48) that can electrically connect the external input/output terminal 51 (53) and the external output/input terminal 52 (54);

(iii) the armature 41 that moves the movable terminal 47 (48) so as to switch the movable terminal 47 (48) between electrical connection and disconnection with respect to the respective input/output terminal 51 (53) and external output/input terminal 52 (54);

(iv) the electromagnet 20 that generates electromagnetic force for driving the armature 41 to move the movable terminal 47 (48);

(v) the holder 42 that fixes the movable terminal 47 (48) to the armature 41;

(vi) the first cantilever 43a1 (44a1) of the movable terminal 47 (48) that is moved by the armature 41 and bent around the holder 42 serving as a fixed end, so as to be electrically connected to the external input/output terminal 51 (53);

(vii) the second cantilever 43a2 (44a2) of the movable terminal 47 (48) that is elastically deformed separately from the first cantilever 43a1 (44a1), moved by the armature 41 and bent around the holder 42 serving as a fixed end, so as to be electrically connected to the external output/input terminal; and (viii) the first-second cantilever connecting portion 43a3 (44a3) of the movable terminal 47 (48) that physically connects the end of the first cantilever 43a1 (44a1) on the fixed end side and the end of the second cantilever 43a2 (44a2) on the fixed end side and electrically connects the first cantilever 43a1 (44a1) and the second cantilever 43a2 (44a2).

According to the configurations described above, the first cantilever 43a1 (44a1) and the second cantilever 43a2 (44a2) are elastically deformed separately from each other when torsion is applied to the movable terminal 47 (48) in a plan view. This prevents a failure in contact between the movable terminal 47 (48) and the fixed terminal 512 (534) when the torsion is applied to the movable terminal 47 (48)

in a plan view. Namely, a failure in contact between any of the movable contact points 45a, 45b, 46a and 46b and the corresponding fixed contact points 52b, 51b, 54b and 53b is prevented when the electromagnetic relay 100 is in an ON state.

(2) The electromagnetic relay 100 preferably includes the insulating wall 11 (12) provided between the first cantilever 43a1 (44a1) and the second cantilever 43a2 (44a2).

This configuration can minimize electromagnetic interference between the first cantilever 43a1 (44a1) and the second cantilever 43a2 (44a2). Therefore, the first cantilever 43a1 (44a1) and the second cantilever 43a2 (44a2) can be arranged closer to each other. Accordingly, the width of each of the first cantilever 43a1 (44a1) and the second cantilever 43a2 (44a2) can be increased, whereas an increase of the entire width occupied by the first cantilever 43a1 (44a1) and the second cantilever 43a2 (44a2) is prevented.

(III) The configurations and effects of the electromagnetic relay 100 according to a third aspect of Embodiment 1 described above are summarized as follows.

(1) The electromagnetic relay 100 includes the following features (i) to (x):

(i) The fixed terminal 512 (534) including the external input/output terminal 51 (53) and the external output/input terminal 52 (54) that can be electrically connected to the external terminal;

(ii) the movable terminal 47 (48) that can electrically connect the external input/output terminal 51 (53) and the external output/input terminal 52 (54);

(iii) the armature 41 that moves the movable terminal 47 (48) so as to switch the movable terminal 47 (48) between electrical connection and disconnection with respect to the respective input/output terminal 51 (53) and external output/input terminal 52 (54);

(iv) the electromagnet 20 that generates electromagnetic force for driving the armature 41 to move the movable terminal 47 (48);

(v) the holder 42 that fixes the movable terminal 47 (48) to the armature 41;

(vi) the first cantilever 43a1 (44a1) of the movable terminal 47 (48) that is moved by the armature 41 so as to be deflected around the holder 42 serving as a fixed end;

(vii) the second cantilever 43a2 (44a2) of the movable terminal 47 (48) that is elastically deformed separately from the first cantilever 43a1 (44a1) and moved by the armature 41 so as to be deflected around the holder 42 serving as a fixed end;

(viii) the third cantilever 43b1 (44b1) of the movable terminal 47 (48) that is in contact with the first cantilever 43a1 (44a1) and extends along the first cantilever 43a1 (44a1);

(ix) the fourth cantilever 43b2 (44b2) of the movable terminal 47 (48) that is in contact with the second cantilever 43a2 (44a2) and extends along the second cantilever 43a2 (44a2); and (x) the third-fourth cantilever connecting portion 43b3 (44b3) that physically connects the end of the third cantilever 43b1 (44b1) on the fixed end side and the end of the fourth cantilever 43b2 (44b2) on the fixed end side and electrically connects the third cantilever 43b1 (44b1) and the fourth cantilever 43b2 (44b2).

In the configurations described above, the first composite cantilever 43ab1 (44ab1) is composed of the first cantilever 43a1 (44a1) and the third cantilever 43b1 (44b1). The second composite cantilever 43ab2 (44ab2) is composed of the second cantilever 43a2 (44a2) and the fourth cantilever 43b2 (44b2).

The first composite cantilever 43ab1(44ab1) and the second composite cantilever 43ab2 (44ab2) are elastically deformed independently from each other when torsion is applied to the movable terminal 47 (48) in a plan view. This configuration can prevent a failure in contact between the movable terminal 47 (48) and the fixed terminal 512 (534) when the torsion is applied to the movable terminal 47 (48) in a plan view.

(2) The first cantilever 43a1 (44a1) and the second cantilever 43a2 (44a2) preferably have a higher modulus of elasticity than the third cantilever 43b1 (44b1), the fourth cantilever 43b2 (44b2), and the third-fourth cantilever connecting portion 43b3 (44b3).

The first composite cantilever 43ab1(44ab1) and the second composite cantilever 43ab2 (44ab2) can therefore each flexibly change its attitude with respect to the holder 42.

(3) The third cantilever 43b1 (44b1), the fourth cantilever 43b2 (44b2) and the third-fourth cantilever connecting portion 43b3 (44b3) preferably have higher electrical conductivity than the first cantilever 43a1 (44a1) and the second cantilever 43a2 (44a2).

The entire electrical conductivity of the first composite cantilever 43ab1(44ab1) and the second composite cantilever 43ab2 (44ab2) can therefore be improved.

(4) When the items (2) and (3) described above are satisfied, the movable terminal 47 (48) can achieve both higher modulus of elasticity and higher electrical conductivity than a case where the movable terminal only includes a single cantilever member.

(5) The electromagnetic relay 100 preferably includes the first-second cantilever connecting portion 43a3 (44a3) of the movable terminal 47 (48) that physically connects the end of the first cantilever 43a1 (44a1) on the fixed end side and the end of the second cantilever 43a2 (44a2) on the fixed end side so as to electrically connect the first cantilever 43a1 (44a1) and the second cantilever 43a2 (44a2).

The configuration described above provides a first electrical conductive path including the first cantilever 43a1 (44a1), the second cantilever 43a2 (44a2) and the first-second cantilever connecting portion 43a3 (44a3). The configuration further provides a second electrical conductive path including the third cantilever 43b1 (44b1), the fourth cantilever 43b2 (44b2) and the third-fourth cantilever connecting portion 43b3 (44b3). Thus, a composite electrical conductive path is provided in which the first electrical conductive path and the second electrical conductive path are combined together. Accordingly, the cross section of the electrical conductive path increases so as to improve electrical conductivity of the movable terminal 47 (48).

(6) The electromagnetic relay 100 includes the first composite cantilever 43ab1 (44ab1) including the first cantilever 43a1 (44a1) and the third cantilever 43b1 (44b1). The electromagnetic relay 100 further includes the second composite cantilever 43ab2 (44ab2) including the second cantilever 43a2 (44a2) and the fourth cantilever 43b2 (44b2). The insulating wall 11 (12) is preferably interposed between the first composite cantilever 43ab1 (44ab1) and the second composite cantilever 43ab2 (44ab2).

This configuration can minimize electromagnetic interference between the first composite cantilever 43ab1 (44ab1) and the second composite cantilever 43ab2 (44ab2). Therefore, the first composite cantilever 43ab1 (44ab1) and the second composite cantilever 43ab2 (44ab2) can be aligned closer to each other. Accordingly, the width of each of the first composite cantilever 43ab1 (44ab1) and the second composite cantilever 43ab2 (44ab2) can be increased. This configuration also has the effect of preventing an increase of the entire width occupied by the first composite cantilever 43ab1 (44ab1) and the second composite cantilever 43ab2 (44ab2).

(7) In the electromagnetic relay 100, the first movable contact point 45a (46a) may be provided on the third cantilever 43b1 (44b1). The first movable contact point 45a (46a) may be opposed to the first fixed contact point 52b (54b) provided on the external output/input terminal 52 (54) of the fixed terminal 512 (534) so as to come into contact with the first fixed contact point 52b (54b). The second movable contact point 45b (46b) may be provided on the fourth cantilever 43b2 (44b2). The second movable contact point 45b (46b) may be opposed to the second fixed contact point 51b (53b) provided on the external input/output terminal 51 (53) of the fixed terminal 512 (534) so as to come into contact with the second fixed contact point 51b (53b).

According to the configuration described above, the third cantilever 43b1 (44b1) having relatively high electrical conductivity is located closer to the first movable contact point 45a (46a) and the first fixed contact point 52b (54b) than the first cantilever 43a1 (44a1) having relatively low electrical conductivity. Accordingly, a heating value in the first composite cantilever 43ab1 (44ab1) including the first cantilever 43a1 (44a1) and the third cantilever 43b1 (44b1) can be reduced as compared with a case having a configuration opposite to that described above.

The fourth cantilever 43b2 (44b2) having relatively high electrical conductivity is located closer to the second movable contact point 45b (46b) and the second fixed contact point 51b (53b) than the second cantilever 43a2 (44a2) having relatively low electrical conductivity. Accordingly, a heating value in the second composite cantilever 43ab2 (44ab2) including the second cantilever 43a2 (44a2) and the fourth cantilever 43b2 (44b2) can be reduced as compared with a case having a configuration opposite to that described above.

Alternatively, the present invention may have a configuration in which the first movable contact point 45a (46a) is provided on the first cantilever 43a1 (44a1), and the second movable contact point 45b (46b) is provided on the second cantilever 43a2 (44a2).

The width of the first cantilever 43a1 (44a1) is the same as the width of the third cantilever 43b1 (44b1). The width of the second cantilever 43a2 (44a2) is the same as the width of the fourth cantilever 43b2 (44b2). The present invention is, however, not limited to the configuration in which the respective widths are the same.

Embodiment 2

The electromagnetic relay 100 according to Embodiment 2 of the present invention will hereinafter be described with reference to FIG. 29 to FIG. 45. The electromagnetic relay 100 of the present embodiment has substantially the same fundamental configurations as the electromagnetic relay 100 of Embodiment 1. Therefore, the same configurations of the electromagnetic relay 100 described in Embodiment 1 are not repeated in Embodiment 2 below. The same elements in the electromagnetic relay 100 as those described in Embodiment 1 are designated by the same reference numerals in Embodiment 2. The following descriptions of the present embodiment will be made mainly in the points different from those in Embodiment 1.

First Example

As shown in FIG. 29 to FIG. 35, the electromagnetic relay 100 of a first example includes an auxiliary fixed terminal 6243 and an auxiliary movable terminal 65. The electromagnetic relay 100 of the first example further includes an auxiliary driving portion 61 attached to the armature 41 that electrically connects the auxiliary movable terminal 65 to the auxiliary fixed terminal 6243. These components, which are not included in the electromagnetic relay 100 of Embodiment 1, are only added to the electromagnetic relay 100 of the present embodiment. The configurations of the electromagnetic relay 100 of Embodiment 2 excluding these additional elements are the same as those of Embodiment 1.

As shown in FIG. 29 to FIG. 35, the auxiliary fixed terminal 6243 has a configuration different from that of the fixed terminals 512 and 534 described in Embodiment 1. The auxiliary fixed terminal 6243 includes an auxiliary external input/output terminal 62 and an auxiliary external output/input terminal 63 electrically connected to the auxiliary external input/output terminal 62. The auxiliary movable terminal 65 is a terminal having a configuration different from that of the movable terminals 47 and 48 described in Embodiment 1. The auxiliary movable terminal 65 can electrically connect the auxiliary external input/output terminals 62 and 64 with the auxiliary external output/input terminal 63.

As used herein, the term "terminal having a different configuration" refers to a terminal of which at least one of the shape, pattern, and color is different from that of other terminals.

Figure 29:
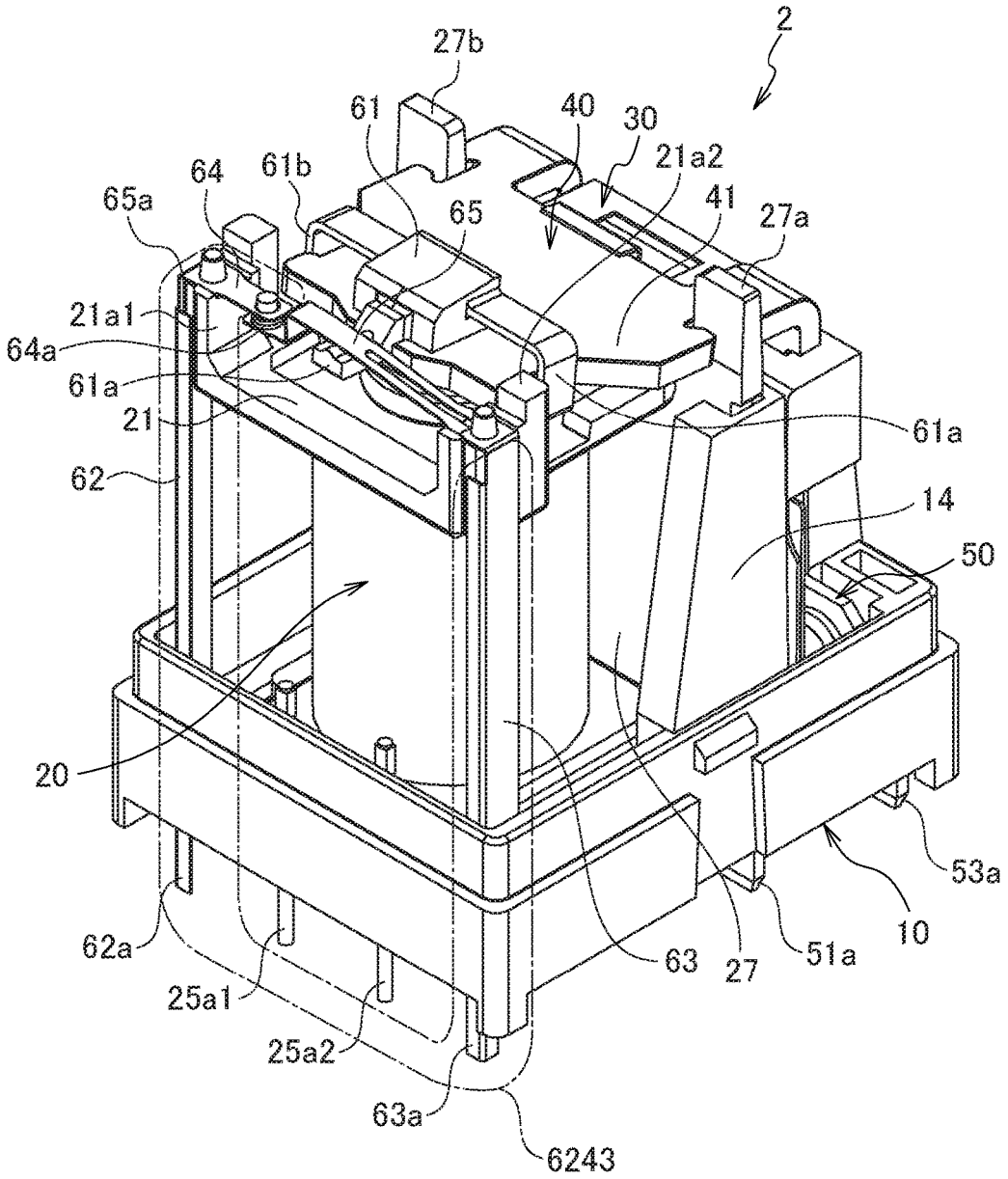
FIG. 29 is a perspective view of a relay body of a first example in an electromagnetic relay according to Embodiment 2 of the present invention for explaining an auxiliary movable terminal and an auxiliary fixed terminal of the first example.
Figure 30:
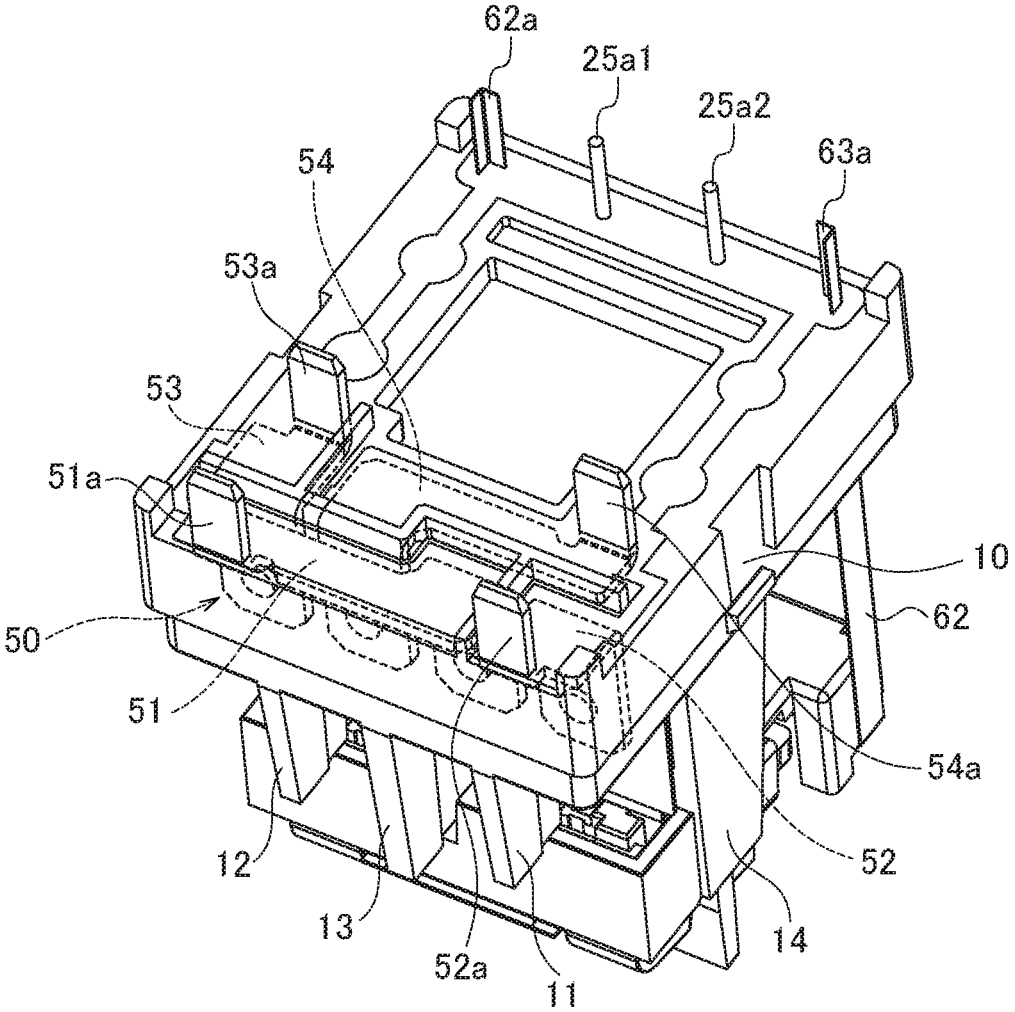
FIG. 30 is a perspective view of the relay body of the first example in the electromagnetic relay according to Embodiment 2 of the present invention, schematically showing a tip portion of an auxiliary external input/output terminal and a tip portion of an auxiliary external output/input terminal.
Figure 31:
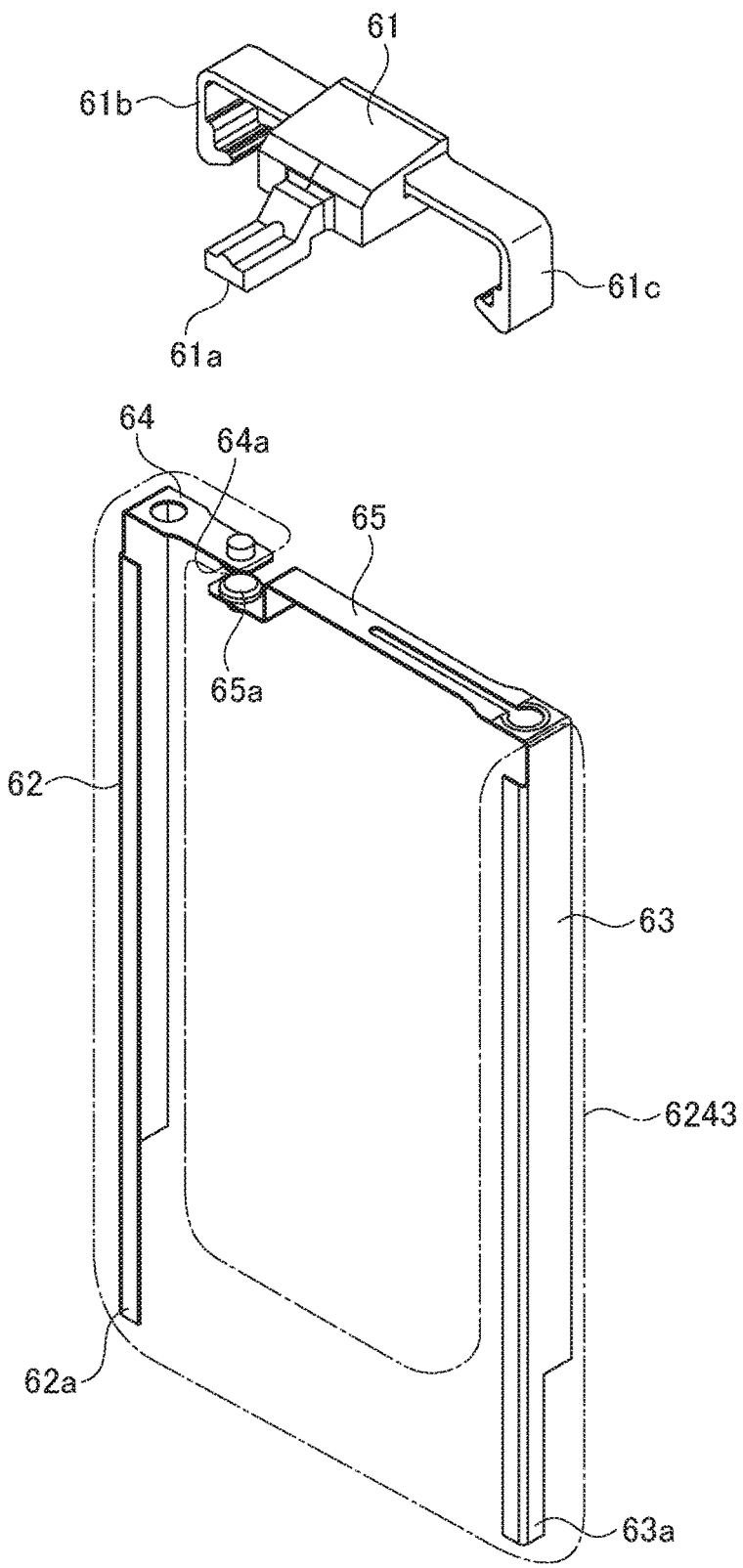
FIG. 31 is an exploded perspective view of the auxiliary movable terminal and the auxiliary fixed terminal in the first example of the electromagnetic relay according to Embodiment 2 of the present invention.
Figure 32:
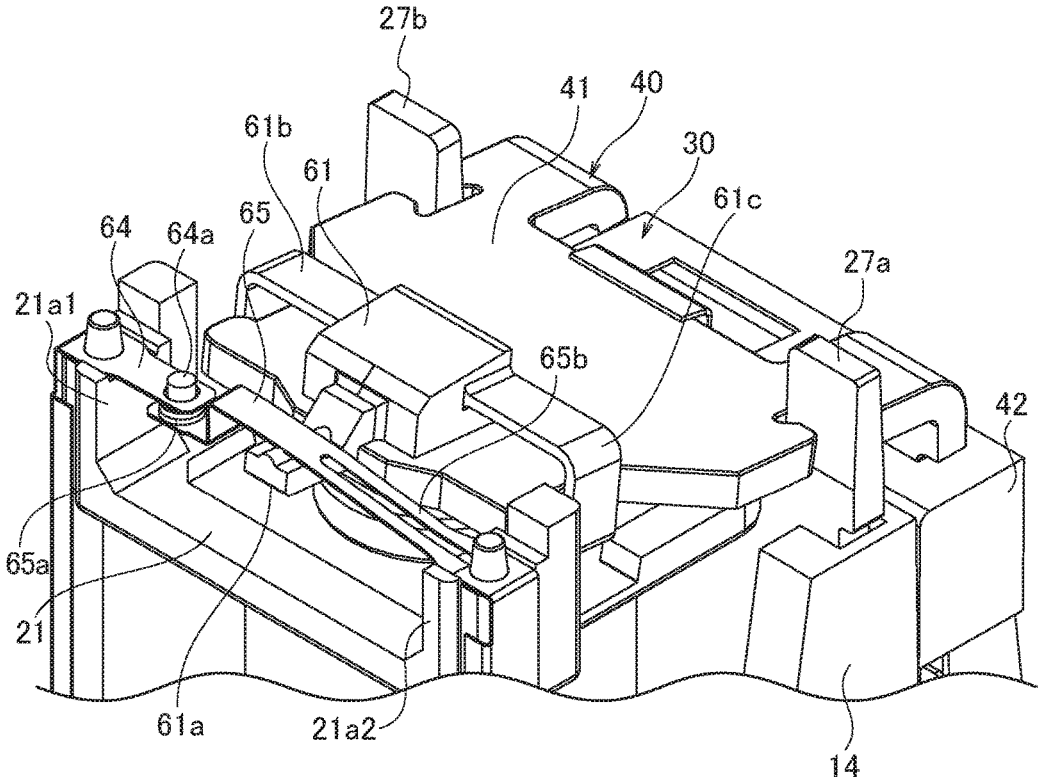
FIG. 32 is an enlarged partial perspective view showing a state where a movable contact point of the auxiliary movable terminal and a fixed contact point of the auxiliary fixed terminal in the first example are in contact with each other in the electromagnetic relay according to Embodiment 2 of the present invention.
Figure 33:
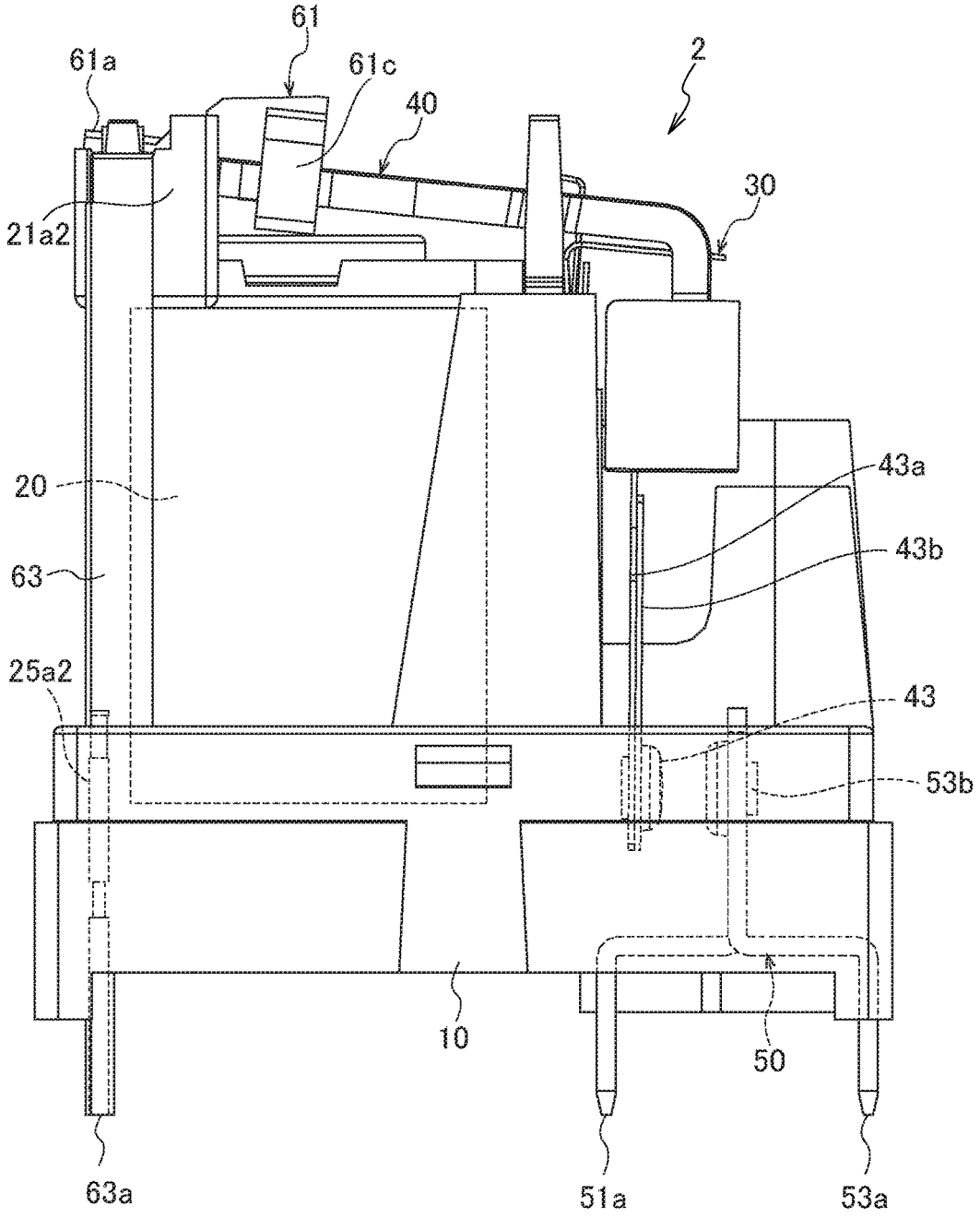
FIG. 33 is a side view of the relay body of the first example in the electromagnetic relay according to Embodiment 2 of the present invention.

As shown in FIG. 29, the auxiliary external input/output terminals 62 and 64 are supported by the supporting portion 21a1 projecting from a corner of the rectangular upper flange 22 of the bobbin 21 (refer to FIG. 8). The supporting portion 21a1 positions the auxiliary external input/output terminal 64 at an appropriate height. As shown in FIG. 29, the auxiliary external output/input terminal 63 and the auxiliary movable terminal 65 are supported by the supporting portion 21a2 projecting from a corner of the rectangular upper flange 22 of the bobbin 21. The supporting portion 21a2 positions the auxiliary movable terminal 65 at an appropriate height.

Although the present embodiment is illustrated by the case where the auxiliary external output/input terminal 63 and the auxiliary movable terminal 65 are integrated together, the auxiliary external output/input terminal 63 and the auxiliary movable terminal 65 may be formed separately. When formed separately, the auxiliary movable terminal 65 is electrically connected to each of the auxiliary external output/input terminal 63 and auxiliary external input/output terminals 62 and 64. The armature 41 thus moves the auxiliary movable terminal 65 toward each of the auxiliary external output/input terminal 63 and the auxiliary external input/output terminals 62 and 64.

The base of the auxiliary movable terminal 65 extends horizontally at the same height as the auxiliary external input/output terminal 64 of the auxiliary fixed terminal 6243. The tip portion of the auxiliary movable terminal 65 is bent downward and extends below the auxiliary external input/output terminal 64. The lower surface of the tip portion of the auxiliary external input/output terminal 64 is provided with an auxiliary fixed contact point 64a. The upper surface of the bent tip portion of the auxiliary movable terminal 65 is provided with an auxiliary movable contact point 65a. The auxiliary fixed contact point 64a and the auxiliary movable contact point 65a are thus opposed to each other. The auxiliary movable contact point 65a comes into contact with the auxiliary fixed contact point 64a when the auxiliary movable terminal 65 moves upward.

The auxiliary movable terminal 65 and the auxiliary fixed terminal 6243 are each formed of a metal having substantially the same electrical conductivity as the movable terminal 47 (48) and the fixed terminal 512 (534). The auxiliary movable contact point 65a and the auxiliary fixed contact point 64a are each formed of a metal having electrical conductivity substantially the same as or higher than that of the auxiliary movable terminal 65 and the auxiliary fixed terminal 6243.

The armature 41 of the electromagnetic relay 100 of the first example moves the movable terminal 47 (48) as in the case of the electromagnetic relay 100 of Embodiment 1. When the electromagnetic relay 100 is in an OFF state, the edge of the armature 41 located on the auxiliary movable terminal 65 side moves upward, and the auxiliary driving portion 61 lifts up the auxiliary movable terminal 65. The auxiliary movable contact point 65a then comes into contact with the auxiliary fixed contact point 64a. The auxiliary movable terminal 65 is thus electrically connected to the auxiliary external input/output terminal 62. Accordingly, a tip portion 62a of the auxiliary external input/output terminal 62 and a tip portion 63a of the auxiliary external output/input terminal 63 are electrically connected to each other. Namely, a condition in which a current can flow between the tip portion 62a and the tip portion 63a is established.

When the electromagnetic relay 100 is in an ON state, the edge of the armature 41 located on the auxiliary movable terminal 65 side moves downward, and the auxiliary driving portion 61 also moves downward to be separated from the auxiliary movable terminal 65. The auxiliary movable contact point 65a is thus separated from the auxiliary fixed contact point 64a. Accordingly, the tip portion 62a of the auxiliary external input/output terminal 62 and the tip portion 63a of the auxiliary external output/input terminal 63 are electrically disconnected.

The characteristic configurations of the electromagnetic relay 100 of the first example of the present embodiment are shown in FIG. 29, FIG. 30, FIG. 33 and FIG. 34. As shown in the drawings, the tip portion 51a (53a) of the external input/output terminal 51 (53) and the tip portion 52a (54a) of the external output/input terminal 52 (54) project outward from the lower surface of the body 10. The tip portion 62a of the auxiliary external input/output terminal 62 and the tip portion 63a of the auxiliary external output/input terminal 63 also project outward from the lower surface of the body 10.

In the Specification, the auxiliary external input/output terminal and the auxiliary external output/input terminal are a pair of external terminals that can be electrically connected by the auxiliary movable terminal. When one of the auxiliary external input/output terminal and the auxiliary external output/input terminal serves as an auxiliary external input terminal, the other serves as an auxiliary external output terminal. When the one of the auxiliary external input/output terminal and the auxiliary external output/input terminal serves as an auxiliary external output terminal, the other serves as an auxiliary external input terminal. Both of the auxiliary external input/output terminal and the auxiliary external output/input terminal may serve as an input terminal or serve as an output terminal when detecting an operational failure of the movable terminal and the fixed terminal because of, for example, welding.

A set of the auxiliary external input/output terminals 62 and 64 and the auxiliary external output/input terminal 63 composes the auxiliary fixed terminal 6243 electrically connected to the auxiliary movable terminal 65. In the present embodiment, only the auxiliary movable terminal 65 moves.

Figure 34:
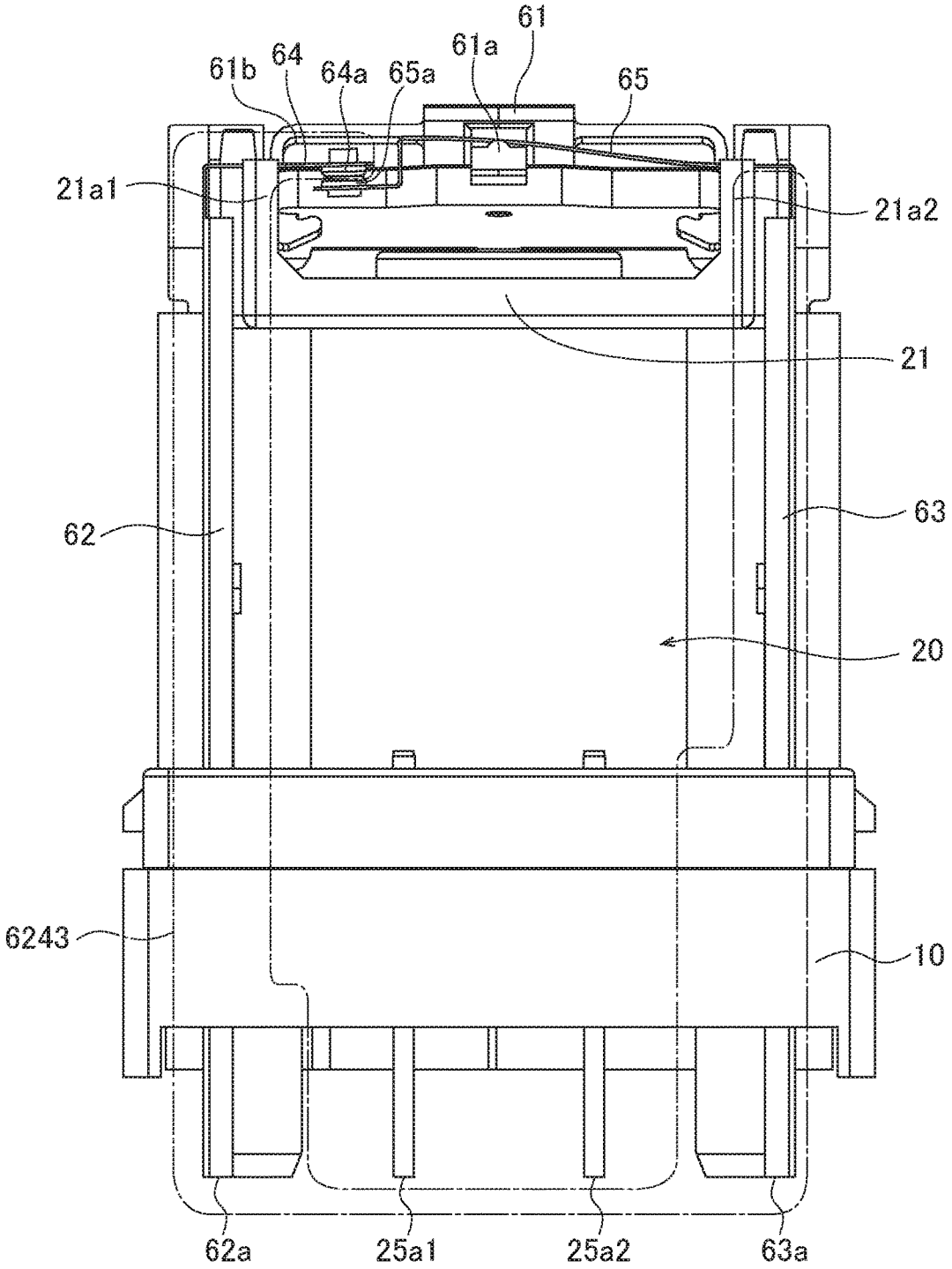
FIG. 34 is a back view of the relay body of the first example in the electromagnetic relay according to Embodiment 2 of the present invention.

As shown in FIG. 29 and FIG. 34, the auxiliary external input/output terminal 64 is slightly deflected by elastic deformation when pushed up by the auxiliary movable terminal 65. The auxiliary external input/output terminal 64, however, moves as a result of the contact between the auxiliary movable terminal 65 and the auxiliary fixed terminal 6243 and is therefore referred to as a part of the auxiliary fixed terminal 6243 in the Specification.

As shown in FIG. 29 to FIG. 35, the auxiliary driving portion 61 in the electromagnetic relay 100 of the first example includes a lifting portion 61a and fixing portions 61b and 61c. The lifting portion 61a is a projection projecting from the armature 41 to lift up the auxiliary movable terminal 65. The lifting portion 61a lifting up the auxiliary movable terminal 65 brings the auxiliary movable contact point 65a into contact with the auxiliary fixed contact point 64a. The fixing portions 61b and 61c each have a locking portion for locking the armature 41. The armature 41 and the auxiliary driving portion 61 are fixed together by the locking portions of the fixing portions 61b and 61c. Thus, the armature 41 and the auxiliary driving portion 61 move together as an integrated structure.

The auxiliary driving portion 61 is preferably a component having insulating properties such as a resin mold. This prevents the armature 41 having electrical conductivity from being electrically connected to the auxiliary movable terminal 65. Accordingly, a possibility that the movable terminal 47 (48) is electrically connected to the auxiliary movable terminal 65 can be minimized with the armature 41 and the auxiliary driving portion 61 intervening therebetween.

Figure 35:
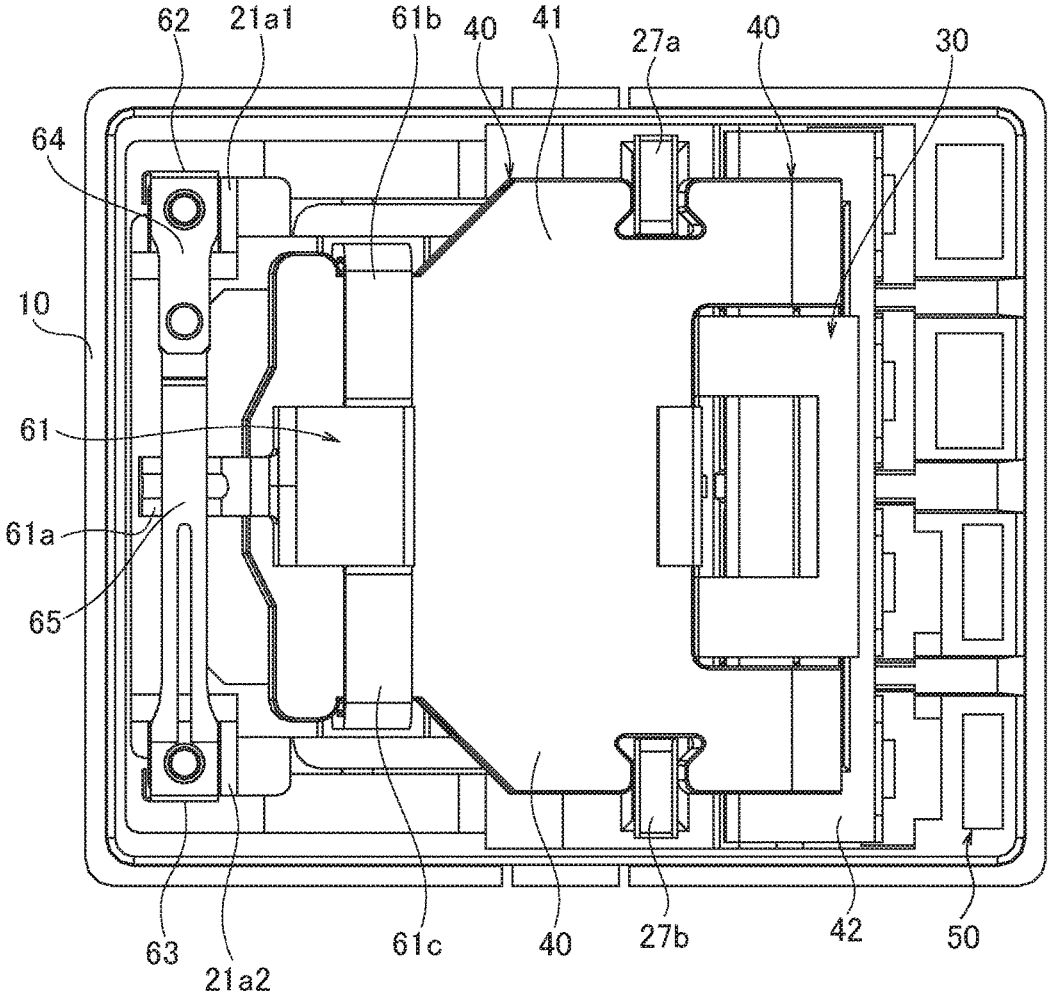
FIG. 35 is a plan view of the relay body of the first example in the electromagnetic relay according to Embodiment 2 of the present invention.

As shown in FIG. 35, part of the auxiliary fixed terminal 6243 is located in the cover 1 having an inner space of a substantially rectangular parallelepiped together with the electromagnet 20. In particular, the auxiliary external input/output terminal 62 and the auxiliary external output/input terminal 63 are located in the space defined by the respective corners 10b and 10c of the cover 1 (the body 10) and the center C of the electromagnet 20 in a plan view (refer to FIG. 18). The center C of the electromagnet 20 corresponds to the central axis of the cylindrical bobbin 21. As shown in FIG. 34, the auxiliary external input/output terminal 62 and the auxiliary external output/input terminal 63 each extend parallel to the central axis of the winding 25 of the electromagnet 20 (refer to FIG. 7 and FIG. 8). Thus, the space in the electromagnetic relay 100 is utilized effectively.

In the electromagnetic relay 100 of the first example, the lifting portion 61a of the auxiliary driving portion 61 lifts up the auxiliary movable terminal 65 toward the auxiliary external input/output terminal 64. The own weight of the auxiliary external input/output terminal 64 further enhances the electrical connection between the auxiliary movable contact point 65a and the auxiliary fixed contact point 64a.

Second Example

Figure 36:
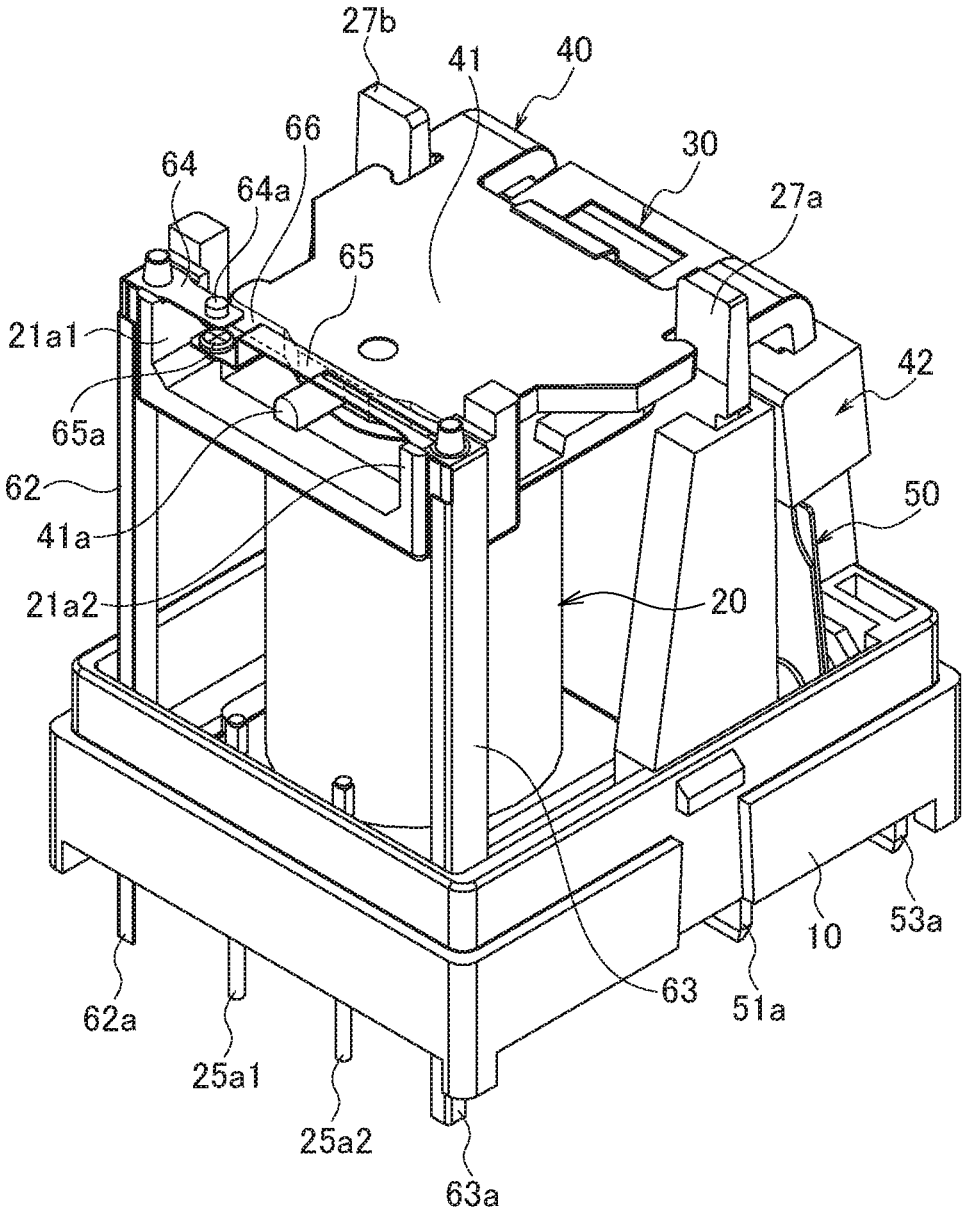
FIG. 36 is a perspective view of a relay body of a second example in the electromagnetic relay according to Embodiment 2 of the present invention for explaining an auxiliary movable terminal and an auxiliary fixed terminal of the second example.

As shown in FIG. 36, the electromagnetic relay 100 of a second example includes a stick-like auxiliary driving portion 41a as a part of the armature 41 extending therefrom, instead of the auxiliary driving portion 61 of the first example attached to the armature 41. The configurations of the electromagnetic relay 100 of the second example excluding this element are the same as those of the first example.

In the electromagnetic relay 100 of the second example, the armature 41 and the auxiliary driving portion 41a move together as an integrated structure. In particular, when the electromagnetic relay 100 is in an OFF state, the edge of the armature 41 located on the auxiliary movable terminal 65 side moves upward, and the auxiliary driving portion 41a lifts up the auxiliary movable terminal 65. The auxiliary movable contact point 65a of the auxiliary movable terminal 65 then comes into contact with the auxiliary fixed contact point 64a of the auxiliary fixed terminal 6243. Accordingly, the tip portion 62a of the auxiliary external input/output terminal 62 and the tip portion 63a of the auxiliary external output/input terminal 63 are electrically connected to each other through the auxiliary movable terminal 65.

When the electromagnetic relay 100 is in an ON state, the edge of the armature 41 located on the auxiliary movable terminal 65 side moves downward. The auxiliary driving portion 41a also moves downward to be separated from the auxiliary movable terminal 65. The auxiliary movable contact point 65a is thus separated from the auxiliary fixed contact point 64a. Accordingly, the tip portion 62a of the auxiliary external input/output terminal 62 and the tip portion 63a of the auxiliary external output/input terminal 63 are electrically disconnected.

The auxiliary driving portion 41a in the electromagnetic relay 100 of the second example is formed of the same material as the armature 41 and integrated with the armature 41. The electromagnetic relay 100 of the second example has the same configurations as those of the first example excluding the auxiliary driving portion 41a.

According to the electromagnetic relay 100 of the second example, since the auxiliary driving portion 41a is a part of the armature 41, the auxiliary driving portion 41a and the armature 41 can be formed with the same metal mold in the same molding process. The number of components of the electromagnetic relay 100 can therefore be reduced.

In the electromagnetic relay 100 of the second example as shown in FIG. 36, the auxiliary driving portion 41a lifts up the auxiliary movable terminal 65 toward the auxiliary external input/output terminal 64, as in the case of the electromagnetic relay 100 of the first example. The own weight of the auxiliary external input/output terminal 64 thus enhances the electrical connection between the auxiliary movable contact point 65a and the auxiliary fixed contact point 64a.

As shown in FIG. 36, part of the auxiliary fixed terminal 6243 of the electromagnetic relay 100 of the second example is also located in the cover 1 having an inner space of a substantially rectangular parallelepiped together with the electromagnet 20. In particular, the auxiliary external input/output terminal 62 and the auxiliary external output/input terminal 63 are located in the space defined by the respective corners 10b and 10c of the cover 1 (the body 10) and the center C of the electromagnet 20 (refer to FIG. 18). The auxiliary external input/output terminal 62 and the auxiliary external output/input terminal 63 each extend parallel to the central axis of the winding 25 of the electromagnet 20 (refer to FIG. 7 and FIG. 8). Thus, the space in the electromagnetic relay 100 is utilized effectively.

Third Example

Figure 37:
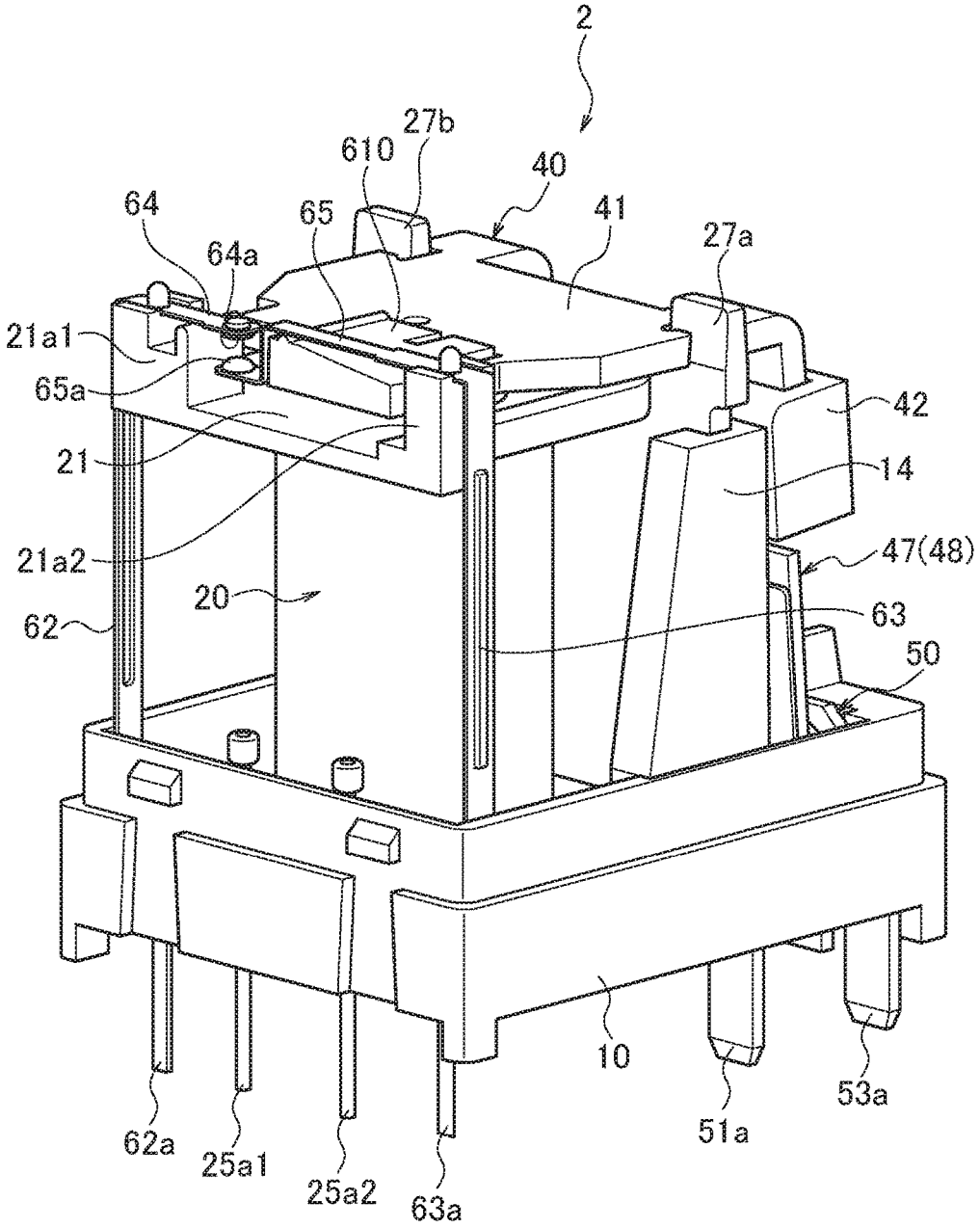
FIG. 37 is a perspective view of a relay body of a third example in the electromagnetic relay according to Embodiment 2 of the present invention for explaining an auxiliary movable terminal and an auxiliary fixed terminal of the third example.

As shown in FIG. 37, the electromagnetic relay 100 of a third example includes an auxiliary driving portion 610, instead of the auxiliary driving portion 61 of the first example. The auxiliary driving portion 61 and the auxiliary driving portion 610 have different shapes. The configurations of the electromagnetic relay 100 of the third example excluding this element are the same as those of the first example.

In the electromagnetic relay 100 of the third example, the armature 41 moves together with the auxiliary driving portion 610 as an integrated structure. When the electromagnetic relay 100 is in an OFF state, the auxiliary driving portion 610 lifts up the auxiliary movable terminal 65. The auxiliary movable contact point 65a of the auxiliary movable terminal 65 then comes into contact with the auxiliary fixed contact point 64a of the auxiliary fixed terminal 6243. Accordingly, the tip portion 62a of the auxiliary external input/output terminal 62 and the tip portion 63a of the auxiliary external output/input terminal 63 are electrically connected to each other through the auxiliary movable terminal 65.

When the electromagnetic relay 100 is in an ON state, the edge of the armature 41 located on the auxiliary movable terminal 65 side moves downward, and the auxiliary driving portion 610 also moves downward to be separated from the auxiliary movable terminal 65. The auxiliary movable contact point 65a is thus separated from the auxiliary fixed contact point 64a. Accordingly, the tip portion 62a of the auxiliary external input/output terminal 62 and the tip portion 63a of the auxiliary external output/input terminal 63 are electrically disconnected.

The auxiliary driving portion 610 in the electromagnetic relay 100 of the third example is formed separately from the armature 41. The auxiliary driving portion 610 is preferably a component having insulating properties such as a resin mold, as in the case of the electromagnetic relay 100 of the first example. This prevents the armature 41 having electrical conductivity from being electrically connected to the auxiliary movable terminal 65.

The auxiliary driving portion 610 of the third example lifts up a part of the auxiliary movable terminal 65 closer to the tip side thereof, as compared with the case of the auxiliary driving portion 61 of the electromagnetic relay 100 of the first example. This reduces a degree of bending of the auxiliary movable terminal 65 on the tip side.

As shown in FIG. 37, the auxiliary driving portion 610 of the electromagnetic relay 100 of the third example lifts up the auxiliary movable terminal 65 toward the auxiliary external input/output terminal 64, as in the case of the electromagnetic relay 100 of the first example. The own weight of the auxiliary external input/output terminal 64 thus enhances the electrical connection between the auxiliary movable contact point 65a and the auxiliary fixed contact point 64a.

As shown in FIG. 37, part of the auxiliary fixed terminal 6243 of the electromagnetic relay 100 of the third example is also located in the cover 1 having an inner space of a substantially rectangular parallelepiped together with the electromagnet 20. In particular, the auxiliary external input/output terminal 62 and the auxiliary external output/input terminal 63 are located in the space defined by the respective corners 10b and 10c of the cover 1 (the body 10) and the center C of the electromagnet 20 (refer to FIG. 18). The auxiliary external input/output terminal 62 and the auxiliary external output/input terminal 63 each extend parallel to the central axis of the winding 25 of the electromagnet 20 (refer to FIG. 7 and FIG. 8). Thus, the space in the electromagnetic relay 100 is utilized effectively.

Fourth Example

Figure 38:
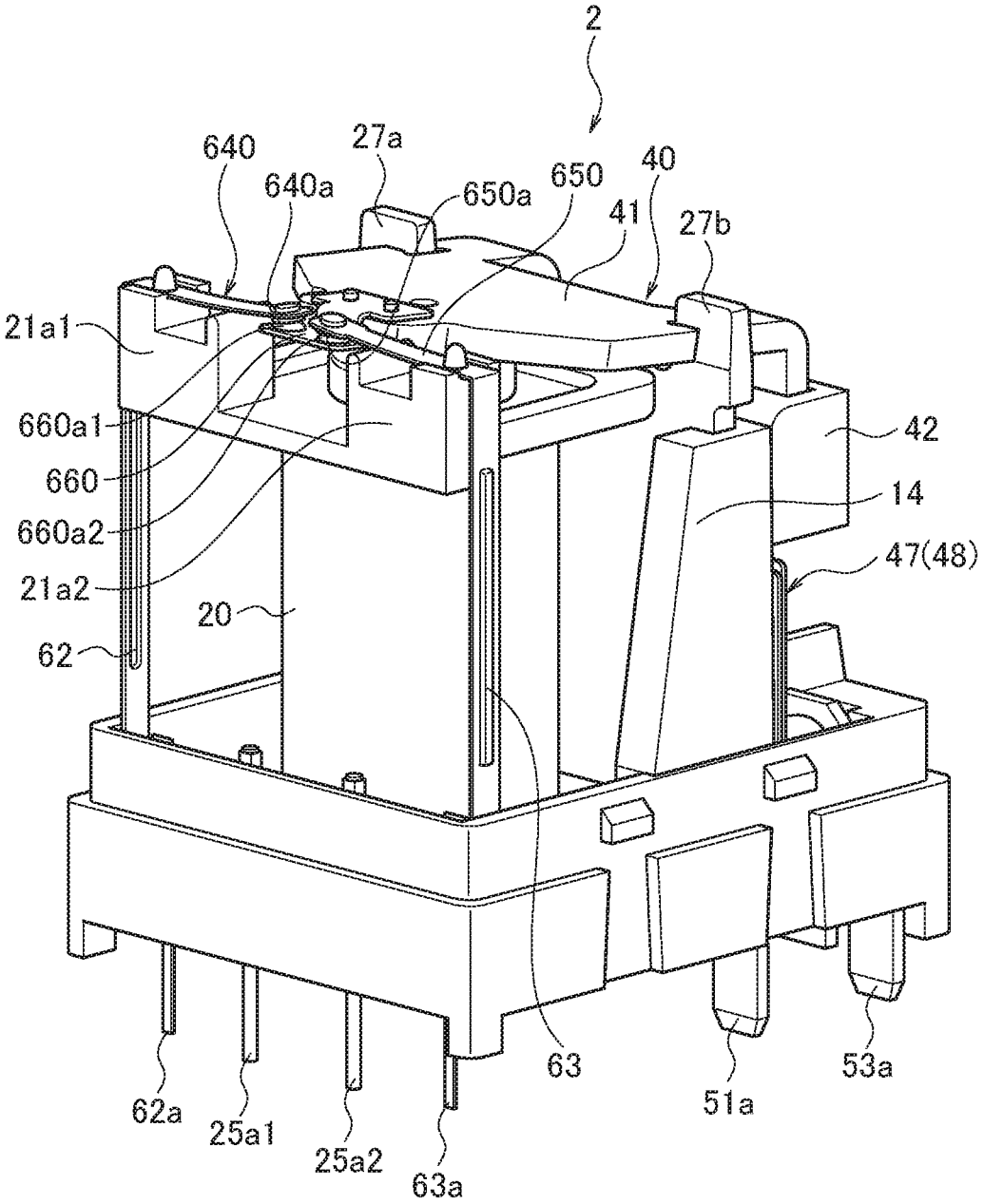
FIG. 38 is a perspective view of a relay body of a fourth example in the electromagnetic relay according to Embodiment 2 of the present invention for explaining an auxiliary movable terminal and an auxiliary fixed terminal of the fourth example.

As shown in FIG. 38, the electromagnetic relay 100 of a fourth example includes an auxiliary movable terminal 660 attached to the armature 41, instead of the auxiliary driving portion 61 of the first example. An external input/output terminal 640 is provided instead of the external input/output terminal 64 of the electromagnetic relay 100 of the first example. An external output/input terminal 650 is provided instead of the auxiliary movable terminal 65 of the electromagnetic relay 100 of the first example.

The external input/output terminal 640 and the external output/input terminal 650 in the fourth example each compose part of the auxiliary fixed terminal 6243. The auxiliary movable terminal 660 has electrical conductivity. The external input/output terminal 640 and the external output/input terminal 650 are therefore electrically connected to each other via the auxiliary movable terminal 660.

In the electromagnetic relay 100 of the fourth example, the auxiliary movable terminal 660 is provided with two auxiliary movable contact points 660a1 and 660a2, instead of the auxiliary movable contact point 65a of the electromagnetic relay 100 of the first example. The external input/output terminal 640 (the auxiliary fixed terminal 6243) is provided with auxiliary fixed contact points 640a and 650a, instead of the auxiliary fixed contact point 64a of the electromagnetic relay 100 of the first example. The configurations of the electromagnetic relay 100 of the fourth example excluding these elements are the same as those of the first example.

In the electromagnetic relay 100 of the fourth example, when the electromagnetic relay 100 is in an OFF state, the armature 41 and the auxiliary movable terminal 660 are pushed upward together as an integrated structure. The two auxiliary movable contact points 660a1 and 660a2 then come into contact with the two auxiliary fixed contact points 640a and 650a, respectively. Accordingly, the tip portion 62a of the auxiliary external input/output terminal 62 and the tip portion 63a of the auxiliary external output/input terminal 63 are electrically connected to each other through the auxiliary movable terminal 660.

When the electromagnetic relay 100 is in an ON state, the auxiliary movable terminal 660 attached to the armature 41 moves downward to be separated from the auxiliary external input/output terminal 640 and the auxiliary external output/input terminal 650. The auxiliary movable contact points 660a1 and 660a2 are thus separated from the auxiliary fixed contact points 640a and 650a. Accordingly, the tip portion 62a of the auxiliary external input/output terminal 62 and the tip portion 63a of the auxiliary external output/input terminal 63 are electrically disconnected.

As shown in FIG. 38, the auxiliary movable terminal 660 of the electromagnetic relay 100 of the fourth example is directly attached to the armature 41. The respective auxiliary external input/output terminals 62 and 640 and the respective auxiliary external output/input terminals 63 and 650 can be formed to have mirror symmetry.

As shown in FIG. 38, the auxiliary movable terminal 660 of the electromagnetic relay 100 of the fourth example pushes the auxiliary external input/output terminal 640 and the auxiliary external output/input terminal 650 upward. The own weight of each of the auxiliary external input/output terminal 640 and the auxiliary external output/input terminal 650 thus enhances the electrical connection between the auxiliary movable contact points 660a1 and 660a2 and the auxiliary fixed contact points 640a and 650a.

As shown in FIG. 38, part of the auxiliary fixed terminal 6243 of the electromagnetic relay 100 of the fourth example is also located in the cover 1 having an inner space of a substantially rectangular parallelepiped together with the electromagnet 20. In particular, the auxiliary external input/output terminal 62 and the auxiliary external output/input terminal 63 are located in the space defined by the respective corners 10b and 10c of the cover 1 (the body 10) and the center C of the electromagnet 20 (refer to FIG. 18). The auxiliary external input/output terminal 62 and the auxiliary external output/input terminal 63 each extend parallel to the central axis of the winding 25 of the electromagnet 20 (refer to FIG. 7 and FIG. 8). Thus, the space in the electromagnetic relay 100 is utilized effectively.

Fifth Example

Figure 39:
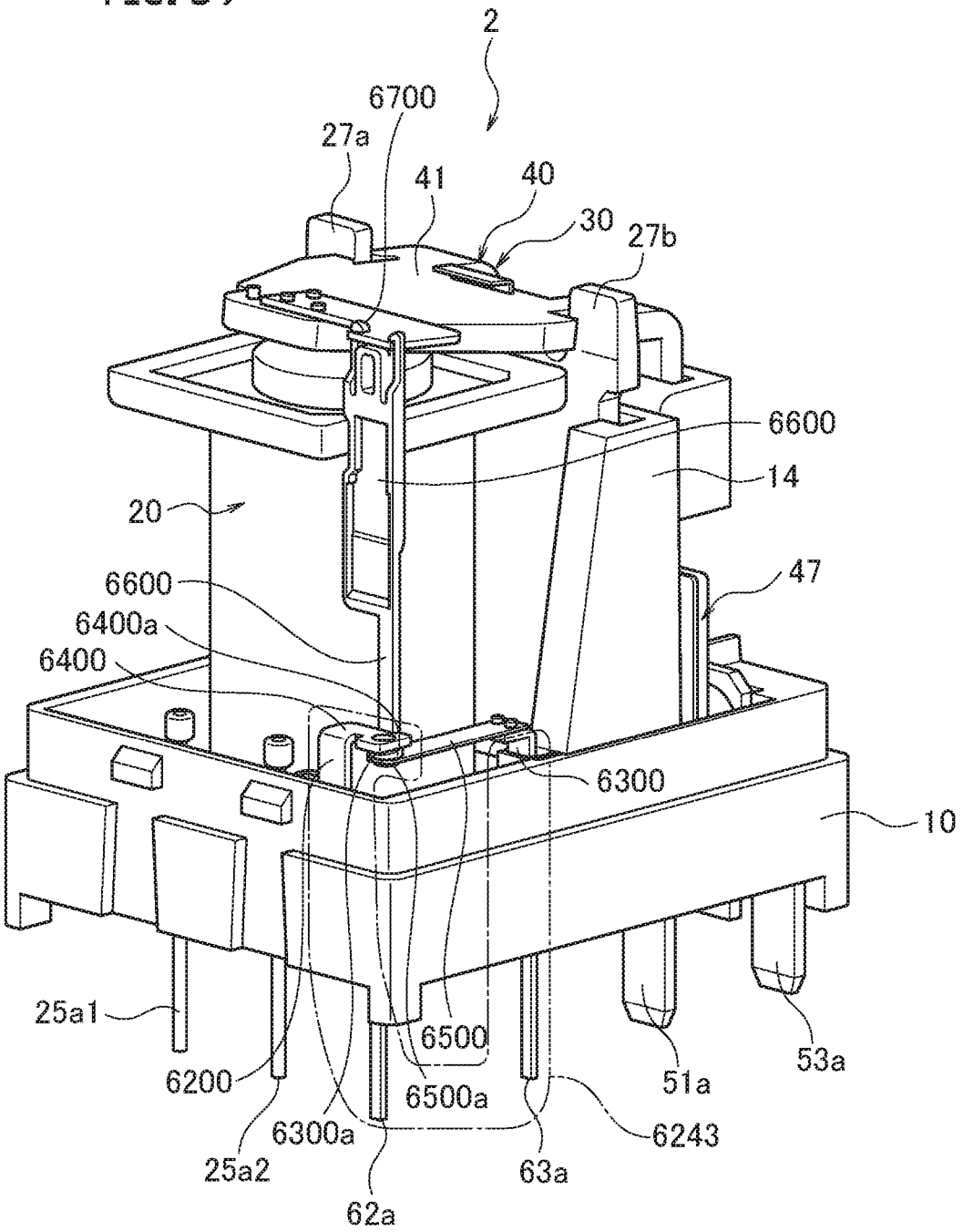
FIG. 39 is a perspective view of a relay body of a fifth example in the electromagnetic relay according to Embodiment 2 of the present invention for explaining an auxiliary movable terminal and an auxiliary fixed terminal of the fifth example.

As shown in FIG. 39, the electromagnetic relay 100 of a fifth example includes insulating auxiliary driving portions 6700 and 6600, instead of the auxiliary driving portion 61 of the first example.

The auxiliary driving portions 6700 and 6600 are rotatably connected to each other. The auxiliary fixed terminal 6243 includes a pair of an auxiliary external input/output terminal 6200 and an auxiliary external output/input terminal 6300. The auxiliary external input/output terminal 6200 and the auxiliary external output/input terminal 6300 are fixed to the body 10. The tip portion 62a of the auxiliary external input/output terminal 6200 on the outer side and the tip portion 63a of the auxiliary external output/input terminal 6300 on the outer side project downward from the bottom surface of the body 10.

The lower surface of a tip portion of an auxiliary external input/output terminal 6400 is provided with an auxiliary fixed contact point 6400a. The upper surface of a tip portion of an auxiliary movable terminal 6500 is provided with an auxiliary movable contact point 6500a. The configurations of the electromagnetic relay 100 of the fifth example excluding these elements are the same as those of the first example.

In the fifth example, the auxiliary driving portions 6700 and 6600 move together as an integrated structure. In particular, when the electromagnetic relay 100 is in an OFF state, the edge of the armature 41 located on the auxiliary driving portion 6700 side moves upward, and the auxiliary driving portion 6600 connected to the auxiliary driving portion 6700 lifts up the auxiliary movable terminal 6500.

The auxiliary movable contact point 6500a of the auxiliary movable terminal 6500 connected to the external output/input terminal 6300 then comes into contact with the auxiliary fixed contact point 6400a of the external input/output terminal 6400 composing the auxiliary fixed terminal 6243. The auxiliary external input/output terminal 6200 is thus electrically connected to the auxiliary external output/input terminal 6300 through the auxiliary movable terminal 6500. Accordingly, the tip portion 62a of the auxiliary external input/output terminal 6200 and the tip portion 63a of the auxiliary external output/input terminal 6300 are electrically connected to each other.

When the electromagnetic relay 100 is in an ON state, the edge of the armature 41 located on the auxiliary driving portion 6700 side moves downward, so that the auxiliary driving portion 6700 moves downward. The auxiliary driving portion 6600 also moves downward to be separated from the auxiliary movable terminal 6500. Accordingly, the tip portion 62a of the auxiliary external input/output terminal 6200 and the tip portion 63a of the auxiliary external output/input terminal 6300 are electrically disconnected.

The auxiliary driving portions 6700 and 6600 in the electromagnetic relay 100 of the fifth example are formed separately from the armature 41. The auxiliary driving portions 6700 and 6600 may be a component having insulating properties such as a resin mold, as in the case of the electromagnetic relay 100 of the first example. This prevents the armature 41 having electrical conductivity from being electrically connected to the auxiliary movable terminal 6500.

The auxiliary driving portion 6600 of the fifth example is located in the space defined by the respective corners 10b and 10c of the cover 1 (the body 10) and the center C of the electromagnet 20 in a plan view (refer to FIG. 18). The auxiliary driving portion 6600 extends parallel to the central axis of the winding 25 of the electromagnet 20 (refer to FIG. 7 and FIG. 8). Thus, the space in the electromagnetic relay 100 is utilized effectively, as in the case of the electromagnetic relays 100 of the first to fourth examples.

The auxiliary external input/output terminal 6200 and the auxiliary external output/input terminal 6300 (the auxiliary fixed terminal 6243) are fixed to the body 10. This shortens the entire length of each of the auxiliary external input/output terminal 6200 and the auxiliary external output/input terminal 6300. Since the auxiliary external input/output terminal 6200 and the auxiliary external output/input terminal 6300 are located in the space between the electromagnet 20 and the cover 1, the space in the electromagnetic relay 100 is utilized effectively.

Sixth Example

Figure 40:
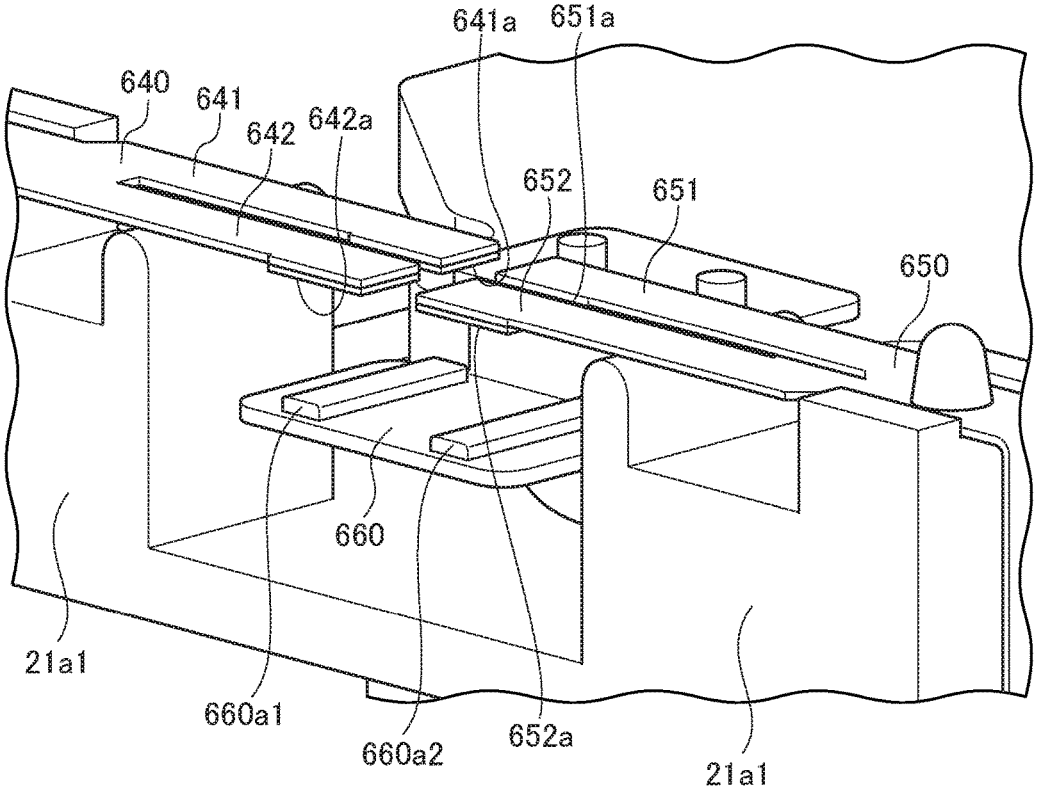
FIG. 40 is a perspective view of a relay body of a sixth example in the electromagnetic relay according to Embodiment 2 of the present invention for explaining an auxiliary movable terminal and an auxiliary fixed terminal of the sixth example.

As shown in FIG. 40, the electromagnetic relay 100 of a sixth example includes, instead of the auxiliary driving portion 61 of the first example, the auxiliary movable terminal 660 attached to the armature 41, as in the case of the electromagnetic relay 100 of the fourth example shown in FIG. 38. The external input/output terminal 640 is provided instead of the external input/output terminal 64 of the electromagnetic relay 100 of the first example. The external output/input terminal 650 is provided instead of the auxiliary movable terminal 65 of the electromagnetic relay 100 of the first example.

The external input/output terminal 640 and the external output/input terminal 650 each compose part of the auxiliary fixed terminal 6243 in the electromagnetic relay 100 of the sixth example. The electromagnetic relay 100 of the sixth example differs from the electromagnetic relay 100 of the fourth example in that the tip portion of the external input/output terminal 640 is divided into two parts of a terminal contact point 641 and a terminal contact point 642. The electromagnetic relay 100 of the sixth example differs from the electromagnetic relay 100 of the fourth example in that the tip portion of the external output/input terminal 650 is divided into two parts of a terminal contact point 651 and a terminal contact point 652.

The lower surface of the terminal contact point 641 is provided with an auxiliary fixed contact point 641a. The lower surface of the terminal contact point 642 is provided with an auxiliary fixed contact point 642a. The lower surface of the terminal contact point 651 is provided with an auxiliary fixed contact point 651a. The lower surface of the terminal contact point 652 is provided with an auxiliary fixed contact point 652a. The upper surface of the auxiliary movable terminal 660 is provided with auxiliary movable contact points 660a1 and 660a2.

The electromagnetic relay 100 of the sixth example has the same configurations as those of the fourth example excluding these elements.

In the electromagnetic relay 100 of the sixth example, the armature 41 moves together with the auxiliary movable terminal 660 as an integrated structure. In particular, when the electromagnetic relay 100 is in an OFF state, the edge of the armature 41 located on the auxiliary movable terminal 660 side moves upward. The auxiliary movable terminal 660 also moves upward. The two auxiliary movable contact points 660a1 and 660a2 then come into contact with the auxiliary fixed contact points 641a and 642a and the auxiliary fixed contact points 651a and 652a. Accordingly, the tip portion 62a of the auxiliary external input/output terminal 62 and the tip portion 63a of the auxiliary external output/input terminal 63 are electrically connected to each other through the auxiliary movable terminal 660.

When the electromagnetic relay 100 is in an ON state, the edge of the armature 41 located on the auxiliary movable terminal 660 side moves downward, so that the auxiliary movable terminal 660 moves downward. The auxiliary movable contact points 660a1 and 660a2 are thus separated from the auxiliary fixed contact points 641a, 642a, 651a and 652a. Accordingly, the tip portion 62a of the auxiliary external input/output terminal 6200 and the tip portion 63a of the auxiliary external output/input terminal 6300 are electrically disconnected.

As shown in FIG. 40, the auxiliary movable terminal 660 is directly attached to the armature 41. The respective auxiliary external input/output terminals 62 and 640 and the respective auxiliary external output/input terminals 63 and 650 can be formed to have mirror symmetry.

In the electromagnetic relay 100 of the sixth example, the tip portion of the external input/output terminal 640 is divided into two parts of the terminal contact point 641 and the terminal contact point 642, as described above. In addition, the tip portion of the external output/input terminal 650 is divided into two parts of the terminal contact point 651 and the terminal contact point 652. The terminal contact point 641, the terminal contact point 642, the terminal contact point 651, and the terminal contact point 652 are each independently elastically deformed depending on the degree of inclination of the auxiliary movable terminal 660. Accordingly, a possibility of failure in contact between the auxiliary movable contact points 660a1 and 660a2 and the respective auxiliary fixed contact points 641a, 642a, 651a and 652a is minimized.

Common Features of Electromagnetic Relays of First to Sixth Examples

Figure 41:
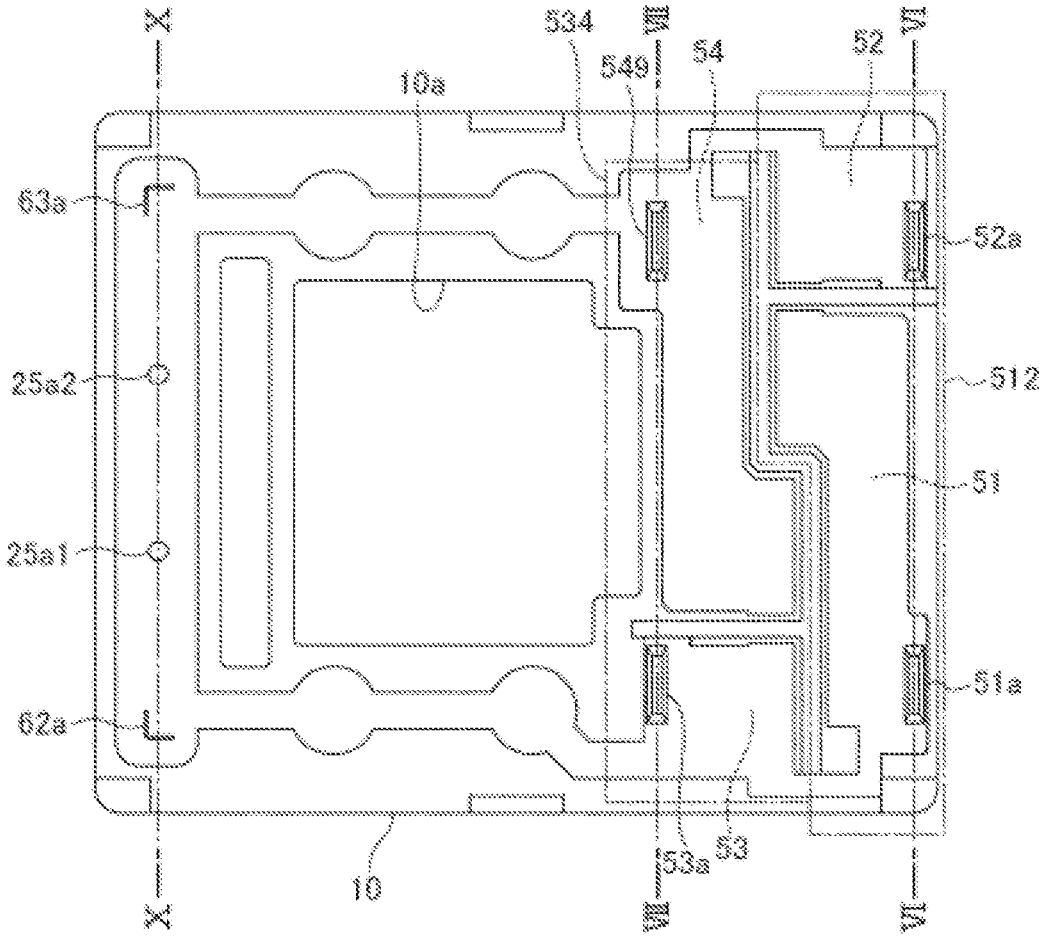
FIG. 41 is a bottom view of the relay body of the first to sixth examples in the electromagnetic relay according to Embodiment 2 of the present invention.

The electromagnetic relays 100 of the first to sixth examples have the following advantageous effects, as shown in FIG. 41, when the bottom surface of the body 10 is viewed in the direction orthogonal to the bottom surface. The bottom surface of the body 10 has a substantially rectangular shape as shown in FIG. 41. The term "substantially rectangular shape" includes a shape that has curved corners but can be assumed to be a rectangle defined by virtual lines which extend from the respective sides of the shape. The term "substantially rectangular shape" further includes a shape that has a deformed outline but can be recognized as a rectangle by stretching the main line of the shape.

The tip portion 51a of the external input/output terminal 51 and the tip portion 52a of the external output/input terminal 52 are aligned along a virtual straight line (refer to virtual line VI in FIG. 41) parallel to the two opposed sides parallel to each other in the substantially rectangular bottom surface of the body 10. The tip portion 53a of the external input/output terminal 53 and the tip portion 54a of the external output/input terminal 54 are aligned along a virtual straight line (refer to virtual line VII in FIG. 41) parallel to the two opposed sides parallel to each other in the substantially rectangular bottom surface of the body 10. The tip portion 62a of the auxiliary external input/output terminal 62 and the tip portion 63a of the external output/input terminal 63 are aligned along a virtual straight line (refer to virtual line X in FIG. 41) parallel to the two opposed sides parallel to each other in the substantially rectangular bottom surface of the body 10.

The pair of coil terminals 25a1 and 25a2 are aligned along a virtual straight line (refer to virtual line X in FIG. 41) parallel to the two opposed sides parallel to each other in the substantially rectangular bottom surface of the body 10. The coil terminals 25a1 and 25a2, the tip portion 62a of the auxiliary external input/output terminal 62 and the tip portion 63a of the external output/input terminal 63 are aligned along the same virtual straight line (refer to virtual line X in FIG. 41). The plural external terminals projecting from the bottom surface of the body 10 are thus aligned orderly.

As shown in FIG. 41, the bottom surface of the body 10 has a recess denoted by reference numeral 10a. The pattern defined by the recess 10a facilitates recognition of the location of the respective components such as the electromagnet 20. The plural external terminals projecting from the bottom surface of the body 10 thus can be distinguished easily, since the side toward the fixed terminals 512 and 534 has the projections.

Even if the tip portions 62a and 63a have the same shape as the tip portions 51a, 52a, 53a and 54a, the tip portions 62a and 63a can easily be distinguished visually from the tip portions 51a, 52a, 53a and 54a. The bottom surface of the body 10 may be provided with, instead of the recess 10a, a pattern drawn with paints similar to the pattern of the recess 10a.

In the present embodiment, the tip portions 62a and 63a have a shape that can easily be distinguished from the tip portions 51a, 52a, 53a and 54a, as shown in FIG. 41. The tip portions 62a and 63a have a shape that can easily be distinguished from the coil terminals 25a1 and 25a2. The tip portion 62a of the auxiliary external input/output terminal 62 and the tip portion 63a of the external output/input terminal 63 thus can be distinguished visually from the tip portions 51a, 52a, 53a and 54a due to the shape thereof.

FIG. 42 shows an electrical circuit diagram of the electromagnetic relay 100 further including the tip portion 62a of the auxiliary external input/output terminal 62 and the tip portion 63a of the external output/input terminal 63 as compared with the electrical circuit diagram shown in FIG. 24.

In the electromagnetic relay 100 of the first example of the present embodiment, when an AC current passes through the pair of the coil terminals 25a1 and 25a2, the Ac current flows through the winding 25 of the electromagnet 20. The electromagnetic relay 100 of the present embodiment is then switched from an OFF state shown in FIG. 43 to an ON state shown in FIG. 44, as in the case of the electromagnetic relay 100 of Embodiment 1.

Figure 43:
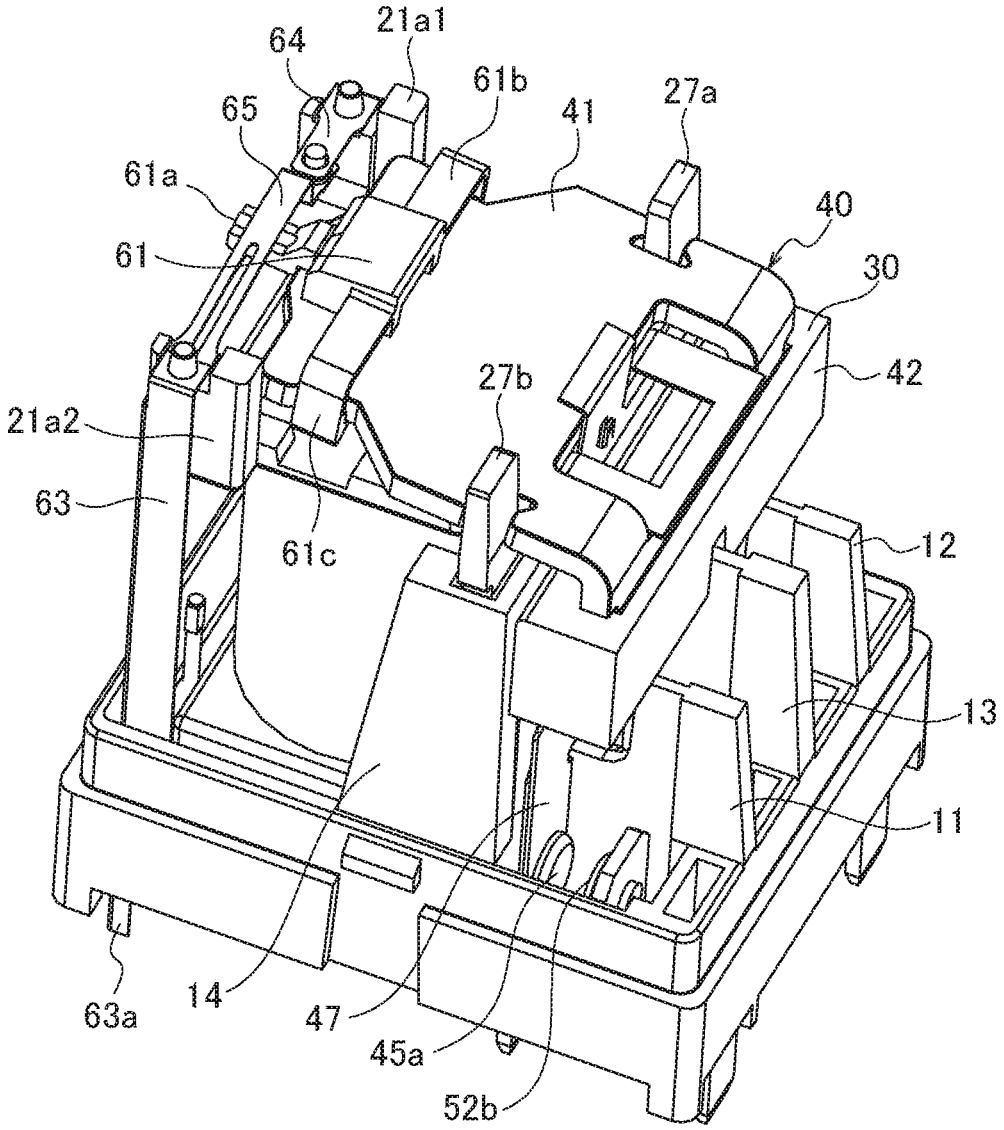
FIG. 43 is a perspective view showing a state where the movable terminals and the fixed terminals of the electromagnetic relay according to Embodiment 2 of the present invention are not in contact with each other (OFF state).

When the electromagnetic relay 100 is in the OFF state shown in FIG. 43, the electromagnet 20 does not generate electromagnetic attraction. The armature 41 and the auxiliary driving portion 61 thus lift up the auxiliary movable terminal 65. The auxiliary movable contact point 65a and the auxiliary fixed contact point 64a come into contact with each other so that the auxiliary movable terminal 65 and the auxiliary external input/output terminal 64 are electrically connected to each other. The current thus can flow between the tip portion 62a and the tip portion 63a by use of a tester *2000*.

The movable terminal 47 (48) is suspended substantially in the vertical direction. The movable contact points 45a, 45b, 46a and 46b are not in contact with the fixed contact points 52b, 51b, 54b and 53b. The current does not flow between the tip portion 51a and the tip portion 52a or between the tip portion 53a and the tip portion 54a.

Figure 44:
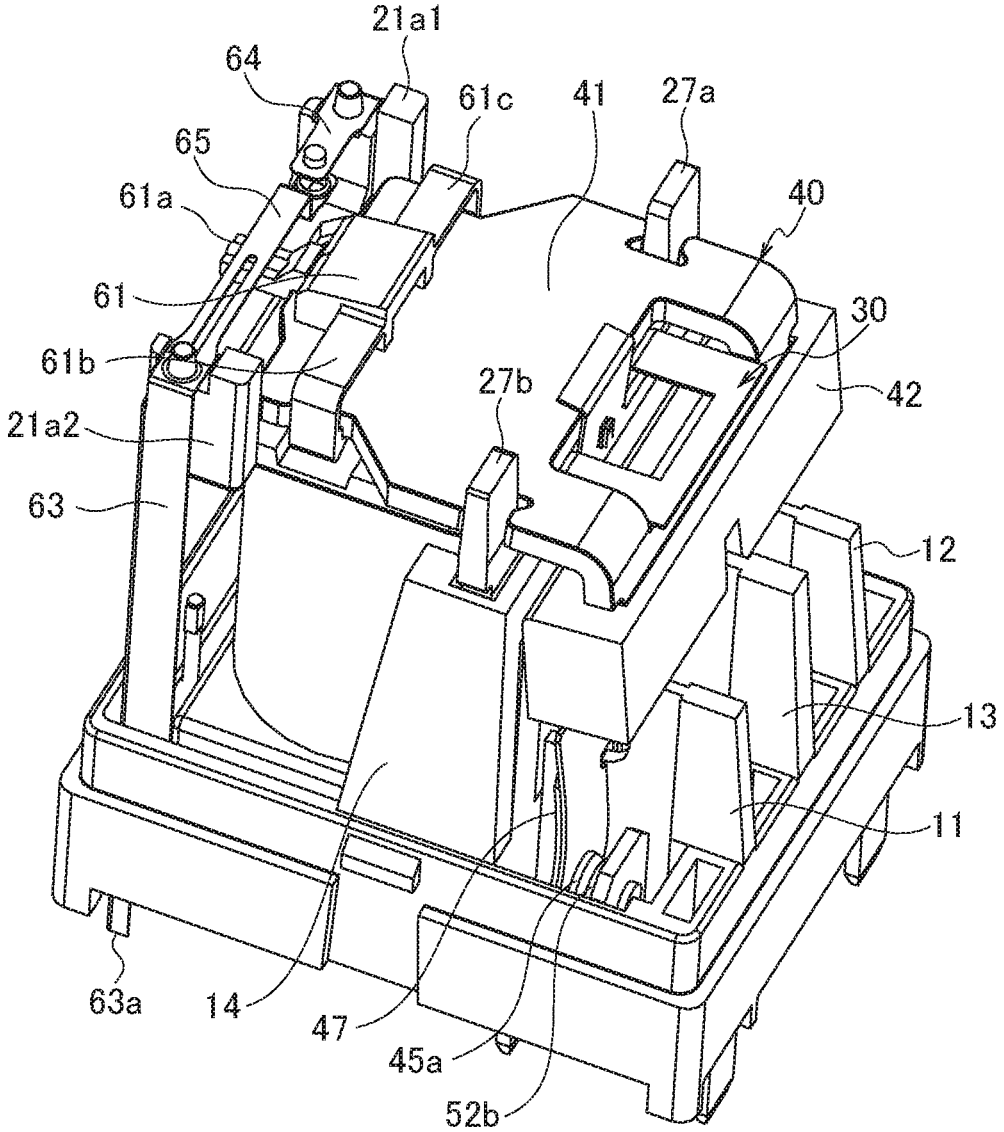
FIG. 44 is a perspective view showing a state where the movable terminals and the fixed terminals of the electromagnetic relay according to Embodiment 2 of the present invention are in contact with each other (ON state).

When the electromagnetic relay 100 is in the ON state shown in FIG. 44, the electromagnet 20 generates electromagnetic attraction. The armature 41 is attracted downward. The auxiliary movable terminal 65 moves to be separated from the auxiliary external input/output terminal 64. The auxiliary movable contact point 65a is thus separated from the auxiliary fixed contact point 64a.

During the ON state, the current does not flow between the tip portion 62a and the tip portion 63a regardless of the use of a tester. The movable terminal 47 (48) is moved toward the fixed terminal 512 (534) in association with the movement of the armature 41. The movable contact points 45a, 45b, 46a and 46b then come into contact with the fixed contact points 52b, 51b, 54b and 53b, respectively. The current thus flows between the tip portion 51a and the tip portion 52a and between the tip portion 53a and the tip portion 54a.

Next, the electromagnetic relay 100 with the movable terminal 47 (48) and the fixed terminal 512 (534) welded together is described below with reference to FIG. 45.

Figure 45:
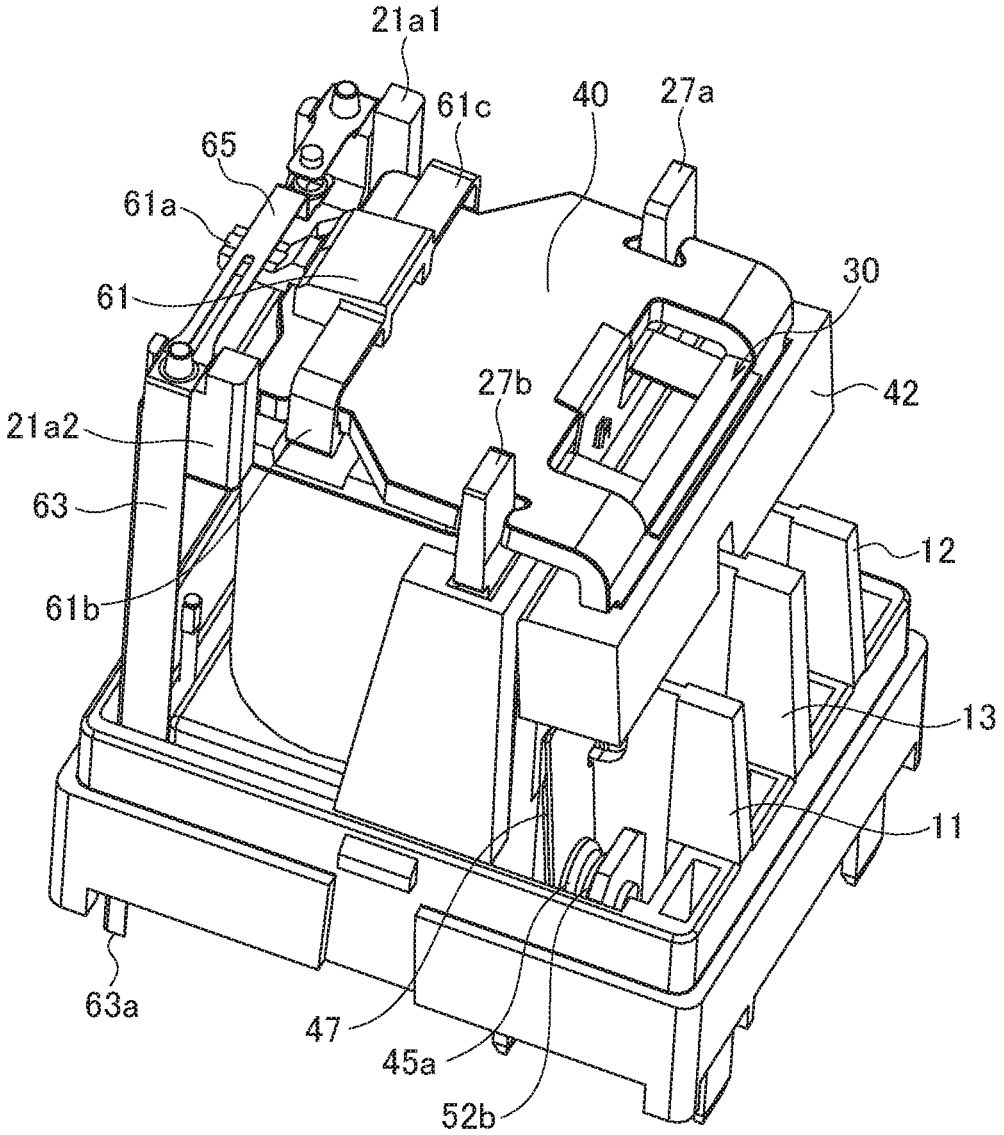
FIG. 45 is a perspective view showing a state where the movable terminals and the fixed terminals of the electromagnetic relay according to Embodiment 2 of the present invention are welded together.

FIG. 45 shows a state where the movable contact points 45a, 45b, 46a and 46b of the movable terminals 47 and 48 and the fixed contact points 52b, 51b, 54b and 53b of the fixed terminals 512 and 534 are welded together. When the electromagnetic relay 100 is in the OFF state, the movable contact points 45a, 45b, 46a and 46b should basically be separated from the fixed contact points 52b, 51b, 54b and 53b. When the movable terminal 47 (48) and the fixed terminal 512 (534) are welded together, however, the movable contact points 45a, 45b, 46a and 46b cannot be separated from the fixed contact points 52b, 51b, 54b and 53b. The auxiliary movable contact point 65a is separated from the auxiliary fixed contact point 64a in this state. Namely, welding between the movable contact points 45a, 45b, 46a and 46b and the fixed contact points 52b, 51b, 54b and 53b substantially leads the electromagnetic relay 100 to the ON state in the electrical circuit.

As a result, the current does not flow between the tip portion 62a of the auxiliary external input/output terminal 62 and the tip portion 63a of the external output/input terminal 63 even if a voltage is applied between the tip portion 62a and the tip portion 63a by use of a tester. Accordingly, the electromagnetic relay 100 including the auxiliary fixed terminal 6243 and the auxiliary movable terminal 65 facilitates the detection of welding between the movable terminal 47 (48) and the fixed terminal 512 (534) by use of a tester.

The configurations and effects of the electromagnetic relay 100 of the present embodiment are described in detail below.

(1) The electromagnetic relay 100 of the present embodiment includes the following features (i) to (v):

(i) the fixed terminal 512 (534) including the external input/output terminal 51 (53) and the external output/input terminal 52 (54) that can be electrically connected to the external input/output terminal 51 (53);

(ii) the movable terminal 47 (48) that can electrically connect the external input/output terminal 51 (53) and the external output/input terminal 52 (54);

(iii) the auxiliary fixed terminal 6243 that has a configuration different from that of the fixed terminal 512 (534) and includes the auxiliary external input/output terminal 62 and the auxiliary external output/input terminal 63 that can be electrically connected to the auxiliary external input/output terminal 62.

(iv) the auxiliary movable terminal 65, 660 or 6500 that has a configuration different from that of the movable terminal 47 (48) and can electrically connect the auxiliary external input/output terminal 62 and the auxiliary external output/input terminal 63; and (v) the armature 41 that moves the movable terminal 47 (48) and the auxiliary movable terminal 65 so as to switch the auxiliary movable terminal 65 between electrical connection and disconnection with respect to the respective auxiliary external input/output terminal 62 and auxiliary external output/input terminal 63 when switching the movable terminal 47 (48) between electrical connection and disconnection with respect to the respective external input/output terminal 51 (53) and external output/input terminal 52 (54).

According to the configurations (i) to (v) described above, the tip portion 62a of the auxiliary external input/output terminal 62 and the tip portion 63a of the external output/input terminal 63 can be used as terminals for detecting an unusual state of the electromagnetic relay 100. The unusual state is an operational failure of the movable terminal 47 (48) and the fixed terminal 512 (534). An example of an operational failure is welding between the movable terminal 47 (48) and the fixed terminal 512 (534).

An operational failure of the movable terminal 47 (48) and the fixed terminal 512 (534) is generally because of welding therebetween. Other factors, other than the welding, may also lead to a state where the movable terminal 47 (48) is in contact with the fixed terminal 512 (534). An operational failure of the movable terminal 47 (48) and the fixed terminal 512 (534) because of other factors may also be detected by use of the tip portion 62a of the auxiliary external input/output terminal 62 and the tip portion 63a of the auxiliary external output/input terminal 63. The respective terminals denoted by reference numerals 51, 52, 53, 54, 47, 48, 62, 63 and 65 and the armature 41 described in the features (i) to (v) above may have any shapes that can detect an operational failure of the movable terminal 47 (48) and the fixed terminal 512 (534).

The electromagnetic relay 100 including the features (i) to (v) above includes a case in which the internal structure is not covered with the cover 1 and the body 10. The method of detecting welding by use of the auxiliary movable terminal 65 and the auxiliary fixed terminal 6243 is effective in the following cases described in items (a) to (c) below. The following items (a) to (c) are examples in which an operational failure of the movable terminal and the fixed terminal is hard to be recognized visually or cannot be recognized visually.

(a) a case where the electromagnetic relay is located in a dark room;

(b) a case where the movable member (the movable terminal, the fixed terminal, the armature) is not visible from the outside as being surrounded by other components; and (c) a case where the detection of welding between the movable terminal and the fixed terminal should be implemented away from those terminals When the auxiliary movable terminal 65 can be recognized visually, an operational failure of the movable terminal and the fixed terminal may be confirmed based on the visual recognition of the auxiliary movable terminal 65 and the auxiliary fixed terminal 6243. A case where at least part of the cover 1 is transparent in Embodiment 2 is exemplified below. This case allows the conditions of the auxiliary movable terminal 65 and the auxiliary fixed terminal 6243 to be recognized visually from the outside of the electromagnetic relay 100. Accordingly, an operational failure of the movable terminal and the fixed terminal can be confirmed based on the visual recognition of the auxiliary movable terminal 65 and the auxiliary fixed terminal 6243.

In the present embodiment, the external input/output terminal 51 (53), the external output/input terminal 52 (54) and the movable terminal 47 (48) are each an independent member. Alternatively, the present invention may include a case where one of the external input/output terminal 51 (53) and the external output/input terminal 52 (54) is integrated with the movable terminal 47 (48).

The electromagnetic relay of the present invention may include the auxiliary external input/output terminal 62, the auxiliary external output/input terminal 63, and the auxiliary movable terminal 660 or 6500 each as an independent member, as shown in FIG. 38 and FIG. 40. Alternatively, the electromagnetic relay of the present invention may have a configuration in which one of the auxiliary external input/output terminal 62 and the auxiliary external output/input terminal 63 is integrated with the auxiliary movable terminal 65, as shown in FIG. 29 and FIG. 37.

As used herein, the term "terminal having a different configuration" includes a terminal of which at least one of the shape, pattern, and color is different from that of other terminals.

(2) The electromagnetic relay 100 may include the partition wall 14 provided between the respective fixed terminal 512 (534) and movable terminal 47 (48) and the respective auxiliary fixed terminal 6243 and auxiliary movable terminal 65.

In general, frictional powder is scattered by repeating contact and separation between the fixed terminal 512 (534) and the movable terminal 47 (48). The partition wall 14 provided as described above prevents frictional powder from adhering to the auxiliary fixed terminal 6243 and the auxiliary movable terminal 65, 660 or 6500.

(3) The electromagnetic relay 100 switches between electrical connection and disconnection of the auxiliary movable terminal 65 and the auxiliary fixed terminal 6243. The electromagnetic relay 100 may include, as a switching part, the auxiliary driving portion 61, 610, 6700 and 6600 for moving the auxiliary movable terminal 65 while coming into contact therewith. The respective driving portions may be attached to the armature 41 (FIG. 29, FIG. 37 and FIG. 39).

The auxiliary driving portions described above may be formed of various types of materials different from that of the armature 41.

For example, the respective driving portions formed of a material lighter than that of the armature 41, such as plastics, can lead to a reduction in weight of the electromagnetic relay 100.

(4) The armature 41 may be formed of an electrically conductive material, and the respective driving portions 61, 610, 6700 and 6600 may be formed of an insulating material (FIG. 29, FIG. 37 and FIG. 39).

This can electrically insulate the armature 41 from the auxiliary movable terminal 65.

(5) The armature 41 may include the auxiliary driving portion 41a for moving the auxiliary movable terminal 65 while coming into contact therewith so as to switch between electrical connection and disconnection of the auxiliary movable terminal 65 and the auxiliary fixed terminal 6243 (FIG. 36).

The auxiliary driving portion 41a can therefore be formed simultaneously with the armature 41 without requiring an additional process.

(6) The auxiliary movable terminal 660 may be directly attached to the armature 41 (FIG. 38 and FIG. 40).

The auxiliary fixed terminal 6243 thus can have mirror symmetry.

(7) When the fixed terminal 512 (534) and the movable terminal 47 (48) are electrically connected to each other, the armature 41 may move each of the movable terminal 47 (48) and the auxiliary movable terminal 65 such that the auxiliary movable terminal 65 is not electrically connected to the auxiliary fixed terminal 6243. This configuration is applied to all of the electromagnetic relays 100 of the first to sixth examples.

A current thus does not flow between the auxiliary external input/output terminal 62 and the auxiliary external output/input terminal 63 when the electromagnetic relay 100 is in the ON state. Accordingly, an unnecessary flow of current through the auxiliary external input/output terminal 62 and the auxiliary external output/input terminal 63 can be prevented during the use of the electromagnetic relay 100.

The electromagnetic relay 100 of the present embodiment, however, may allow the armature 41 to move each of the movable terminal 47 (48) and the auxiliary movable terminal 65 so as to electrically connect the auxiliary movable terminal 65 and the auxiliary fixed terminal 6243 when the fixed terminal 512 (534) and the movable terminal 47 (48) are electrically connected to each other.

(8) The auxiliary movable terminal 65 may be pushed upward so as to be electrically connected to the auxiliary fixed terminal 6243 (for example, the auxiliary external input/output terminal 64) (common to all of the first to sixth examples).

The own weight of the auxiliary fixed terminal 6243 (for example, the auxiliary external input/output terminal 64) can further enhance the electrical connection between the auxiliary movable terminal 65 and the auxiliary fixed terminal 6243 (for example, the auxiliary external input/output terminal 64).

(9) The electromagnetic relay 100 may include the electromagnet 20 that generates electromagnetic force for driving the armature 41 to move the movable terminal 47 (48) and the auxiliary movable terminal 65. The auxiliary movable terminal 65 and the auxiliary fixed terminal 6243 may each be directly or indirectly supported by the bobbin 21 on which the winding 25 of the electromagnet 20 is wound.

The auxiliary movable terminal 65 and the auxiliary fixed terminal 6243 can therefore be installed via the bobbin 21, which is an existing member of the electromagnetic relay 100.

The expression "the auxiliary movable terminal 65 and the auxiliary fixed terminal 6243 each directly supported by the bobbin 21" refers to a state where the auxiliary movable terminal 65 and the auxiliary fixed terminal 6243 are in direct contact with the bobbin 21. The expression "the auxiliary movable terminal 65 and the auxiliary fixed terminal 6243 each indirectly supported by the bobbin 21" refers to a state where the auxiliary movable terminal 65 and the auxiliary fixed terminal 6243 are supported by the bobbin 21 with some member interposed therebetween.

The bobbin 21 typically includes the upper flange 22 and the lower flange 23. The electromagnetic relay 100 is in general provided with the armature 41 above the upper flange 22. The auxiliary movable terminal 65 and the auxiliary fixed terminal 6243 are preferably provided directly on the bobbin 21 or on another member provided on the bobbin 21.

This configuration can decrease the distance between the armature 41 and the movable terminal 47 (48). This further decreases the length of another member directly or indirectly attached to the armature 41 to move the movable terminal 47 (48) or the length of the armature 41 for moving the movable terminal 47 (48). As a result, deflection of the other member or the armature 41 can be minimized

(10) The electromagnetic relay 100 may include the electromagnet 20 that generates electromagnetic force for driving the armature 41 to move the movable terminal 47 (48) and the auxiliary movable terminal 65. The electromagnetic relay 100 may further include a base for directly or indirectly supporting each of the fixed terminal 512 (534), the movable terminal 47 (48), the auxiliary fixed terminal 6243, the auxiliary movable terminal 65, the armature 41, and the electromagnet 20. The base is the body 10 of the present embodiment. The tip portion 51a (53a) of the external input/output terminal 51 (53), the tip portion 52a (54a) of the external output/input terminal 52 (54), the tip portion 62a of the auxiliary external input/output terminal 62 and the tip portion 63a of the auxiliary external output/input terminal 63 each project outward from the body 10.

In general, the electromagnetic relay 100 is installed such that the bottom surface of the body 10 is in contact with the printed wiring board 1000. This decreases a gap between each of the tip portions 51a (53a), 52a (54a), 62a and 63a and the printed wiring board 100.

The term "directly supported" is meant to include a state where the armature 41 or the electromagnet 20 is in direct contact with and supported by the body 10. The term "indirectly supported" is meant to include a state where the armature 41 or the electromagnet 20 is supported by the body 10 with some member interposed therebetween.

(11) The auxiliary fixed terminal 6243 may be directly or indirectly supported by the body 10.

The auxiliary fixed terminal can therefore be installed by use of the body 10 that is an existing member. For example, the auxiliary external input/output terminal 6200 and the auxiliary external output/input terminal 6300 may be fixed to the body 10, as shown in FIG. 39.

The expression "the auxiliary fixed terminal 6243 is directly supported by the body 10" refers to a state where the auxiliary fixed terminal 6243 is in direct contact with and supported by the body 10. The expression "the auxiliary fixed terminal 6243 is indirectly supported by the body 10" refers to a state where the auxiliary fixed terminal 6243 is indirectly supported by the body 10 with some member interposed therebetween.

(12) The electromagnetic relay 100 may include the cover 1 attached to the body 10 to enclose the fixed terminal 512 (534), the movable terminal 47 (48), the auxiliary fixed terminal 6243, the auxiliary movable terminal 65, the armature 41, and the electromagnet 20.

The movable terminal 47 (48) and the fixed terminal 512 (534) are enclosed by the cover 1 and the body 10. The internal structure of the electromagnetic relay 100 cannot be recognized visually from the outside of the electromagnetic relay 100 when the cover 1 is not transparent. The occurrence of welding between the movable terminal 47 (48) and the fixed terminal 512 (534) thus cannot be detected by visual check.

The phrase "enclosed by the cover 1 and the body 10" is meant to encompass a state where an operational failure (welding) of the movable terminal 47 (48) and the fixed terminal 512 (534) cannot be recognized visually from the outside of the electromagnetic relay 100. The phrase "cannot be recognized visually" is meant to include a case where an operational failure (welding) of the movable terminal 47 (48) and the fixed terminal 512 (534) cannot be recognized indirectly from the outside of the electromagnetic relay 100. The expression "an operational failure (welding) cannot be recognized indirectly from the outside" is meant to include a case where conditions of other members, other than the movable terminal 47 (48) and the fixed terminal 512 (534), such as the armature 41 cannot be recognized visually.

The cover 1 described above is therefore not limited to a state of completely concealing the internal structure of the electromagnetic relay 100. The cover 1 is meant to include a state where part of the internal structure of the electromagnetic relay 100 can be recognized visually therethrough, but an operational failure (welding) of the movable terminal 47 (48) and the fixed terminal 512 (534) cannot be confirmed.

According to the configuration described above, the tip portion 62a of the auxiliary external input/output terminal 62 and the tip portion 63a of the auxiliary external output/input terminal 63 can be electrically connected to electrodes *2000a* of a tester *2000* from the outside of the electromagnetic relay 100. The tester can therefore apply a current to pass through the tip portion 62a of the auxiliary external input/output terminal 62 and the tip portion 63a of the auxiliary external output/input terminal 63.

The occurrence of welding between the movable terminal 47 (48) and the fixed terminal 512 (534) can be presumed depending on whether a current flows through the tip portion 62a and the tip portion 63a. Accordingly, welding between the movable terminal 47 (48) and the fixed terminal 512 (534) can be detected without the cover 1 removed from the body 10.

The configuration described above can detect the occurrence of welding between the movable terminal 47 (48) and the fixed terminal 512 (534) that are enclosed by the cover 1 and the body 10 and therefore cannot be recognized visually from the outside.

The electromagnetic relay 100 is illustrated above by the case where the respective tip portions 51a (53a), 52a (54a), 62a and 63a project downward from the body 10. However, the electromagnetic relay 100 is not limited to this case. The electromagnetic relay 100 of the present invention may have any configuration that can detect an operational failure of the movable terminal and the fixed terminal, such as welding, by use of the auxiliary movable terminal and the auxiliary fixed terminal.

For example, the electromagnetic relay 100 may have a configuration in which the respective tip portions 51a (53a), 52a (54a), 62a and 63a project outward from the cover 1. This configuration facilitates the contact of the tip portions 51a (53a), 52a (54a), 62a and 63a with electrodes of the tester.

(13) The cover 1 may have an inner space of a substantially rectangular parallelepiped. The auxiliary fixed terminal 6243 may be located in the space between the electromagnet 20 and the corners 10b and 10c (refer to FIG. 18), among the four corners of the cover 1, closer to the electromagnet 20 than the movable terminal 47 (48) in a plan view.

The configuration described above can utilize the space in the cover 1 effectively when installing the auxiliary fixed terminal 6243.

The auxiliary fixed terminal 6243 is preferably located on the lines connecting the center C of the winding 25 and the corners of the cover 1 (corresponding to the corners 10b and 10c of the body) closer to the electromagnet 20 than the partition wall 14 in a plan view. In particular, the auxiliary external input/output terminal 62 and the auxiliary external output/input terminal 63 are provided between the center C and the respective corners 10b and 10c of the body 10 having a rectangular outline shown in FIG. 18 used for describing Embodiment 1. FIG. 18, which is used basically for the descriptions of the electromagnetic relay 100 of Embodiment 1, further shows the cross sections of the auxiliary external input/output terminal 62 and the auxiliary external output/input terminal 63 of the electromagnetic relay 100 of Embodiment 2 for reasons of expediency.

The term "substantially rectangular parallelepiped" is not limited to an exact rectangular parallelepiped with the respective sides intersecting at right angles but includes a rectangular parallelepiped having rounded corners. The term "substantially rectangular parallelepiped" includes a shape with some sides inclined with respect to other sides but recognized as a rectangular parallelepiped as a whole.

The method of detecting an operational failure of the movable terminal 47 (48) and the fixed terminal 512 (534) of the electromagnetic relay 100 of Embodiment 1 is as follows, which has been considered by the inventor of the present invention as an undisclosed technique.

First, the electromagnetic relay 100 is turned off. The movable terminal and the fixed terminal should not be in contact with each other. A current is then applied from the tip portion 51a (53a) of the external input/output terminal 51 (53) to the tip portion 51a (53a) of the external input/output terminal 51 (53) of the fixed terminal 512 (534) by use of a tester. Namely, it is determined whether a current flows from the tip portion 51a (53a) to the tip portion 52a (54a) when the electromagnetic relay 100 is in the OFF state.

When a current flow from the tip portion 51a (53a) to the tip portion 52a (54a) is detected when the electromagnetic relay 100 is in the OFF state, it is determined that the movable terminal 47 (48) and the fixed terminal 512 (534) are welded.

When a current flow from the tip portion 51a (53a) to the tip portion 52a (54a) is not detected, it is determined that the movable terminal 47 (48) and the fixed terminal 512 (534) are not welded together. This is because the current cannot flow from the tip portion 51a (53a) to the tip portion 52a (54a) when the electromagnetic relay 100 is in the OFF state and the movable terminal 47 (48) and the fixed terminal 512 (534) are not welded.

The method of detecting the occurrence of welding, which has been considered by the inventor of the present invention as an undisclosed technique, requires the electromagnetic relay 100 to be turned off before the detection. The detection of welding is, however, preferably implemented without the electromagnetic relay turned off. For such a detection, the electromagnetic relay 100 is required to further include particular auxiliary terminals only used for detecting the occurrence of welding between the movable terminal 47 (48) and the fixed terminal 512 (534).

In order to deal with this requirement, the inventor of the present invention considered that extra terminals were added to a plurality of usable terminals for applying current in the electromagnetic relay 100. The inventor conceived that any of the usable terminals could be used as auxiliary terminals for detecting the occurrence of welding between the movable terminal and the fixed terminal A test operator, however, cannot visually distinguish the auxiliary terminals from the other terminals originally used in the electromagnetic relay 100.

The inventor of the present invention thus provides the terminals originally used in the electromagnetic relay 100 and further the auxiliary terminals for detecting occurrence of welding that can visually be distinguished from the terminals originally used. The configurations and effects are as follows.

(14) The tip portion 62a of the auxiliary external input/output terminal 62 and the tip portion 63a of the auxiliary external output/input terminal 63 may each have an appearance that can visually be distinguished from each of the tip portion 51a (53a) of the external input/output terminal 51 (53) and the tip portion 52a (54a) of the external output/input terminal 52 (54).

The configuration described above can specify the auxiliary external input/output terminal 62 and the auxiliary external output/input terminal 63 as viewed from the outside of the electromagnetic relay 100, namely, from the bottom surface of the body 10.

The appearance described above may be any of the form, color, shape, position and arrangement that can visually be differentiated from others by a user of the electromagnetic relay 100.

(15) The tip portion 62a of the auxiliary external input/output terminal 62 and the tip portion 63a of the auxiliary external output/input terminal 63 may each have an area of the cross section smaller than that of each of the tip portion 51a (53a) of the external input/output terminal 51 (53) and the tip portion 52a (54a) of the external output/input terminal 52 (54).

The configuration described above can decrease a current passing through the auxiliary external input/output terminal 62 and the auxiliary external output/input terminal 63. As a result, power consumption for detection can be reduced.

(16) A virtual straight line connecting the tip portion 51a (53a) of the external input/output terminal 51 (53) and the tip portion 52a (54a) of the external output/input terminal 52 (54) may be substantially parallel to a virtual straight line connecting the tip portion 62a of the auxiliary external input/output terminal 62 and the tip portion 63a of the auxiliary external output/input terminal 63.

The term "substantially parallel" refers to a state where elements are not necessarily exactly parallel to each other, and slight errors of manufacture are permissible.

The configuration described above can provide parallel arrangements of multiple input/output wiring exposed to the outside of the electromagnetic relay 100 on the printed wiring board 1000. In particular, the wiring connected to each of the tip portion 51a (53a) and the tip portion 52a (54a) and the output/input wiring connected to each of the tip portion 62a and the tip portion 63a can be parallel to each other.

(17) The electromagnetic relay 100 according to another aspect of Embodiment 2 includes the following features (i) to (vii):

(i) The fixed terminal 512 including the external input/output terminal 51 and the external output/input terminal 52 that can be electrically connected to the external input/output terminal 51;

(ii) the movable terminal 47 that can electrically connect the external input/output terminal 51 and the external output/input terminal 52;

(iii) the other fixed terminal 534 including the other external input/output terminal 53 and the other external output/input terminal 54 that can be electrically connected to the other external input/output terminal 53;

(iv) the other movable terminal 48 that can electrically connect the other external input/output terminal 53 and the other external output/input terminal 54;

(v) the auxiliary fixed terminal 6243 that has a configuration different from that of the fixed terminal 512 and the other fixed terminal 534 and includes the auxiliary external input/output terminal 62 and the auxiliary external output/input terminal 63 that can be electrically connected to the auxiliary external input/output terminal 62;

(vi) the auxiliary movable terminal 65, 660 or 6500 that has a configuration different from that of the movable terminal 47 and the other movable terminal 48 and can electrically connect the auxiliary external input/output terminal 62 and the auxiliary external output/input terminal 63; and (vii) the armature 41 that moves the movable terminal 47, the other movable terminal 48 and the auxiliary movable terminal 65 so as to switch the auxiliary movable terminal 65 between electrical connection and disconnection with respect to the respective auxiliary external input/output terminal 62 and auxiliary external output/input terminal 63 when switching the movable terminal 47 between electrical connection and disconnection with respect to the external input/output terminal 51 and the external output/input terminal 52 and switching the other movable terminal 48 between electrical connection and disconnection with respect to the other external input/output terminal 53 and the other external output/input terminal 54.

According to the configurations (i) to (vii) described above, the tip portion 62a of the auxiliary external input/output terminal 62 and the tip portion 63a of the external output/input terminal 63 can be used as terminals for detecting an operational failure. An operational failure detected is at least one of an operational failure of the movable terminal 47 and the fixed terminal 512 and an operational failure of the other movable terminal 48 and the other fixed terminal 534.

(18) The electromagnetic relay 100 may include the electromagnet 20 that generates electromagnetic force for driving the armature 41 to move the movable terminal 47, the other movable terminal 48 and the auxiliary movable terminal 65.

The electromagnetic relay 100 may further include the base. The base may directly or indirectly support each of the fixed terminal 512, the other fixed terminal 534, the movable terminal 47, the other movable terminal 48, the auxiliary fixed terminal 6243, the auxiliary movable terminal 65, the armature 41 and the electromagnet 20. The base may be the body 10 of the present embodiment. The tip portion 51a of the external input/output terminal 51, the tip portion 52a of the external output/input terminal 52, the tip portion 53a of the external input/output terminal 53, the tip portion 54a of the external output/input terminal 54, the tip portion 62a of the auxiliary external input/output terminal 62 and the tip portion 63a of the auxiliary external output/input terminal 63 may each project outward from the body 10.

The electromagnetic relay 100 may include the cover 1. The cover 1 may be attached to the body 10 to enclose the fixed terminal 512, the other fixed terminal 534, the movable terminal 47, the other movable terminal 48, the auxiliary fixed terminal 6243, the auxiliary movable terminal 65, the armature 41, and the electromagnet 20.

The tip portion 62a and the tip portion 63a each preferably have an appearance that can visually be distinguished from each of the tip portions 51a, 52a, 53a and 54a.

The configuration described above facilitates the differentiation between the tip portions 62a and 63a and the tip portions 51a, 52a, 53a and 54a of the other terminals. The detection by use of the tip portion 62a and the tip portion 63a can therefore be implemented promptly.

(19) The movable terminal 47 and the other movable terminal 48 may be substantially aligned along a virtual straight line in a plan view and move in a direction crossing the virtual straight line by the electromagnetic force.

The term "substantially aligned" is meant to include a state where the movable terminal 47 and the other movable terminal 48 are not aligned exactly on the same straight line but may be slightly offset therefrom. The movable terminal 47 and the other movable terminal 48 are only required to be recognized as substantially being aligned on the virtual straight line as a whole. This means that errors of manufacture of the movable terminal 47 and the other movable terminal 48 are permissible.

The configuration described above can shorten the length of the electromagnetic relay 100 in the direction vertical to the virtual straight line in a plan view as compared with the electromagnetic relay 100 in which the movable terminal 47 and the other movable terminal 48 are arranged in rows at an interval in the moving direction of these terminals.

The electromagnetic relay of the present invention includes a case in which the movable terminal 47 and the other movable terminal 48 are arranged in rows. This electromagnetic relay can also provide the effects similar to those obtained by the electromagnetic relay 100 described in the present embodiment.

The present embodiment is illustrated by the case where the two movable terminals are provided. Alternatively, the electromagnetic relay of the present invention may be provided with three or more movable terminals. The electromagnetic relay of the present invention thus includes a case where multiple movable terminals are aligned. The electromagnetic relay of the present invention further includes a case where plural sets of movable terminals, each set including the movable terminals being aligned along a straight line, are arranged in rows.

(20) The following are descriptions of a case where the body 10 is viewed in the direction vertical to the bottom surface of the body 10. A comparison between distances (i) and (ii) below is made as follows.

(i) A distance between each of the tip portion 62a and the tip portion 63a and each of the tip portions 51a, 52a, 53a and 54a; and (ii) a distance between the respective tip portions 51a, 52a, 53a and 54a.

The distance (i) is preferably greater than the distance (ii). This relationship can prevent a current flowing through the tip portions 51a, 52a, 53a and 54a from having an adverse effect on a current flowing through the tip portion 62a and the tip portion 63a because of electromagnetic interference.

(21) The electromagnetic relay 100 may include the pair of coil terminals 25a1 and 25a2 electrically connected to both sides of the winding 25 of the electromagnet 20 and projecting from the body 10. The tip portion 62a of the auxiliary external input/output terminal 62 and the tip portion 63a of the auxiliary external output/input terminal 63 each preferably have an appearance that can visually be distinguished from the pair of coil terminals 25a1 and 25a2.

This configuration facilitates the differentiation between the respective tip portions 62a and 63a and the pair of coil terminals 25a1 and 25a2.

(22) The electromagnetic relay 100 may have the bottom surface having a form or pattern that can visually differentiate the respective tip portions 51a, 52a, 53a and 54a from other terminals when the bottom surface of the body 10 is viewed in the direction vertical to the body 10.

The detecting operation by use of the tester described above can therefore be implemented promptly.

The form or pattern may be any of a recess, color or design provided on the bottom surface of the body 10 that can differentiate the respective tip portions 62a and 63a from the respective tip portions 51a, 52a, 53a and 54a.

The embodiments described above are examples of the present invention. The present invention is not intended to be limited to the descriptions thereof, and various modifications and improvements of the embodiments will be apparent to those skilled in the art depending on designs without departing from the spirit and scope of the present invention.

In the present application, the entire content of Japanese Patent Application No. P2013-257752, which was filed on Dec. 13, 2013, is incorporated herein by reference.

REFERENCE SIGNS LIST

1 cover
10 body
20 electromagnet
14 partition wall
21 bobbin
25 winding
41 armature
41a, 61, 610, 6600, 6700 auxiliary driving portion
42 holder
43a1, 44a1 first cantilever
43a2, 44a2 second cantilever
43b1, 44b1 third cantilever
43b2, 44b2 fourth cantilever
43a3, 44a3 first-second cantilever connecting portion
43b3, 44b3 third-fourth cantilever connecting portion
43ab1, 44ab first composite cantilever
43ab2, 44ab2 second composite cantilever
47, 48 movable terminal
51, 53 external input/output terminal
51a, 52a, 53a, 54a tip portion
51b, 52b, 53b, 54b fixed contact point
51c, 52c, 53c, 54c rising portion
51d, 52d, 53d, 54d horizontal portion
52, 54 external output/input terminal
512, 534 fixed terminal
62 auxiliary external input/output terminal
62a, 63a tip portion
63 auxiliary external output/input terminal
65, 660, 6500 auxiliary movable terminal
100 electromagnetic relay
6243 auxiliary fixed terminal

The invention claimed is:

1. An electromagnetic relay comprising:

a fixed terminal including an external input/output terminal and an external output/input terminal that can be electrically connected to the external input/output terminal;

a movable terminal that can electrically connect the external input/output terminal and the external output/input terminal;

an auxiliary fixed terminal that has a configuration different from that of the fixed terminal and includes an auxiliary external input/output terminal and an auxiliary external output/input terminal that can be electrically connected to the auxiliary external input/output terminal;

an auxiliary movable terminal that has a configuration different from that of the movable terminal and can electrically connect the auxiliary external input/output terminal and the auxiliary external output/input terminal;

*a body, wherein a tip portion of the external input/output terminal, a tip portion of the external output/input terminal, a tip portion of the auxiliary external input/output terminal, and a tip portion of the auxiliary external output/input terminal respectively project outwardly, in a same direction, from the body;* and an armature that moves each of the movable terminal and the auxiliary movable terminal so that:

(1) the auxiliary movable terminal is switched so as not to be electrically connected to each of the auxiliary external input/output terminal and the auxiliary external output/input terminal, when the movable terminal is switched so as to be electrically connected to each of the external input/output terminal and the external output/input terminal, and (2) the auxiliary movable terminal is switched so as to be electrically connected to each of the auxiliary external input/output terminal and the auxiliary external output/input terminal, when the movable terminal is switched so as not to be electrically connected to each of the external input/output terminal and the external output/input terminal, wherein a first axis along which a movable contact point of the movable terminal [portion] is moved by the armature and a second axis along which an auxiliary movable contact point of the auxiliary movable terminal is moved by the armature are not parallel.

2. The electromagnetic relay according to claim 1, comprising a partition wall provided between a pair of the fixed terminal and the movable terminal and a pair of the auxiliary fixed terminal and the auxiliary movable terminal.

3. The electromagnetic relay according to claim 1, comprising an auxiliary driving portion for moving the auxiliary movable terminal while the auxiliary driving portion comes into contact with the auxiliary movable terminal so as to switch between electrical connection and disconnection of the auxiliary movable terminal and the auxiliary fixed terminal, wherein the auxiliary driving portion is attached to the armature.

4. The electromagnetic relay according to claim 3, wherein the armature is formed of an electrically conductive material, and the auxiliary driving portion is formed of an insulating material.

5. The electromagnetic relay according to claim 1, wherein the armature includes an auxiliary driving portion for moving the auxiliary movable terminal while the auxiliary driving portion comes into contact with the auxiliary movable terminal so as to switch between electrical connection and disconnection of the auxiliary movable terminal and the auxiliary fixed terminal.

6. The electromagnetic relay according to claim 1, wherein the auxiliary movable terminal is directly attached to the armature.

7. The electromagnetic relay according to claim 1, wherein the auxiliary movable terminal is pushed upward by the armature so as to be electrically connected to the auxiliary fixed terminal.

8. The electromagnetic relay according to claim 1, comprising an electromagnet that generates electromagnetic force for driving the armature to move the movable terminal and the auxiliary movable terminal, each of the auxiliary movable terminal and the auxiliary fixed terminal is directly or indirectly supported by a bobbin on which a winding of the electromagnet is wound.

9. The electromagnetic relay according to claim 1, comprising:

an electromagnet that generates electromagnetic force for driving the armature to move the movable terminal and the auxiliary movable terminal[; and a body from which a tip portion of the external input/output terminal, a tip portion of the external output/input terminal, a tip portion of the auxiliary external input/output terminal, and a tip portion of the auxiliary external output/input terminal respectively project outward],

*wherein* the body [being] *is* a base for directly or indirectly supporting each of the fixed terminal, the movable terminal, the auxiliary fixed terminal, the auxiliary movable terminal, the armature, and the electromagnet.

10. The electromagnetic relay according to claim 9, wherein the auxiliary fixed terminal is directly or indirectly supported by the body.

11. The electromagnetic relay according to claim 9, comprising a cover attached to the body to enclose the fixed terminal, the movable terminal, the auxiliary fixed terminal, the auxiliary movable terminal, the armature, and the electromagnet.

12. The electromagnetic relay according to claim 11, wherein the cover has an inner space of a substantially rectangular parallelepiped, wherein the electromagnet is located in a space between the fixed terminal and the auxiliary fixed terminal, the fixed terminal is closest to at least one first corner of four corners of the cover in a horizontal cross-sectional view, the auxiliary fixed terminal is closest to at least one second corner of four corners of the cover in the horizontal cross-sectional view, and the first corner and the second corner are different.

13. The electromagnetic relay according to claim 9, wherein each of the tip portion of the auxiliary external input/output terminal and the tip portion of the auxiliary external output/input terminal has an appearance that can visually be distinguished from each of the tip portion of the external input/output terminal and the tip portion of the external output/input terminal.

14. The electromagnetic relay according to claim 9, wherein each of the tip portion of the auxiliary external input/output terminal and the tip portion of the auxiliary external output/input terminal has an area of a cross section smaller than that of each of the tip portion of the external input/output terminal and the tip portion of the external output/input terminal.

15. The electromagnetic relay according to claim 9, wherein a virtual straight line connecting the tip portion of the external input/output terminal and the tip portion of the external output/input terminal is substantially parallel to a virtual straight line connecting the tip portion of the auxiliary external input/output terminal and the tip portion of the auxiliary external output/input terminal.

16. The electromagnetic relay according to claim 1, further comprising:

another fixed terminal including another external input/output terminal and another external output/input terminal that can be electrically connected to the another external input/output terminal; and another movable terminal that can electrically connect another external input/output terminal and another external output/input terminal, wherein the auxiliary fixed terminal has a configuration different from that of the fixed terminal and the another fixed terminal and includes an auxiliary external input/output terminal and an auxiliary external output/input terminal that can be electrically connected to the auxiliary external input/output terminal, the auxiliary movable terminal has a configuration different from that of the movable terminal and the another movable terminal and can electrically connect the auxiliary external input/output terminal and the auxiliary external output/input terminal, and the armature moves each of the movable terminal, the another movable terminal, and the auxiliary movable terminal so that:

(1) the auxiliary movable terminal is switched so as not to be electrically connected to each of the auxiliary external input/output terminal and the auxiliary external output/input terminal, when the movable terminal is switched so as to be electrically connected to each of the external input/output terminal and the external output/input terminal as well as the another movable terminal is switched so as to be electrically connected to each of the another external input/output terminal and the another external output/input terminal, and (2) the auxiliary movable terminal is switched so as to be electrically connected to each of the auxiliary external input/output terminal and the auxiliary external output/input terminal, when the movable terminal is switched so as not to be electrically connected to each of the external input/output terminal and the external output/input terminal as well as the another movable terminal is switched so as not to be electrically connected to each of the another external input/output terminal and the another external output/input.

17. The electromagnetic relay according to claim 16, wherein the movable terminal and the another movable terminal are substantially aligned along a virtual straight line in a plan view and can move in a direction crossing the virtual straight line.

18. The electromagnetic relay according to claim 1, wherein the armature includes a horizontal portion that pivots and a vertical portion extending downward from the horizontal portion, wherein the movable terminal is provided so as to pivot in a same direction as a rotational direction of the vertical portion, and wherein the auxiliary movable terminal is provided so as to pivot in a same direction as a rotational direction of the horizontal portion.

19. The electromagnetic relay according to claim 1, *wherein*:

a first tip end of the movable terminal has a movable contact point that comes into contact with a fixed contact point provided in the fixed terminal, a second tip end portion of the auxiliary movable terminal has an auxiliary movable contact point that comes into contact with an auxiliary fixed contact point provided in the auxiliary fixed terminal, [wherein] *and* a first width of the movable terminal that traverses the movable contact point in a direction orthogonal to a first extending direction of the first tip end portion of the movable terminal is greater than a second width of the auxiliary movable terminal that traverses the auxiliary movable terminal in a direction orthogonal to a second extending direction of the second tip end portion of the auxiliary movable terminal.

*20. An electromagnetic relay comprising:*

*a fixed terminal including an external input/output terminal and an external output/input terminal that can be electrically connected to the external input/output terminal;*

*a movable terminal that can electrically connect the external input/output terminal and the external output/input terminal;*

*an auxiliary fixed terminal that has a different configuration from that of the fixed terminal and includes an auxiliary external input/output terminal and an auxiliary external output/input terminal that can be electrically connected to the auxiliary external input/output terminal;*

*an auxiliary movable terminal that has a different configuration from that of the movable terminal and can electrically connect the auxiliary external input/output terminal and the auxiliary external output/input terminal;*

*a body, wherein a tip portion of the external input/output terminal, a tip portion of the external output/input terminal, a tip portion of the auxiliary external input/output terminal, and a tip portion of the auxiliary external output/input terminal respectively project outwardly, in a same direction, from the body; and*

*an armature that moves each of the movable terminal and the auxiliary movable terminal so that:*

*(1) the auxiliary movable terminal is switched so as not to electrically connect the auxiliary external input/output terminal to the auxiliary external output/input terminal, when the movable terminal is switched so as to be electrically connected to each of the external input/output terminal and the external output/input terminal, and*

*(2) the auxiliary movable terminal is switched so as to electrically connect the auxiliary external input/output terminal to the auxiliary external output/input terminal, when the movable terminal is switched so as not to be electrically connected to each of the external input/output terminal and the external output/input terminal,*

*wherein a first axis along which a movable contact point of the movable terminal is moved by the armature and a second axis along which an auxiliary movable contact point of the auxiliary movable terminal is moved by the armature are not parallel.*

*21. The electromagnetic relay according to claim 20, wherein the armature includes an auxiliary driving portion extending therefrom which is configured to come into and out of contact with the auxiliary movable terminal so as to actuate: (1) the auxiliary movable terminal being switched so as not to electrically connect the auxiliary external input/output terminal to the auxiliary external output/input terminal and (2) the auxiliary movable terminal being switched so as to electrically connect the auxiliary external input/output terminal to the auxiliary external output/input terminal.*

*22. The electromagnetic relay according to claim 20, further comprising:*

*an auxiliary driving portion which is fixed to the armature and is configured to come into and out of contact with the auxiliary movable terminal so as to actuate: (1) the auxiliary movable terminal being switched so as not to electrically connect the auxiliary external input/output terminal to the auxiliary external output/input terminal*

*and (2) the auxiliary movable terminal being switched so as to electrically connect the auxiliary external input/output terminal to the auxiliary external output/input terminal.*

*23. The electromagnetic relay according to claim 20, further comprising:*

*a holder which has insulating properties, fixes the armature to the movable terminal while insulating the armature from the movable terminal, and is configured to move integrally with the armature; and*

*an auxiliary driving portion which is configured to move integrally with the armature, and come into and out of contact with the auxiliary movable terminal so as to actuate: (1) the auxiliary movable terminal being switched so as not to electrically connect the auxiliary external input/output terminal to the auxiliary external output/input terminal and (2) the auxiliary movable terminal being switched so as to electrically connect the auxiliary external input/output terminal to the auxiliary external output/input terminal.*

*24. The electromagnetic relay according to claim 23, wherein the auxiliary driving portion has electrical conductivity properties.*

*25. The electromagnetic relay according to claim 23, wherein the auxiliary driving portion has insulating properties.*

*26. The electromagnetic relay according to claim 20, further comprising:*

*an electromagnet including a bobbin and a winding wound round the bobbin, and is configured to generate electromagnetic force for driving the armature to move the movable terminal and the auxiliary movable terminal, wherein:*

*the body directly or indirectly supports each of the fixed terminal, the movable terminal, the auxiliary fixed terminal, the auxiliary movable terminal, the armature, and the electromagnet, and*

*the body includes a bottom surface from which the tip portion of the external input/output terminal, the tip portion of the external output/input terminal, the tip portion of the auxiliary external input/output terminal, and the tip portion of the auxiliary external output/input terminal respectively project outwardly.*

*27. The electromagnetic relay according to claim 26, wherein:*

*the bobbin includes a lower flange and an upper flange facing to the lower flange in a direction of a central axis of the winding,*

*a distance between the upper flange and the bottom surface is larger than a distance between the lower flange and the bottom surface, and*

*the upper flange supports the auxiliary external input/output terminal and the auxiliary external output/input terminal.*

*28. The electromagnetic relay according to claim 26, wherein a distance between the auxiliary movable contact point and the bottom surface is larger than a distance between the movable contact point and the bottom surface.*

*29. An electrical connection system comprising:*

*an electromagnetic relay; and*

*a wiring board with insertion holes configured to connect the electromagnetic relay to the wiring board, wherein:*

*the electromagnetic relay comprises:*

*a fixed terminal including an external input/output terminal and an external output/input terminal that can be electrically connected to the external input/output terminal;*

*a movable terminal that can electrically connect the external input/output terminal and the external output/input terminal;*

*an auxiliary fixed terminal that has a different configuration from that of the fixed terminal and includes an auxiliary external input/output terminal and an auxiliary external output/input terminal that can be electrically connected to the auxiliary external input/output terminal;*

*an auxiliary movable terminal that has a different configuration from that of the movable terminal and can electrically connect the auxiliary external input/output terminal and the auxiliary external output/input terminal;*

*a body, wherein a tip portion of the external input/output terminal, a tip portion of the external output/input terminal, a tip portion of the auxiliary external input/output terminal, and a tip portion of the auxiliary external output/input terminal respectively project outwardly, in a same direction, from the body; and*

*an armature that moves each of the movable terminal and the auxiliary movable terminal so that:*

*(1) the auxiliary movable terminal is switched so as not to electrically connect the auxiliary external input/output terminal to the auxiliary external output/input terminal, when the movable terminal is switched so as to be electrically connected to each of the external input/output terminal and the external output/input terminal, and*

*(2) the auxiliary movable terminal is switched so as to electrically connect the auxiliary external input/output terminal to the auxiliary external output/input terminal, when the movable terminal is switched so as not to be electrically connected to each of the external input/output terminal and the external output/input terminal,*

*a first axis along which a movable contact point of the movable terminal is moved by the armature and a second axis along which an auxiliary movable contact point of the auxiliary movable terminal is moved by the armature are not parallel, and*

*the external input/output terminal and the external output/input terminal are inserted into the insertion holes, respectively.*

*30. An electrical connection system comprising:*

*an electromagnetic relay; and*

*a tester, wherein:*

*the electromagnetic relay comprises:*

*a fixed terminal including an external input/output terminal and an external output/input terminal that can be electrically connected to the external input/output terminal;*

*a movable terminal that can electrically connect the external input/output terminal and the external output/input terminal;*

*an auxiliary fixed terminal that has a different configuration from that of the fixed terminal and includes an auxiliary external input/output terminal and an auxiliary external output/input terminal that can be electrically connected to the auxiliary external input/output terminal;*

*an auxiliary movable terminal that has a different configuration from that of the movable terminal and can electrically connect the auxiliary external input/output terminal and the auxiliary external output/input terminal;*

*a body, wherein a tip portion of the external input/output terminal, a tip portion of the external output/input terminal, a tip portion of the auxiliary external input/output terminal, and a tip portion of the auxiliary external output/input terminal respectively project outwardly, in a same direction, from the body; and*

*an armature that moves each of the movable terminal and the auxiliary movable terminal so that:*

*(1) the auxiliary movable terminal is switched so as not to electrically connect the auxiliary external input/output terminal to the auxiliary external output/input terminal, when the movable terminal is switched so as to be electrically connected to each of the external input/output terminal and the external output/input terminal, and*

*(2) the auxiliary movable terminal is switched so as to electrically connect the auxiliary external input/output terminal to the auxiliary external output/input terminal, when the movable terminal is switched so as not to be electrically connected to each of the external input/output terminal and the external output/input terminal,*

*a first axis along which a movable contact point of the movable terminal is moved by the armature and a second axis along which an auxiliary movable contact point of the auxiliary movable terminal is moved by the armature are not parallel, and*

*an electromagnet that is configured to generate electromagnetic force so as to switch between a ON state in which a first current flows through the external input/output terminal and the external output/input terminal and an OFF state in which the first current does not flow though the external input/output terminal and the external output/input terminal, and*

*the tester is configured to detect whether a second current through the auxiliary external input/output terminal and the auxiliary external output/input terminal flows or does not flow.*

*31. An electromagnetic relay comprising:*

*a fixed terminal including an external input/output terminal and an external output/input terminal that can be electrically connected to the external input/output terminal;*

*a movable terminal that can electrically connect the external input/output terminal and the external output/input terminal;*

*an auxiliary fixed terminal that has a different configuration from that of the fixed terminal and includes an auxiliary external input/output terminal and an auxiliary external output/input terminal that can be electrically connected to the auxiliary external input/output terminal;*

*an auxiliary movable terminal that has a different configuration from that of the movable terminal and can electrically connect the auxiliary external input/output terminal and the auxiliary external output/input terminal;*

*an electromagnet including a bobbin and a winding wound round the bobbin, and is configured to generate electromagnetic force for driving the armature to move the movable terminal and the auxiliary movable terminal;*

*a body for directly or indirectly supporting each of the fixed terminal, the movable terminal, the auxiliary fixed terminal, the auxiliary movable terminal, the armature, and the electromagnet and including a bottom surface; and*

*an armature that moves each of the movable terminal and the auxiliary movable terminal so that:*

*(1) the auxiliary movable terminal is switched so as not to electrically connect the auxiliary external input/output terminal to the auxiliary external output/input terminal, when the movable terminal is switched so as to be electrically connected to each of the external input/output terminal and the external output/input terminal, and*

*(2) the auxiliary movable terminal is switched so as to electrically connect the auxiliary external input/output terminal to the auxiliary external output/input terminal, when the movable terminal is switched so as not to be electrically connected to each of the external input/output terminal and the external output/input terminal,*

*wherein a first axis along which a movable contact point of the movable terminal is moved by the armature and a second axis along which an auxiliary movable contact point of the auxiliary movable terminal is moved by the armature are not parallel,*

*the bobbin includes a lower flange and an upper flange facing to the lower flange in a direction of a central axis of the winding,*

*a distance between the upper flange and the bottom surface is larger than a distance between the lower flange and the bottom surface, and*

*the upper flange supports the auxiliary external input/output terminal and the auxiliary external output/input terminal.*

* * * * *